United States Patent
Fulmer et al.

(10) Patent No.: US 10,011,935 B2
(45) Date of Patent: Jul. 3, 2018

(54) METHODS AND COMPOSITIONS FOR TREATING LAUNDRY ITEMS

(71) Applicant: Whirlpool Corporation, Benton Harbor, MI (US)

(72) Inventors: Gregory R. Fulmer, Saint Joseph, MI (US); Kaustav Ghosh, Benton Harbor, MI (US); James W. Klein, Kalamazoo, MI (US); Nicholas E. Leep, Saint Joseph, MI (US); William L. Murch, Owasso, OK (US); Mir A. Quddus, Saint Joseph, MI (US); Jason M. Schneemann, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 842 days.

(21) Appl. No.: 14/160,625

(22) Filed: Jan. 22, 2014

(65) Prior Publication Data
US 2014/0259441 A1    Sep. 18, 2014

Related U.S. Application Data

(60) Provisional application No. 61/793,369, filed on Mar. 15, 2013, provisional application No. 61/822,750, filed on May 13, 2013.

(51) Int. Cl.
    *D06F 35/00*    (2006.01)
    *D06F 39/00*    (2006.01)
    (Continued)

(52) U.S. Cl.
    CPC ............ *D06F 35/006* (2013.01); *C11D 1/835* (2013.01); *C11D 3/0021* (2013.01);
    (Continued)

(58) Field of Classification Search
    CPC ........ D06F 35/006; D06F 33/02; D06F 39/02; D06F 39/008; C11D 3/0021
    USPC ......... 8/158, 159, 137, 149.3, 115.51, 149.1, 8/618, 102; 68/17 R, 12.02, 207, 12.04, 68/12.12, 58, 12.19, 12.18, 23.5, 5 R; 134/18, 56 R, 104.1, 109, 11
    See application file for complete search history.

(56) References Cited

U.S. PATENT DOCUMENTS 2,449,634 A    9/1948 Baade
2,984,094 A    5/1961 Belaieff
(Continued)

FOREIGN PATENT DOCUMENTS

CA    2387385 A1    4/2001
CN    201313996 Y    9/2009
(Continued)

OTHER PUBLICATIONS

ThermoScientitic website, 2016.
(Continued)

*Primary Examiner* — David G Cormier
*Assistant Examiner* — Thomas Bucci

(57) ABSTRACT

A reduced dye transfer cycle of operation for a laundry treating appliance having a treating for receiving laundry for treatment includes a treating chemistry application phase where a treating chemistry is supplied to the treating chamber, the treating chemistry including at least one water soluble cationic dye absorber, a surfactant system, and an emulsifier.

12 Claims, 37 Drawing Sheets

(51) Int. Cl.
*D06F 39/02* (2006.01)
*D06M 13/395* (2006.01)
*D06M 13/402* (2006.01)
*D06F 33/02* (2006.01)
*D06F 39/08* (2006.01)
*C11D 3/00* (2006.01)
*G05B 15/02* (2006.01)
*C11D 1/835* (2006.01)
*C11D 11/00* (2006.01)
*C11D 1/62* (2006.01)
*C11D 1/72* (2006.01)

(52) U.S. Cl.
CPC .......... *C11D 11/0017* (2013.01); *D06F 33/02* (2013.01); *D06F 35/005* (2013.01); *D06F 39/004* (2013.01); *D06F 39/007* (2013.01); *D06F 39/02* (2013.01); *D06F 39/022* (2013.01); *D06F 39/083* (2013.01); *D06F 39/088* (2013.01); *D06M 13/395* (2013.01); *D06M 13/402* (2013.01); *G05B 15/02* (2013.01); *C11D 1/62* (2013.01); *C11D 1/72* (2013.01); *D06F 2202/02* (2013.01); *D06F 2202/065* (2013.01); *D06F 2202/10* (2013.01); *D06F 2204/02* (2013.01); *D06F 2204/06* (2013.01); *D06F 2204/088* (2013.01)

(56) References Cited

U.S. PATENT DOCUMENTS

| | | | |
|---|---|---|---|
| 3,771,955 A * | 11/1973 | Jones | D06L 1/06 8/562 |
| 4,054,412 A | 10/1977 | Brummett et al. | |
| 4,118,957 A | 10/1978 | Marcussen | |
| 4,168,615 A | 9/1979 | Condit | |
| 4,207,683 A * | 6/1980 | Horton | D06F 58/203 134/163 |
| 4,228,042 A * | 10/1980 | Letton | C11D 1/62 510/295 |
| 4,228,044 A | 10/1980 | Cambre | |
| 4,233,167 A | 11/1980 | Sramek | |
| 4,239,659 A | 12/1980 | Murphy | |
| 4,260,529 A | 4/1981 | Letton | |
| 4,261,869 A | 4/1981 | Bishop et al. | |
| 4,380,453 A | 4/1983 | Claiborne | |
| 4,406,028 A | 9/1983 | Hazan et al. | |
| 4,478,059 A | 10/1984 | Yates | |
| 4,489,455 A * | 12/1984 | Spendel | C11D 11/0017 510/306 |
| 4,733,798 A | 3/1988 | Brady et al. | |
| 4,756,849 A | 7/1988 | Weber et al. | |
| 4,986,093 A | 1/1991 | Pastryk et al. | |
| 4,987,627 A | 1/1991 | Cur et al. | |
| 5,042,276 A | 8/1991 | Kamano et al. | |
| 5,122,157 A | 6/1992 | Dubreaux et al. | |
| 5,246,467 A * | 9/1993 | Cockett | B01D 15/00 8/543 |
| 5,249,441 A | 10/1993 | Pastryk et al. | |
| 5,271,116 A | 12/1993 | Williams et al. | |
| 5,390,385 A | 2/1995 | Beldham | |
| 5,444,996 A | 8/1995 | Joslin et al. | |
| 5,466,802 A * | 11/1995 | Panandiker | C11D 1/86 510/261 |
| 5,562,780 A * | 10/1996 | Bunczk | C11D 3/485 134/22.16 |
| 5,576,282 A * | 11/1996 | Miracle | C07D 217/10 252/186.38 |
| 5,633,225 A * | 5/1997 | Fredj | C11D 3/0021 510/475 |
| 5,669,250 A | 9/1997 | Dausch et al. | |
| 5,698,476 A | 12/1997 | Johnson et al. | |
| 5,707,951 A * | 1/1998 | Masschelein | C11D 3/0021 510/320 |
| 5,767,062 A * | 6/1998 | Trinh | C11D 1/62 510/516 |
| 5,804,219 A | 9/1998 | Trinh et al. | |
| 5,869,442 A * | 2/1999 | Srinivas | C11D 1/008 510/476 |
| 5,912,221 A * | 6/1999 | Van Leeuwen | C11D 3/3792 510/309 |
| 5,932,253 A | 8/1999 | Trinh et al. | |
| 6,058,743 A | 5/2000 | Fuji et al. | |
| 6,083,901 A * | 7/2000 | Perry | A61K 8/585 512/2 |
| 6,133,224 A * | 10/2000 | Angell | C11D 3/0021 510/360 |
| 6,134,925 A | 10/2000 | Fujii et al. | |
| 6,270,754 B1 | 8/2001 | Zhou et al. | |
| 6,492,322 B1 | 12/2002 | Cooper et al. | |
| 6,557,199 B2 | 5/2003 | Vande Haar | |
| 6,591,439 B2 | 7/2003 | Whah et al. | |
| 6,602,845 B2 | 8/2003 | Connor et al. | |
| 6,627,591 B2 * | 9/2003 | Kuzmenka | C11D 1/66 510/276 |
| 6,691,536 B2 * | 2/2004 | Severns | B01J 20/28033 68/12.27 |
| 6,726,731 B2 * | 4/2004 | Pettifer | C11D 1/38 8/524 |
| 6,746,617 B2 * | 6/2004 | Radomyselski | C11D 3/162 252/8.91 |
| 6,790,819 B2 * | 9/2004 | Trinh | C11D 3/222 510/276 |
| 6,811,811 B2 | 11/2004 | Gerald France et al. | |
| 6,840,069 B2 * | 1/2005 | France | B01D 15/00 68/12.02 |
| 6,846,797 B1 * | 1/2005 | Parker | C11D 3/001 510/276 |
| 6,855,173 B2 * | 2/2005 | Ehrnsperger | B01D 15/00 210/663 |
| 6,884,767 B1 | 4/2005 | Frankenbach et al. | |
| 6,894,017 B2 * | 5/2005 | Brouwn | C11D 3/0021 510/276 |
| 6,916,774 B2 | 7/2005 | Trinh et al. | |
| 6,930,079 B2 * | 8/2005 | Deak | B01D 15/00 134/10 |
| 6,966,696 B1 | 11/2005 | Curry et al. | |
| 6,995,124 B1 * | 2/2006 | Wernicke | C11D 1/65 383/101 |
| 6,995,131 B1 | 2/2006 | Frankenbach et al. | |
| 7,012,053 B1 * | 3/2006 | Barnabas | C11D 3/221 510/101 |
| 7,018,974 B2 | 3/2006 | Frankenbach et al. | |
| 7,041,793 B2 | 5/2006 | Davis et al. | |
| 7,056,877 B2 | 6/2006 | Caswell et al. | |
| 7,113,280 B2 | 9/2006 | Oon et al. | |
| 7,174,227 B2 | 2/2007 | Kobayashi et al. | |
| 7,326,676 B2 * | 2/2008 | Delplancke | C11D 3/0021 510/276 |
| 7,326,677 B2 * | 2/2008 | Delplancke | C11D 3/0021 510/276 |
| 7,335,630 B2 * | 2/2008 | Delplancke | C11D 3/0015 510/276 |
| 7,340,849 B2 | 3/2008 | Kim | |
| 7,476,258 B2 * | 1/2009 | Birker | D06F 35/006 8/137 |
| 7,550,746 B2 | 6/2009 | Tokhtuev et al. | |
| 7,574,269 B2 | 8/2009 | Cenedese et al. | |
| 7,652,267 B2 | 1/2010 | Tokhtuev et al. | |
| 7,658,088 B2 | 2/2010 | Walker et al. | |
| 7,665,227 B2 | 2/2010 | Wright et al. | |
| 7,666,828 B2 | 2/2010 | Bernhardt et al. | |
| 7,703,306 B2 | 4/2010 | Shaffer | |
| 7,735,239 B2 | 6/2010 | Jeong et al. | |
| 7,765,628 B2 | 8/2010 | Wong et al. | |
| 7,904,985 B2 | 3/2011 | Hendrickson et al. | |
| 7,921,578 B2 * | 4/2011 | McAllister | D06F 35/00 134/10 |

(56) References Cited

U.S. PATENT DOCUMENTS

| | | | |
|---|---|---|---|
| 7,930,785 B2* | 4/2011 | Cho | D06F 35/005 68/12.02 |
| 7,934,281 B2 | 5/2011 | Bernardino et al. | |
| 8,038,729 B2 | 10/2011 | Hodge et al. | |
| 8,047,024 B2 | 11/2011 | Yusuf et al. | |
| 8,084,756 B2 | 12/2011 | Tokhtuev et al. | |
| 8,108,063 B2 | 1/2012 | Agrawal et al. | |
| 8,117,703 B2 | 2/2012 | Walker et al. | |
| 8,148,315 B2 | 4/2012 | Baker et al. | |
| 8,166,590 B2 | 5/2012 | Ashrafzadeh et al. | |
| 8,176,798 B2 | 5/2012 | Ashrafzadeh et al. | |
| 8,193,141 B2* | 6/2012 | Corona, III | C11D 3/0021 510/298 |
| 8,196,441 B2 | 6/2012 | Hendrickson et al. | |
| 8,215,134 B2 | 7/2012 | Ashrafzadeh et al. | |
| 8,245,415 B2* | 8/2012 | Bellinger | D06F 58/28 34/389 |
| 8,263,541 B2 | 9/2012 | Penninger et al. | |
| 8,381,342 B2 | 2/2013 | Pollett | |
| 8,381,569 B2 | 2/2013 | Lilie et al. | |
| 8,388,695 B2 | 3/2013 | Hendrickson et al. | |
| 8,397,328 B2 | 3/2013 | Hendrickson et al. | |
| 8,397,544 B2 | 3/2013 | Hendrickson | |
| 8,438,881 B2 | 5/2013 | Ihne et al. | |
| 8,549,770 B2* | 10/2013 | Bellinger | D06F 58/28 34/486 |
| 8,713,736 B2* | 5/2014 | Cho | D06F 35/006 68/12.19 |
| 8,997,290 B2* | 4/2015 | Kim | D06F 35/006 8/159 |
| 9,145,637 B2* | 9/2015 | Bae | D06F 58/203 |
| 2002/0055449 A1* | 5/2002 | Porta | C11D 3/0021 510/295 |
| 2002/0193280 A1* | 12/2002 | Lang | C11D 3/0021 510/499 |
| 2003/0008799 A1 | 1/2003 | Barnabas et al. | |
| 2003/0089139 A1 | 5/2003 | Orszulik | |
| 2003/0191034 A1 | 10/2003 | Woo et al. | |
| 2004/0019975 A1 | 2/2004 | Oakes et al. | |
| 2004/0147416 A1 | 7/2004 | Woo et al. | |
| 2004/0226106 A1* | 11/2004 | Gardner | B01D 17/0202 8/142 |
| 2004/0261194 A1* | 12/2004 | Price | C11D 3/0015 8/137 |
| 2005/0000031 A1 | 1/2005 | Price et al. | |
| 2005/0009720 A1* | 1/2005 | Delplancke | C11D 3/0021 510/336 |
| 2005/0022319 A1* | 2/2005 | Kim | D06F 39/003 8/159 |
| 2005/0144735 A1* | 7/2005 | Yang | D06F 35/006 8/149.3 |
| 2005/0229327 A1* | 10/2005 | Casella | C11D 3/0015 8/115.51 |
| 2005/0262645 A1* | 12/2005 | Yang | D06F 25/00 8/159 |
| 2006/0021150 A1 | 2/2006 | Hu et al. | |
| 2006/0078507 A1 | 4/2006 | Gringore et al. | |
| 2006/0191076 A1* | 8/2006 | Bonfa | C11D 3/0052 8/148 |
| 2007/0056119 A1 | 3/2007 | Gardner et al. | |
| 2007/0084000 A1 | 4/2007 | Bernardino et al. | |
| 2007/0107138 A1 | 5/2007 | Bernardino et al. | |
| 2007/0163055 A1* | 7/2007 | Delplancke | C11D 3/001 8/115.51 |
| 2007/0163094 A1* | 7/2007 | Wright | D06F 58/203 28/100 |
| 2007/0277327 A1 | 12/2007 | Wessling et al. | |
| 2007/0283507 A1 | 12/2007 | Wong et al. | |
| 2007/0283508 A1 | 12/2007 | Wong et al. | |
| 2007/0299545 A1* | 12/2007 | Agrawal | D06F 39/004 700/12 |
| 2008/0003904 A1* | 1/2008 | Agrawal | D06F 35/006 442/121 |
| 2008/0034511 A1* | 2/2008 | Batchelor | C11D 3/40 8/675 |
| 2008/0096789 A1* | 4/2008 | Batchelor | C11D 3/40 510/513 |
| 2008/0115294 A1* | 5/2008 | Schaub | D06F 35/005 8/158 |
| 2008/0234165 A1* | 9/2008 | Panandiker | C11D 1/06 510/299 |
| 2008/0276655 A1* | 11/2008 | Luckman | D06F 33/02 68/12.12 |
| 2008/0276964 A1* | 11/2008 | Hendrickson | D06F 35/005 134/18 |
| 2008/0276965 A1* | 11/2008 | Aykroyd | D06F 33/02 134/18 |
| 2008/0276966 A1* | 11/2008 | Yusuf | D06F 33/02 134/18 |
| 2008/0276972 A1* | 11/2008 | Luckman | D06F 35/006 134/33 |
| 2008/0307667 A1* | 12/2008 | Ikemizu | D06F 35/008 34/132 |
| 2009/0069207 A1 | 3/2009 | Panandiker et al. | |
| 2009/0113755 A1* | 5/2009 | Choi | D06F 58/203 34/390 |
| 2009/0178212 A1* | 7/2009 | Wahl | D06M 15/03 8/441 |
| 2009/0186798 A1* | 7/2009 | Baston | C11D 3/0021 510/360 |
| 2009/0293203 A1 | 12/2009 | Hettinger et al. | |
| 2009/0320213 A1* | 12/2009 | Lee | A47L 15/4234 8/159 |
| 2010/0000024 A1* | 1/2010 | Hendrickson | D06F 33/02 8/137 |
| 2010/0000114 A1* | 1/2010 | Dalton | D06F 58/203 34/389 |
| 2010/0000264 A1 | 1/2010 | Luckman et al. | |
| 2010/0000265 A1* | 1/2010 | Hendrickson | D06F 33/02 68/12.18 |
| 2010/0000573 A1* | 1/2010 | Hendrickson | D06F 33/02 134/18 |
| 2010/0000581 A1 | 1/2010 | Doyle et al. | |
| 2010/0011511 A1* | 1/2010 | Baltsen | C11D 3/0094 8/137 |
| 2010/0126493 A1 | 5/2010 | Gokceimam et al. | |
| 2010/0154131 A1 | 6/2010 | Paul et al. | |
| 2010/0242186 A1 | 9/2010 | Kim et al. | |
| 2011/0016928 A1 | 1/2011 | Beihoff et al. | |
| 2011/0023321 A1 | 2/2011 | Jung | |
| 2011/0047717 A1 | 3/2011 | Cho et al. | |
| 2011/0138541 A1* | 6/2011 | Brockman | D06F 35/00 8/137 |
| 2011/0138543 A1 | 6/2011 | Cavalli et al. | |
| 2011/0209293 A1* | 9/2011 | Ghosh | D06F 35/00 8/142 |
| 2011/0247148 A1 | 10/2011 | Chanda et al. | |
| 2012/0074224 A1* | 3/2012 | Dunsbergen | D06F 39/02 235/454 |
| 2012/0128747 A1* | 5/2012 | Veronique | B01J 13/18 424/401 |
| 2012/0144601 A1* | 6/2012 | Ghosh | D06F 25/00 8/137 |
| 2012/0144689 A1* | 6/2012 | Ghosh | D06F 58/203 34/389 |
| 2012/0174631 A1 | 7/2012 | Cho et al. | |
| 2013/0000141 A1 | 1/2013 | Ghosh et al. | |
| 2013/0003904 A1 | 1/2013 | Elenes et al. | |
| 2013/0026046 A1 | 1/2013 | Sanville et al. | |
| 2013/0036775 A1* | 2/2013 | Brueckner | D06F 39/022 68/17 R |
| 2013/0086754 A1 | 4/2013 | Hendrickson et al. | |
| 2013/0118531 A1* | 5/2013 | Dobrawa | B08B 3/04 134/26 |
| 2013/0210693 A1 | 8/2013 | Lambert et al. | |
| 2013/0214797 A1 | 8/2013 | Gruden | |

(56) References Cited

U.S. PATENT DOCUMENTS

| | | | |
|---|---|---|---|
| 2013/0247307 A1 | 9/2013 | Park et al. | |
| 2013/0327364 A1* | 12/2013 | Delbrassinne | C11D 3/0026 134/26 |

FOREIGN PATENT DOCUMENTS

| | | | | |
|---|---|---|---|---|
| CN | 202265714 U | 6/2012 | | |
| DE | 102010027994 A1 | 10/2011 | | |
| EP | 0240266 A2 | 10/1987 | | |
| EP | 0462806 A2 * | 12/1991 | | C11D 3/0021 |
| EP | 0462806 A2 | 12/1991 | | |
| EP | 0668902 B1 | 3/1997 | | |
| EP | 1505193 A2 | 2/2005 | | |
| EP | 1290268 B1 | 8/2007 | | |
| EP | 1990461 A2 * | 11/2008 | | D06F 33/02 |
| EP | 1990461 A2 | 11/2008 | | |
| EP | 2085461 A1 | 8/2009 | | |
| EP | 2094893 B1 | 9/2011 | | |
| EP | 2468950 A1 | 6/2012 | | |
| EP | 2540896 A1 | 1/2013 | | |
| EP | 2297288 B1 | 5/2013 | | |
| FR | 2795103 A1 | 12/2000 | | |
| FR | 2898609 A1 | 9/2007 | | |
| GB | 1348212 | 3/1974 | | |
| JP | 5277278 | 10/1993 | | |
| JP | 6285293 | 10/1994 | | |
| JP | 9299691 | 11/1997 | | |
| JP | 2003236295 A | 8/2003 | | |
| JP | 3539173 B2 | 7/2004 | | |
| KR | 20050108616 A | 11/2005 | | |
| KR | 20060023782 A | 3/2006 | | |
| WO | 97/42291 A1 | 11/1997 | | |
| WO | 98/53034 A1 | 11/1998 | | |
| WO | 0134743 A1 | 5/2001 | | |
| WO | 0250228 A1 | 6/2002 | | |
| WO | 2009040174 A1 | 4/2009 | | |
| WO | 2011128680 A2 | 10/2011 | | |
| WO | 2011157505 A1 | 12/2011 | | |
| WO | 2012089605 A1 | 7/2012 | | |
| WO | 13026232 A1 | 2/2013 | | |

OTHER PUBLICATIONS

Difference between Spectrometer and Spectrophotometer, Wiki 2013.

German Search Report for Counterpart DE102014102239.4, dated Oct. 23, 2014.

German Search Report for Counterpart DE102014102237.8, dated Oct. 23, 2014.

German Search Report for Counterpart DE102014102238.6, dated Oct. 23, 2014.

European Search Report for Counterpart EP14168158.5, dated Oct. 23, 2014.

European Search Report for Counterpart EP12178331.0, dated Jan. 30, 2013.

* cited by examiner

METHODS AND COMPOSITIONS FOR TREATING LAUNDRY ITEMS

CROSS-REFERENCE TO RELATED APPLICATIONS

This application claims the benefit of U.S. Provisional Patent Application No. 61/793,369, filed Mar. 15, 2013, and U.S. Provisional Patent Application No. 61/822,750, filed May 13, 2013, which are both incorporated herein by reference in their entirety.

BACKGROUND

Fabric items such as clothing, towels, bedding, etc. can be colored using a variety of different dyes and dyeing processes. In a residential setting, caring for these dyed fabric items may present consumers with several challenges. Some dyed fabric items may have excess or loose dye that can wash off during a normal wash cycle in a clothes washer and redeposit on other items in the laundry load or bleed onto differently dyed areas of the same item, for example. Excess or loose dyes may also rub off onto the consumer or other surfaces during wear or use. Sorting the laundry items before washing into loads of "like color" or washing items separately may address some dye transfer concerns, but can by time consuming and inefficient for the user. In addition, mistakes in sorting loads can lead to dye transfer which cannot be easily removed, potentially ruining the item.

BRIEF SUMMARY

According to one embodiment, a method of operating a laundry treating appliance having a treating chamber for receiving laundry for treatment includes a treating chemistry application phase where a treating chemistry is supplied to the treating chamber along with water to form a laundry treating solution. The treating chemistry can include at least one water soluble cationic dye absorber, a surfactant system comprising at least one surfactant, and an emulsifier comprising particulates. The method further includes a dye dispersion phase where a Pickering emulsion is formed by the interaction of the particulates with dye present in the laundry treating solution to disperse the dye within the laundry treating solution. A rinse phase follows the treating chemistry application phase, where rinse liquid is supplied to the treating chamber to rinse the laundry of the treating chemistry.

DETAILED DESCRIPTION

Figure 1:
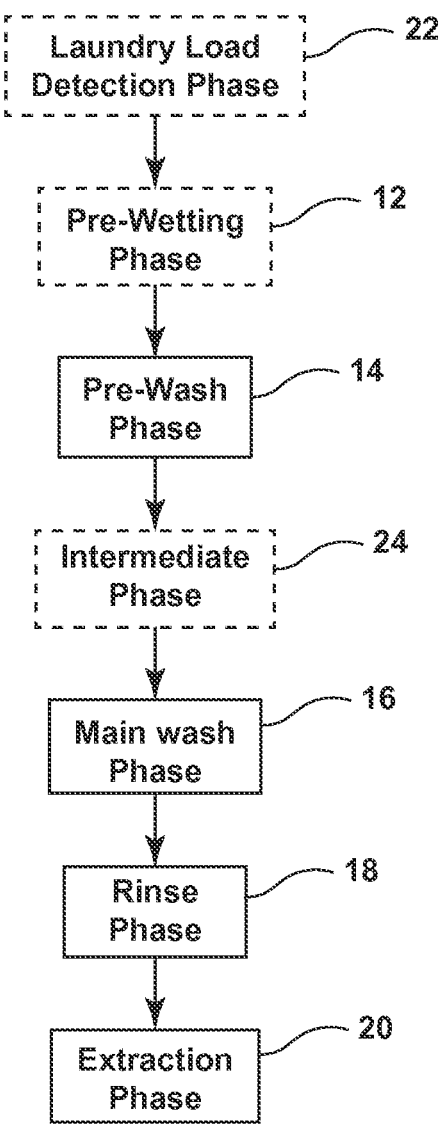
FIG. 1 is a flow chart illustrating a wash cycle for inhibiting dye transfer according to an embodiment of the invention.

The embodiments of the invention relate to methods and compositions for inhibiting undesired dye transfer between fabric items of a laundry load during treatment in a laundry treating appliance. As used herein, dye transfer is used to refer to the broader phenomenon of the transfer of a dye from one area of a fabric item to an adjacent area of the same fabric item that is not dyed with the transferring dye and/or a different fabric item or surface. Dye transfer may occur through direct physical contact between the dyed item and another surface or as a result of the dye moving away from the fabric surface and into solution with a solvent in contact with the fabric surface. Once the dye has distributed into solution (through suspension, dispersion or solubilization), the dye may deposit onto other surfaces, including other fabric items, also in contact with the solution. Dye bleeding is another term of art which, as used herein, refers to the partitioning of a dye from the surface of a fabric into solution or onto a differently dyed area of the same fabric. Dye transfer, as used herein, is meant to be generic to all manner in which dye may move between fabric items or within the same fabric item. In that sense, dye bleeding is one type of dye transfer. As used herein, partition is used as the general term to encompass several phenomena including the distribution of a substance between two immiscible or slightly immiscible phases based on the relative solubility of the substance within the two phases and the sorption and desorption of a substance between a solid phase and a surrounding medium or between two solid phases. The term sorption refers to either absorption in which a substance distributes within the solid phase or adsorption, the process by which a substance distributes at the surface of a solid phase.

Dye transfer between fabric items during laundering in a residential setting may ruin items in the laundry load to the dissatisfaction of the consumer. One manner in which dye transfer during a laundry treating cycle of operation in a clothes washer has been addressed is by separating or sorting laundry loads based on the color of the items to be washed. For example, typically, clothes washers and laundry detergents instruct consumers to sort loads and wash items with "like colors," and consumers may further be instructed to sort laundry into a jeans load, a whites load and a darks load. Sorting laundry in this manner may be cumbersome for the consumer and a mistake during sorting, such as accidentally washing a red sock with a load of whites, may result in undesirable dye transfer between the red sock and the whites, effectively ruining the whites for the consumer. In addition, sorting loads may be inefficient as a consumer either has to wait until enough items of a single type are ready for laundering or run multiple cycles with smaller loads as items become ready for laundering, with the latter typically leading to more overall water and energy usage.

Textile producers have developed procedures and chemistries for addressing dye bleeding and wash fastness of colors during manufacturing that may address dye transfer issues in the subsequent use of the textile and care of the fabric item made from the dyed textile. For example, additional washes and rinses can be included in the dyeing process by the fabric maker to remove excess or loosely bound dyes from the fabric. In addition, certain treating chemistries may be added to the washes and rinses to facilitate removal of excess or loose dyes from the fabric. The dyed fabric can also be treated with a fabric finish to minimize dye bleeding and increase wash fastness. However, the use and quality of the processes used by different manufacturers can vary significantly. In a residential setting, when a consumer loads a clothes washer for a laundry cycle, the consumer usually has no way of knowing whether or not the laundry items have been treated to minimize dye transfer during a laundry cycle and what the risks of dye transfer are.

In an industrial setting the variables of fabric type, dye, and uniformity of material are known, controlled variables that may be used to determine what processes to implement to minimize dye bleeding. In a residential setting, these variables are typically not known and/or controllable. A consumer-loaded clothes washer is not a controlled setting: the load is likely to be mixture of different fabrics and or colors, with the exact make-up unknown to the washer. A single garment may have multiple different fabric types and/or dyes. A consumer may sort the laundry load based on color, but mix different fabric types, or sort the load based on fabric type, but different dyes may be present. A consumer is further unlikely to be aware of whether dye transfer is an issue of concern or whether the items of the laundry load have been treated so as to minimize dye transfer or the quality of such treatments. Thus, both the design and implementation of processes and chemistries for minimizing dye transfer in a residential setting faces many challenges that are not relevant to an industrial setting.

The methods and chemistries described herein are provided for facilitating laundering of mixed or unsorted loads of laundry, i.e. loads that include multiple dye types and/or fabrics, including different fiber types, fabric construction and fabric finishes, in a domestic clothes washer and clothes dryer. The methods and chemistries described herein may be used to inhibit dye transfer from one fabric item to another fabric item during a laundry cycle such that unsorted loads may be laundered with minimal or no dye transfer between items. Inhibiting dye transfer may include inhibiting partitioning of the dye away from the fabric surface and/or inhibiting redistribution of the dye onto another fabric surface. In addition, the methods and chemistries described herein may also minimize dye transfer from one fabric item to another surface which may come into contact with the fabric item. It will be understood that unless stated to the contrary, the methods and chemistries described herein may be utilized interchangeably even when not explicitly described as such.

A brief description of the types of chemistries that may be used to facilitate inhibiting dye transfer and the more commonly used types of dyes may be useful here.

As used herein a dye transfer inhibitor or dye transfer inhibiting agent is used to refer to any substance that inhibits dye transfer. The two main groups of dye inhibitors include dye absorbers and dye fixatives. Dye fixatives are generally molecules that preferentially partition from solution onto a fabric surface. Most fixatives are high molecular weight polymers having repeating monomers of either a cationic or anionic functional group so as to aid in favorable partition onto fabrics through favorable electrostatic interactions at multiple regions within a fixative molecule and charged (ionizable) fibers and because large molecules have entropic restraints which inhibit large molecules from remaining dissolved in an aqueous solution. Dye fixatives may interact with the fabric surface and form a polymeric film or layer that inhibits dyes from partitioning away from the fabric surface into solution.

Dye absorbers are generally molecules that preferentially interact with dye molecules either through electrostatic interactions or hydrophobic forces (e.g. micelle formation) to attract dye molecules and suspend the dye molecules in aqueous solution, thus inhibiting transfer of the dye molecules to another fabric surface. Because most ionic dyes are anionic in nature, dye absorbers that work through electrostatic interactions are designed to be cationic in nature in their active state—typically molecules comprising quaternary or polyamine groups or aromatic pyridine groups. Typically these cationic polymers are smaller in molecular size compared to dye fixatives to allow them to remain suspended in solution. In addition, surfactants above the critical micelle concentration (CMC) may self-assemble into a micelle structure having a hydrophobic core which can act as a dye absorber by trapping and suspending dye in solution. While surfactant micelles generally work as dye absorbers for all dye types, they are one of the few dye absorbers that complex and suspend nonionic disperse dyes. Dye absorbers can also be from the group of molecules that form host-guest complexes with hydrophobic molecules, such as cyclodextrin, for example. In general, once the dye absorbers interact with the dye molecules, the dye absorber-dye molecule complex remains suspended in solution. In addition to complexing with dyes in solution, dye absorbers may also preferentially remove loosely held dyes from fabric surfaces and keep them suspended in solution.

There are several different types of dyes that are commonly used in dyeing clothing and other laundry items that vary depending on the type of fiber being dyed. Vat and sulfur dyes are non-polar, water insoluble pigments with no affinity towards the fabric fiber, and are commonly used in dyeing jeans and towels. Vatting is a process by which the solubilized dye enters the cotton and viscose fibers of the fabric and subsequent oxidation causes the dye to become insoluble in water. Indigo is one of the most common vat dyes currently used. Vat dyes may present the consumer with several challenges in caring for items dyed with vat dyes. Improper treatment by the textile manufacturer, such as failure to remove excess or free dye or improper oxidation, which may result in dyes that are not fixed to the fabric, may lead to dye transfer in the form of run-off or bleeding of the dye during washing or when wetted and may also result in poor rubbing fastness (i.e. dye may transfer to other surfaces, such as other clothing, furniture or the consumer that the dyed fabric comes into contact with). In addition, washing of the fabric at high alkalinity may promote removal of dye from the fabric. Sulfur dyes are another example of vat dyes in which the dye is solubilized, in this example by reduction in sodium sulfide, and subsequent oxidation renders the sulfur dye insoluble. Sulfur black is an example of commonly used vat dye. Loose vat dyes would be dyes that are either unoxidized or present on the surface of the fabrics. Unoxidized vat dyes are anionic in nature and typically easily partition from cotton fabrics into an aqueous solution based on their small size and polar nature.

Disperse dyes are neutral dyes and are typically used for dyeing polyester and acetate fabrics. Disperse dyes are slightly water soluble dyes that diffuse from solution into the fibers and remain preferentially dispersed within the fibers due to hydrophobic interactions between the fibers and the dye. Dispersing agents are utilized to facilitate dispersion of the dye in the dye bath for dyeing the fabric. In general, and all else being equal, the greater the molecular weight of the disperse dye, the higher the wash or color fastness of the dye. As used herein, the term wash fastness is a descriptive term that refers to the extent to which a dye is retained by the fabric during treatment of the dyed fabric in a clothes washer. For example, a high degree of wash fastness refers to a dye that is primarily retained by the fabric and does not bleed or otherwise transfer during treatment in the clothes washer; a low degree or no wash fastness refers to a dye that is not retained by the fabric and bleeds or otherwise transfers during treatment. Typically, only excess or over-dyed fabric presents a dye bleeding challenge during treatment in a clothes washer. In the case of polyester, only excess dye molecules that are not associated with the fabric fibers present a potential dye bleeding problem because the rest of the dye molecules are locked within the polyester matrix of the fabric, at least below the glass transition temperature of the polyester. A loose disperse dye is typically a dye that has not entered the crystalline matrix of the polyester.

Direct dyes are anionic dyes that typically include a sulfonate group and are used to dye cotton fibers. Direct dyes interact with cotton fibers primarily through cumulative London or van der Waal's dispersion forces and hydrophobic forces. Cotton dyed with direct dyes are often treated with post-processing techniques such as treatment with a dye fixative or treatment to remove loosely attached dye to address dye bleeding and wash fastness. The anionic (e.g. sulfonate) group of direct dyes has a small cationic counterion (typically sodium) and if dye exhaustion is not done well, the sodium ion can dissociate from the dye in an aqueous wash solution, resulting in the direct dye being deprotonated and hence hydrophilic, which can lead to bleeding in an aqueous wash liquor. In addition, certain types of surfactants may interrupt the interaction between the cotton fibers and the dye molecules, which may lead to an increase in dye bleeding. In addition, because the interaction between direct dyes and cotton is based on non-permanent, weak molecular interactions, water and mechanical action may also increase dye bleeding. Loose direct dyes are typically dyes that are not exhausted well with NaCl (suggesting there are dissociable Na counter-ions left) or not rinsed off well.

Acid dyes are anionic dyes that include a sulfonate group, similar to direct dyes, but are typically smaller than direct dyes. Acid dyes are usually used to dye nylon, wool and silk fibers, with the negatively charged sulfonate group of the dye interacting with the positively charged amide in the nylon at a low pH where the amide group in nylon is in a protonated form. Typically, nylon is heated above its glass transition temperature (about 40° C. for Nylon 6.6.) to promote penetration of the acid dye molecules into the fabric during dyeing. The nylon is cooled at the end of the dyeing process to lock the dyes within the nylon. Even though the interaction between the dye and the fiber is an electrostatic interaction, the crystalline nylon matrix may prevent dye bleeding of adhered dye molecules, even during a subsequent increase in pH (e.g. during laundering). However, there is the potential for over-dyeing of the nylon after the cationic nylon fiber sites are exhausted. In addition, dyed nylon may have lower wash fastness in the presence of certain surfactants, such as a linear alkylbenzene sulfonates (LAS), which has a similar sulfonate group to the dye molecules, and is more surface active than the acid dye and some other types of surfactants and thus may have a greater potential to displace loose dyes from the nylon surface. A loose acid dye is typically a dye that has not entered the crystalline matrix of the nylon.

Reactive dyes are dyes that covalently bond to fabric fibers through reactive sites on the fibers, the most common being cotton fibers. Once the dye molecule reacts with the cotton fiber, the dye is completely wash fast. However, during the dyeing process, competing reactions may result in hydrolysis of the dye molecule reactive group, leaving a dye molecule that may interact with and be carried by the cotton fibers, but is no longer capable of covalently bonding with the fibers. Failure to adequately remove un-reacted dyes from the cotton fiber matrix may result in loose dye molecules that may bleed in a subsequent laundry process.

Referring now to FIG. 1, an exemplary method for treating a laundry load according to a dye transfer inhibition wash cycle 10 is illustrated. While the methods described herein will be discussed in the context of a mixed load of laundry, i.e. an unsorted load of laundry that is not uniform in at least one of fabric type and fabric dye color, it will be understood that it is within the scope of the invention for the methods to also be used with sorted laundry loads. In addition, it will be understood that the sequence of steps depicted is for illustrative purposes only, and is not meant to limit the methods described herein in any way as it is understood that the steps may proceed in a different logical order, additional or intervening steps may be included, or described steps may be divided into multiple steps, without detracting from the invention. Furthermore, while the wash cycle 10 is described in the context of inhibiting dye transfer, it will be understood that individual phases of the wash cycle 10 and the additional methods described herein may also be used for additional purposes, such as facilitating distribution of a treating chemistry, for example.

As used herein, the term wash liquid refers to a combination of water and at least one treating chemistry for providing detergency to lift soils from the laundry, and may also include other treating chemistries. Laundry soils may refer to dirt, oils, and stains, such as may be caused by food, dyes, beverages, environmental soil, or bodily fluids, for example. The term rinse liquid or rinse water refers to any liquid used to rinse away a treating chemistry and may include water with one or more treating chemistries or just water. The wash liquid may be just water, in which case it may be referred to as a rinse water or water. The term treating liquid is a generic term that refers to a combination of water and at least one treating chemistry, which may refer to a wash liquid, a rinse liquid or any other liquid having at least one treating chemistry. The terms recirculated liquid and recirculated water refer to water or a combination of water and one or more treating agents that is pumped from a collection area and re-applied to the laundry, with or without the addition of additional water from the household water supply. As used herein, the term liquid is generic, and includes all types of liquid, including without limitation wash liquid, rinse liquid, rinse water, water, recirculated liquid, etc.

Supplying or applying liquid to the laundry may be done in any desired manner, such as, without limitation, directly and/or indirectly, and may be done as pouring, spraying or misting. The supplying of liquid will typically be into the treating chamber in which the laundry is located from a water supply or dispenser and/or supplying a water or a treating chemistry to a collection area from which the liquid is then pumped and either sprayed or misted into the treating chamber. In addition, when laundry is located within a rotatable drum within a tub, supplying or applying a liquid may also include supplying liquid to the tub and rotating the drum such that the laundry within the drum rotates through the liquid in the tub.

The dye transfer prevention wash cycle 10 may begin with an optional pre-wetting phase 12 in which the laundry may be pre-wetted with a liquid. A pre-wash phase 14 may include treating the laundry load with a treating chemistry, an exemplary embodiment of which includes a dye fixative. A main wash phase 16 may include washing the laundry with a detergent-based laundry composition and optionally treating the laundry with an additional treating chemistry, such as a dye absorber. At rinse phase 18 the laundry load may be treated with a fabric softener and additional dye absorber followed by an extraction phase at 20, which may include spinning the laundry at high speeds to remove extraneous liquid from the laundry load. The wash cycle 10 may also include an optional laundry load detection phase 22.

The pre-wetting phase 12 may include wetting the laundry load with a limited amount of liquid before applying a treating chemistry at 14. The liquid may be any treating liquid or water from the water supply without any additional substances added to the water. While the pre-wetting phase 12 is generally described in the context of pre-wetting with water without any additional substances added to the water by the clothes washer, it will be understood that the pre-wetting phase 12 may be implemented in a similar manner with a treating liquid including a treating chemistry.

The liquid may be applied to the laundry at a predetermined rate for a predetermined period of time while the laundry is being rotated within the treating chamber. Liquid may be added during the pre-wetting phase 12 to wet the laundry to promote distribution of the treating chemistry in the subsequent pre-wash phase 14 without adding too much liquid such that dye transfer occurs. In one example, the liquid supplied during the pre-wetting phase 12 may be just water; in another example, the liquid may include an emulsion to make the surface of the laundry hydrophobic to facilitate distribution of a subsequently supplied treating chemistry, such as a dye fixative. In addition, the pre-wetting phase 12 may be used in a similar manner to pre-wet the laundry prior to the main wash phase 16 if there is no pre-wash phase 14. If too much liquid is added, loose dye may partition into the liquid and may transfer to other items in the load as the liquid distributes through the load. If too much liquid is added, whether the laundry is saturated or not, the liquid with the loose dyes may also run off of one laundry item to another and effect dye transfer. Therefore, the pre-wetting phase 12 is not intended to saturate the laundry or have liquid run off. If the load is agitated or spun at too high of a speed, such as speeds corresponding to a force of 1 G for that particular drum, dye transfer could occur between laundry items.

In addition, while the laundry may be rotated or re-oriented during the pre-wetting phase 12 to distribute the liquid added during the pre-wetting phase 12, too much agitation of the laundry or spinning the laundry at too high of a speed may facilitate dye transfer between laundry items. While not meant to be limited by any theory, it is believed that pre-wetting the laundry with liquid prior to the application of the dye fixative may facilitate more uniform distribution of the dye fixative on the fabrics by lowering interfacial driving forces and reducing a rate of fabric penetration and/or a rate of attachment of the dye fixative. The pre-wetting may also facilitate the distribution of additional treating chemistries other than dye fixatives, such as a laundry detergent or fabric softener, for example.

During the pre-wetting phase 12, the dry laundry (i.e. laundry that has not been previously wet by the clothes washer during the present cycle of operation) may be wet with liquid while the laundry is rotating at a low speed, passing through a fogging or misting spray nozzle, as will be described in more detail below. Exemplary rotation speeds include 20-60 rpm, but preferably may be within the range of 20-30 rpm. As used herein, the terms mist and fog are interchangeable and refer to a phenomenon in which liquid is sprayed in droplets having a diameter and spray rate at which the droplets will be temporarily suspended in air until they collide or condense on a surface, coalesce to form water droplets that are too larger to remain suspended in air and fall due to gravity, or evaporate to form a vapor. The spray nozzle may be configured to spray the mist as fine droplets, on the order of 10 to 100 microns in diameter, which become suspended in air and remain suspended in air as the droplets slowly settle onto the laundry load. The spray nozzle may be configured to use very little liquid, for example, less than 500 mL/min., such that the mist that settles on the laundry is absorbed onto the surface of the laundry that it comes into contact with, but the volume of liquid is not such that the liquid "runs off" the laundry. The liquid may be sprayed onto the laundry during the pre-wetting phase 12 while the laundry is rotating at a similar speed to the speed the drum rotates during the pre-wash phase 14 such that generally the same areas of the laundry wet during the pre-wetting phase 12 may also be wet during the pre-wash phase 14. It has been found that wetting the laundry in this manner with very little liquid improves the distribution of a treating chemistry, such as a dye fixative, that may be supplied in the subsequent phase, such as the pre-wash phase 14, or the main wash phase 16 if there is not a pre-wash phase, by a measurable amount.

While the pre-wash phase 14 is described as being subsequent to the pre-wetting phase 12, it will be understood that the pre-wash phase 14 may occur contemporaneously with the pre-wetting phase, meaning the pre-wetting phase 12 and the pre-wash phase 14 may occur over the same period of time or at least partially overlap. In one example, the pre-wash phase 14 may be initiated at some delayed time after a start of the pre-wetting phase 12 such that the pre-wash phase 14 occurs during at least a portion of the same time as the pre-wetting phase 12. In another example, the pre-wetting phase 12 and pre-wash phase 14 may be alternately repeated two or more times before proceeding to the next phase in the cycle.

Figure 2A:
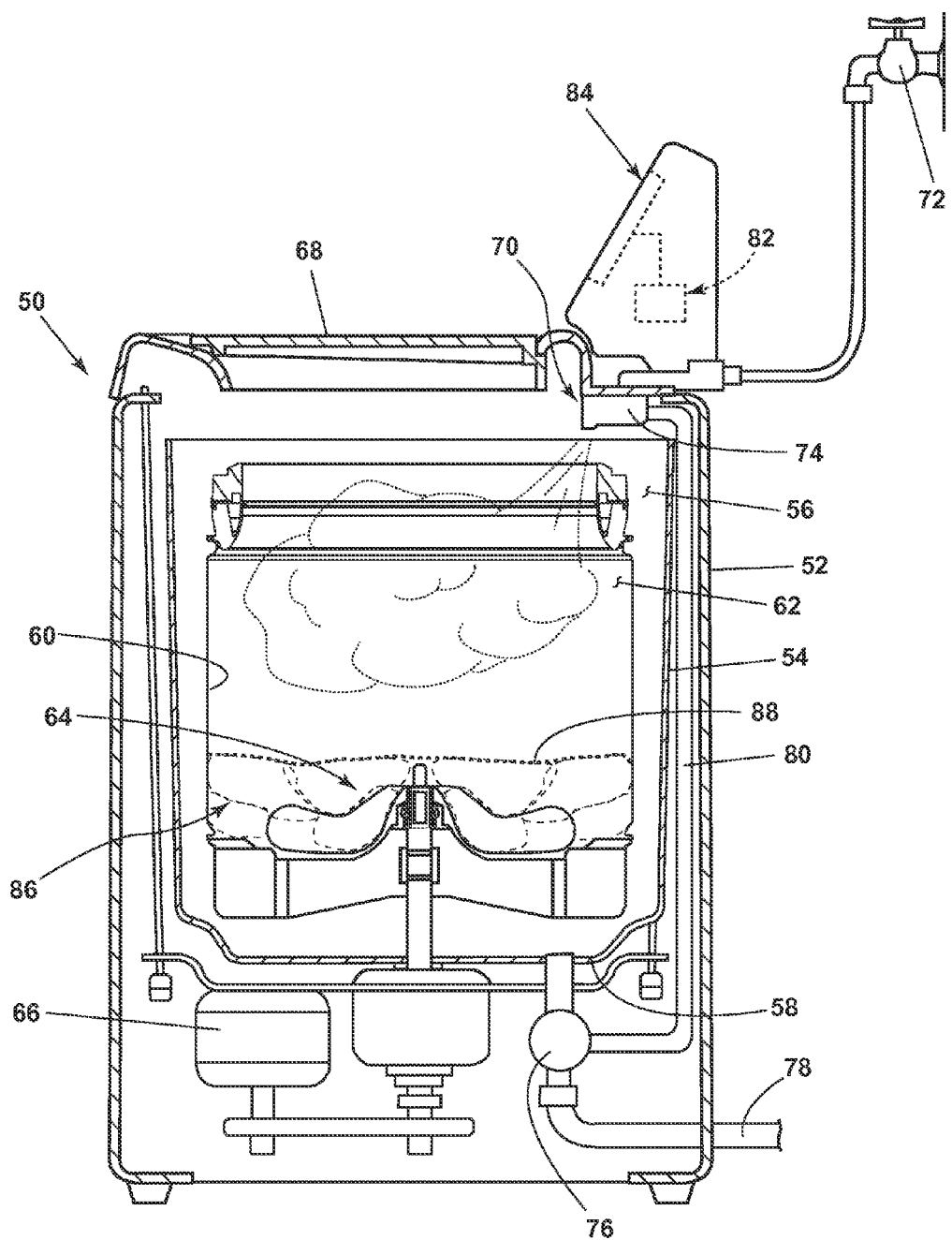
FIGS. 2A and 2B are cross-section, schematic side views of a vertical axis clothes washer according to an embodiment of the invention.

FIG. 2A illustrates a laundry treating appliance in the form of a vertical axis clothes washer 50 which may be used to implement a cycle of operation, such as the dye transfer prevention wash cycle 10. While the embodiments of the invention are described in the context of a clothes washer, it will be understood that many of the embodiments are applicable to any laundry treating appliance, such as a clothes dryer or combination clothes washer/dryer, for distributing a treating chemistry and inhibiting dye transfer.

The clothes washer 50 includes a cabinet or housing 52 and an imperforate tub 54 that defines an interior 56 of the washing machine 50. A sump 58 may be in fluid communication with the interior 56 of the tub 54. A perforated wash basket or drum 60 may be located within the interior 56 and rotatable relative to the tub 54 and may define a laundry treating chamber 62 for receiving a laundry load. Rotation of the drum 60 may be considered as rotation of any items located within the treating chamber 62. The drum 60 may include a plurality of perforations or apertures (not shown) such that liquid supplied to the drum 60 may flow through the perforations to the tub 54. An agitator or clothes mover 64 may be located within the laundry treating chamber 62 and rotatable relative to and/or with the drum 60. While the embodiments of the invention are described in the context of a clothes washer having a rotatable drum located within a tub, it will be understood that the embodiments may also be used in a clothes washer which has an imperforate drum without a tub.

The drum 60 and/or the clothes mover 64 may be driven by an electrical motor 66, which may or may not include a gear case, operably connected to the drum 60 and/or the clothes mover 64. The clothes mover 64 may be commonly oscillated or rotated about its axis of rotation during a cycle of operation in order to provide movement to the fabric load contained within the laundry treating chamber 62. The drum 60 may be rotated at high speed to centrifugally extract liquid from the fabric load and to discharge it from the drum 60. The top of the housing 52 may include a selectively openable lid 68 to provide access into the laundry treating chamber 62 through an open top of the drum 60.

Still referring to FIG. 2A, a spraying system 70 may be provided to spray liquid, such as water or a combination of water and one or more treating chemistries into the open top of the drum 60 and onto laundry placed within the laundry treating chamber 62. Non-limiting examples of treating chemistries that may be dispensed by the dispensing system during a cycle of operation include one or more of the following: water, surfactants, detergents, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, dye fixatives, dye absorbers, bleaches and combinations thereof.

The spraying system 70 may be coupled with a treating chemistry dispensing system (not shown) to supply the treating chemistry alone or mixed with water from the water supply 72 to the laundry. The dispensing system may include a dispenser which may be a single use dispenser, a bulk dispenser or a combination of a single and bulk dispenser. Non-limiting examples of suitable dispensers are disclosed in U.S. Pat. No. 8,196,441 to Hendrickson et al., issued Jun. 12, 2012, entitled "Household Cleaning Appliance with a Dispensing System Operable Between a Single Use Dispensing System and a Bulk Dispensing System," U.S. Pat. No. 8,388,695 to Hendrickson et al., issued Mar. 5, 2013, entitled "Apparatus and Method for Controlling Laundering Cycle by Sensing Wash Aid Concentration," U.S. Pat. No. 8,397,328 to Hendrickson et al., issued Mar. 19, 2013, entitled "Apparatus and Method for Controlling Concentration of Wash Aid in Wash Liquid," U.S. Pub. No. 2010/0000581 to Doyle et al., filed Jul. 1, 2008, now U.S. Pat. No. 8,813,526, issued Aug. 26, 2014, entitled "Water Flow Paths in a Household Cleaning Appliance with Single Use and Bulk Dispensing," U.S. Pub. No. 2010/0000264 to Luckman et al., filed Jul. 1, 2008, entitled "Method for Converting a Household Cleaning Appliance with a Non-Bulk Dispensing System to a Household Cleaning Appliance with a Bulk Dispensing System," U.S. Pat. No. 8,397,544 to Hendrickson, issued Mar. 19, 2013, entitled "Household Cleaning Appliance with a Single Water Flow Path for Both Non-Bulk and Bulk Dispensing," and U.S. Pat. No. 8,438,881, issued May 14, 2013, entitled "Method and Apparatus for Dispensing Treating Chemistry in a Laundry Treating Appliance," which are herein incorporated by reference in full.

The dispensing system may also include a system for determining information related to the treating chemistry supplied to the dispensing system and communicating the information with the controller 82. In one example, information related to the treating chemistry may be determined directly using one or more sensors, non-limiting examples of which include a chemical sensor, a pH sensor, or a UV/VIS absorbance or fluorescence sensor. In another example, information related to the treating chemistry may be carried by a container storing the treating chemistry that may be communicated wirelessly with the clothes washer controller 82 (e.g. through an RFID system) or through a hard-wire connection. In another example, the clothes washer may include an optical-based communication system, such as a bar code reader and bar code for communicating information related to the treating chemistry. Non-limiting examples of information related to the treating chemistry that may be supplied to the controller 82 include an identity or characteristic of the treating chemistry or one or more components of the treating chemistry; dosage information, such as concentration or amount; dispensing information, such as an amount, concentration, time to dispense, or a number of times to dispense; and cycle usage information, such as what cycle, phase or stage to dispense the treating chemistry. In yet another example, the user may enter information related to the treating chemistry using the user interface 84. The exact manner by which information related to the treating chemistry supplied to the dispensing system is provided to the controller 82 is not germane to the embodiments of the invention.

The spraying system 70 may be configured to supply water directly from a household water supply 72 and/or from the tub 54 and spray it onto the laundry through a sprayer 74. The spraying system 70 may also be configured to recirculate wash water from the tub 54, including the sump 58, and spray it onto the laundry. The spraying system 70 may also include additional sprayers and other components to supply liquid to one or more additional locations, such as a portion of the interior 56 between the drum 60 and the tub 54, an exterior surface of the drum 56, an interior surface of the drum 56 and an internal surface of the tub 54. The nature of the spraying system is not germane to the invention, and thus any suitable spraying system may be used with the laundry treating appliance 50.

A pump 76 may be housed below the tub 54. The pump 76 may have an inlet fluidly coupled to the sump 58 and an outlet configured to fluidly couple to either or both a household drain 78 or a recirculation conduit 80. In this configuration, the pump 76 may be used to drain or recirculate liquid in the sump 58, which is initially sprayed into the treating chamber 62, flows through the drum 60, and then into the sump 58. Alternatively, two separate pumps may be used instead of the single pump as previously described.

The washing machine 50 also includes a control system for controlling the operation of the washing machine 50 to implement one or more cycles of operation. The control system may include a controller 82 located within the cabinet 52 and a user interface 84 that is operably coupled with the controller 82. The user interface 82 may include one or more knobs, dials, switches, displays, touch screens and the like for communicating with the user, such as to receive input and provide output. The user may enter different types of information including, without limitation, cycle selection and cycle parameters, such as cycle options.

The controller 82 may include the machine controller and any additional controllers provided for controlling any of the components of the washing machine 50. For example, the controller 82 may include the machine controller and a motor controller. Many known types of controllers may be used for the controller 82. The specific type of controller is not germane to the invention. It is contemplated that the controller 82 is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 3:
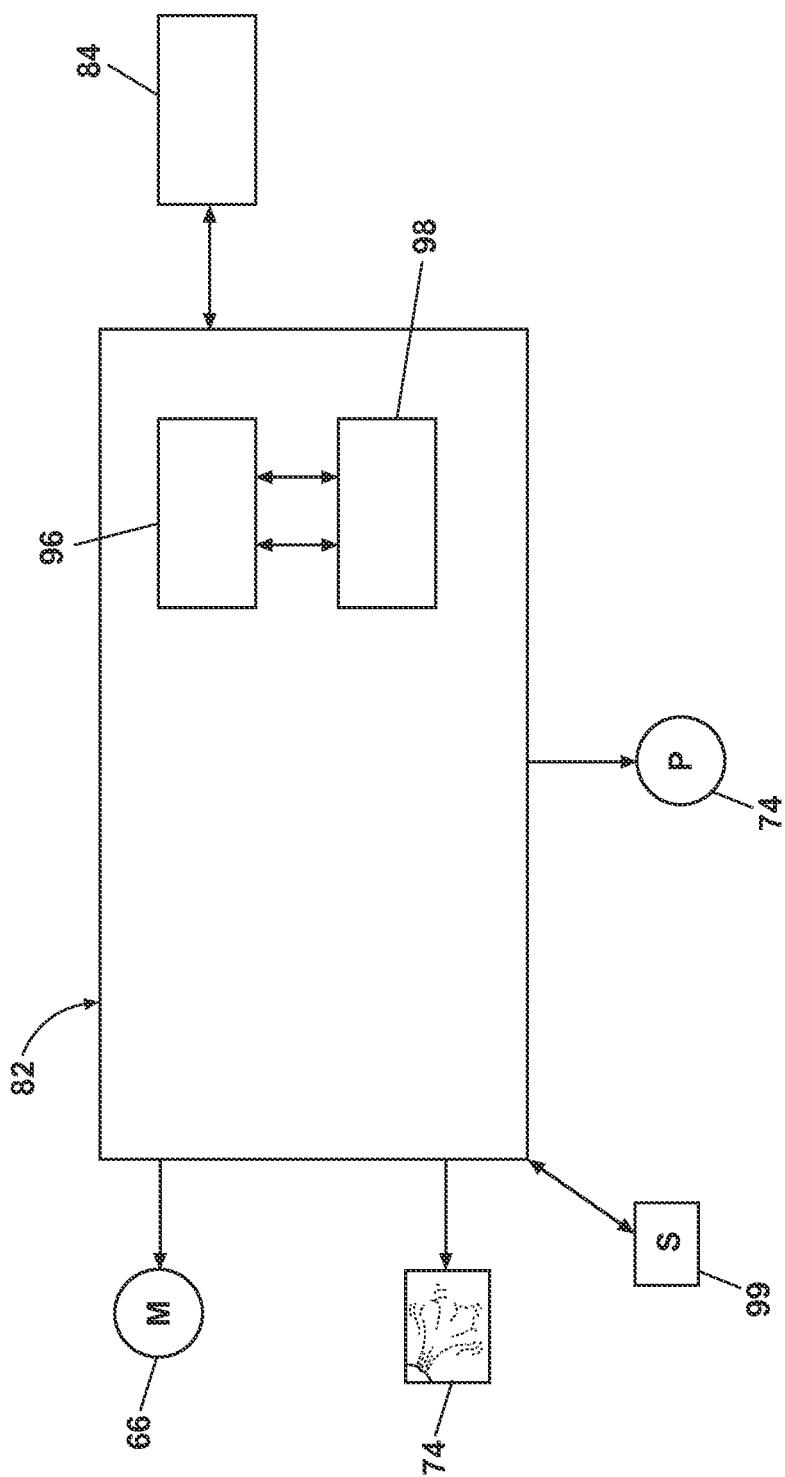
FIG. 3 is a schematic representation of a controller for controlling the operation of one or more components of the clothes washer of FIGS. 2A and 2B according to an embodiment of the invention.

As illustrated in FIG. 3, the controller 82 may be provided with a memory 96 and a central processing unit (CPU) 98. The memory 96 may be used for storing the control software that is executed by the CPU 98 in completing a cycle of operation using the washing machine 50 and any additional software. Examples, without limitation, of cycles of operation include: wash, heavy duty wash, delicate wash, quick wash, pre-wash, refresh, rinse only, timed wash and any of the cycles of operation described herein. The memory 96 may also be used to store information, such as a database or table, and to store data received from one or more components of the washing machine 50 that may be communicably coupled with the controller 82. The database or table may be used to store the various operating parameters for the one or more cycles of operation, including factory default values for the operating parameters and any adjustments to them by the control system or by user input.

The controller 82 may be operably coupled with one or more components of the washing machine 50 for communicating with and controlling the operation of the component to complete a cycle of operation. For example, the controller 82 may be operably coupled with the motor 66, the pump 76, the sprayer 74, and any other additional components that may be present such as a steam generator, a treating chemistry dispenser, and a sump heater (not shown) to control the operation of these and other components to implement one or more of the cycles of operation.

The controller 82 may also be coupled with one or more sensors 99 provided in one or more of the systems of the washing machine 50 to receive input from the sensors 99, which are known in the art and not shown for simplicity. Non-limiting examples of sensors 99 that may be communicably coupled with the controller 82 include: a treating chamber temperature sensor, a moisture sensor, a weight sensor, a chemical sensor, an optical sensor, a conductivity sensor, a turbidity sensor, a position sensor and a motor torque sensor, which may be used to determine a variety of system, laundry and liquid characteristics, such as laundry load inertia or mass.

Still referring to FIG. 2A, the sprayer 74 may be controlled during the pre-wetting phase 12 to spray a mist or fog of water or other treating chemistry into the treating chamber 62 to wet a load of laundry 86. In a vertical axis clothes washer, liquid sprayed into the treating chamber 62 will come from above the laundry load 86 through the open top of the drum 60. During spraying, an exposed, upper surface of the laundry load 86 will be contacted first by liquid sprayed from the sprayer 74. With continued spraying from the sprayer 74, liquid may travel through and around the exposed, upper surface of the load 86 to other surfaces of the load 86. The exposed, upper surface of the laundry load 86 may be referred to as a first strike surface 88 for liquid sprayed from the sprayer 74.

The controller 82 may be configured to determine a dye transfer event. The controller 82 or a communication module located therein or operably coupled thereto may be configured to output a communication that a dye transfer event has occurred. For example, such a communication may be outputted to a dryer. It will be understood that the communication may be a wireless communication and/or a hard-wired communication.

During the pre-wetting phase 12, the laundry may be rotated while the sprayer 74 sprays water or a mixture of water and a treating chemistry into the treating chamber 62 to wet the first strike surface 88. Rotating the laundry may include rotating the drum 60 or actuating the clothes mover 64 to move the laundry. It is also within the scope of the invention for the sprayer 74 to rotate relative to the laundry. The sprayer 74 may be controlled so as to wet the first strike surface 88 without over-wetting the laundry 86 such that the amount of water that travels from one fabric surface to another is minimized. As described above, if too much water is sprayed onto the load 86, loose dye from fabrics forming the load 86 may partition into the water and may transfer to other items in the load 86. The sprayer 74 may spray the water as a mist or fog of fine water droplets configured to be suspended in the air when sprayed and slowly settle down onto the exposed surface of the laundry, i.e. the first strike surface 88, to facilitate covering all of the first strike surface area 88 while minimizing the volume of water used. For example, as described above, the sprayer 74 may be configured to spray the mist as fine droplets, on the order of 10 to 100 microns in diameter, at a rate less than 500 mL/min., which uses very little water, but enough such that the mist that settles on the laundry is absorbed onto the surface of the laundry.

The application of the liquid during the pre-wetting phase 12 as a mist allows the liquid to be supplied to the laundry at a volume, droplet size and rate such that the liquid may be absorbed onto the laundry surface without running off the surface. If the liquid is sprayed at a larger volume, droplet size and/or rate, the liquid may reach the laundry surface at too high a volume and/or rate to be entirely absorbed by the impacted laundry surface and thus some of the liquid may run off the surface, potentially transferring dye from the impacted laundry surface to another surface the liquid run-off comes into contact with.

In one example, an amount of liquid supplied to the laundry as a mist during the pre-wetting phase 12 may be an amount that wets the laundry to a predetermined remaining moisture content (RMC). As used herein, RMC is defined as the ratio of an amount of water in the fabric in addition to the natural regain moisture of the fabric to the amount of fabric. The natural regain moisture of a fabric is based on the natural amount of moisture in the fabric at dry conditions and is considered zero water or zero RMC. The RMC for the pre-wetting phase may range between 5-40% and in an exemplary embodiment is within the range of 10-20%. It will be understood that wetting the laundry to a predetermined RMC does not mean that all fabrics in the load would have to be wet to the predetermined RMC. In one example, the clothes washer 50 may determine the load amount and then the sprayer 74 may be controlled by the controller 82 to spray an amount of liquid based on a predetermined RMC for the determined load amount. The amount of laundry may be determined according to any suitable method, including the methods described herein. It will be understood that the method by which the amount of laundry is determined is not germane to the embodiments of the invention.

The drum 60 may also be rotated to facilitate even coverage of the first strike surface 88 with the mist from the sprayer 74. The drum 60 may be rotated at a relatively low speed, for example, 20-60 rpm or less than 1 G, for example, to avoid agitating the load 86. In addition to facilitating dye transfer, agitating the laundry load 86 or spinning the laundry load 86 at too high of a speed too quickly may cause the load items to move relative to one another within the treating chamber 62 such that a different fabric surface is exposed, which may result in exposing un-wetted laundry as the first strike surface 88 when a treating chemistry is sprayed onto the load 86 during a subsequent phase. Pre-wetting the first strike surface 86 prior to application of the treating chemistry facilitates distribution of the treating chemistry through the laundry load 86. If the treating chemistry is sprayed onto a dry fabric surface, the treating chemistry may not distribute through the load 86 within a reasonable period of time. In the exemplary embodiment of a dye fixative, there is typically an electrostatic attraction between the dye fixative and the fabric substrate which may lead to localized spots of high concentration of dye fixative where the dye fixative first comes into contact with the fabric surface. Pre-wetting the fabric may slow the formation of electrostatic bonds between the dye fixative and the fabric surface such that the dye fixative may distribute more readily across the fabric surface.

Following the pre-wetting of the first strike surface 88 during the pre-wetting phase 12 and the subsequent wetting of the laundry with a treating chemistry, such as a dye fixative, in the pre-wash phase 14, the laundry may be re-oriented to expose at least a portion of a previously unexposed surface. Redistribution of one or more of the items of the laundry load 86, such as by movement or reorientation of at least one load item relative to another load item or the drum 60, may result in a previously unexposed portion of the laundry surface being present at the first strike surface 88. The addition of at least a portion of a previously unexposed surface or exchange of at least a portion of a previously unexposed surface for a recently exposed surface at the first strike surface 88 may be considered a new exposed surface. As used herein, a new exposed surface refers to a surface in which at least a portion of the surface is formed from a previously unexposed surface. Exposing a new surface may include rotating the drum 60 to re-orient the laundry and/or actuating the clothes mover 64.

The pre-wetting phase 12 and pre-wash phase 14 may be repeated one or more times to expose a new surface, pre-wet the new surface with a pre-wetting mist and then treat the pre-wet surface of the laundry with a dye fixative or other treating chemistry to facilitate a uniform distribution of the treating chemistry on the laundry, while decreasing the likelihood of dye transfer. It is also within the scope of the invention for the pre-wetting phase 12 to include spraying a mist onto a first exposed surface and then re-orienting the laundry to expose a previously unexposed portion of the laundry and spraying a mist onto the new expose surface one or more times prior to supplying the treating chemistry in the pre-wash phase 14.

Referring again to FIG. 1, the dye transfer prevention wash cycle 10 may include an optional load detection phase 22 which may occur prior to or as part of the pre-wetting phase 12. The load detection phase 22 may be used to determine an amount of laundry present in the treating chamber 62. The amount of laundry may be qualitative or quantitative and may be determined manually based on user input through the user interface 84 or automatically by the washing machine 50. For example, a qualitative determination of the laundry amount may include determining whether the laundry is a small, medium or large load. A quantitative determination may include determining a weight or volume of the laundry within the treating chamber 62.

The amount of laundry may be determined at 22 according to any suitable method for determining the amount of laundry prior to the addition of liquid to the laundry treating chamber. One example of a suitable method for automatically determining the amount of laundry prior to the application of liquid may include using a weight sensor coupled with the tub 54. Another example of a suitable method may include rotating the drum 60 with the motor 66 and using feedback from the motor or one or more sensors associated with the motor 66 or the drum 60 to determine the amount of laundry. One example of determining the amount of laundry by rotating the drum 60 with laundry therein is disclosed in U.S. Pub. No. 2011/0247148 to Chanda et al., filed Apr. 12, 2011, now U.S. Pat. No. 8,914,930, issued Dec. 23, 2014, entitled "Laundry Treating Appliance with Load Amount Detection," which is herein incorporated by reference in full. Additional exemplary methods include U.S. Pub. U.S. Pat. No. 8,176,798 to Ashrafzadeh et al., issued May 15, 2012, entitled "Method and Apparatus for Determining Laundry Load", U.S. Pat. No. 8,381,569 to Lilie et al., issued Feb. 26, 2013, entitled "Method and Apparatus for Determining Load Amount in a Laundry Treating Appliance," U.S. Pat. No. 8,166,590 to Ashrafzadeh et al., issued May 1, 2012, entitled "Method and Apparatus for Determining Laundry Load Size," and U.S. Pat. No. 8,215,134 to Ashrafzadeh et al., issued Jul. 10, 2012, entitled "Method and Apparatus for Determining Laundry Load Size," all of which are herein incorporated by reference in full. As discussed above, the addition of too much liquid to the laundry 86 may facilitate dye transfer between laundry items and thus methods for determining the amount of laundry that do not require the addition of saturating amounts of liquid to the laundry may be preferred.

Figure 2B:
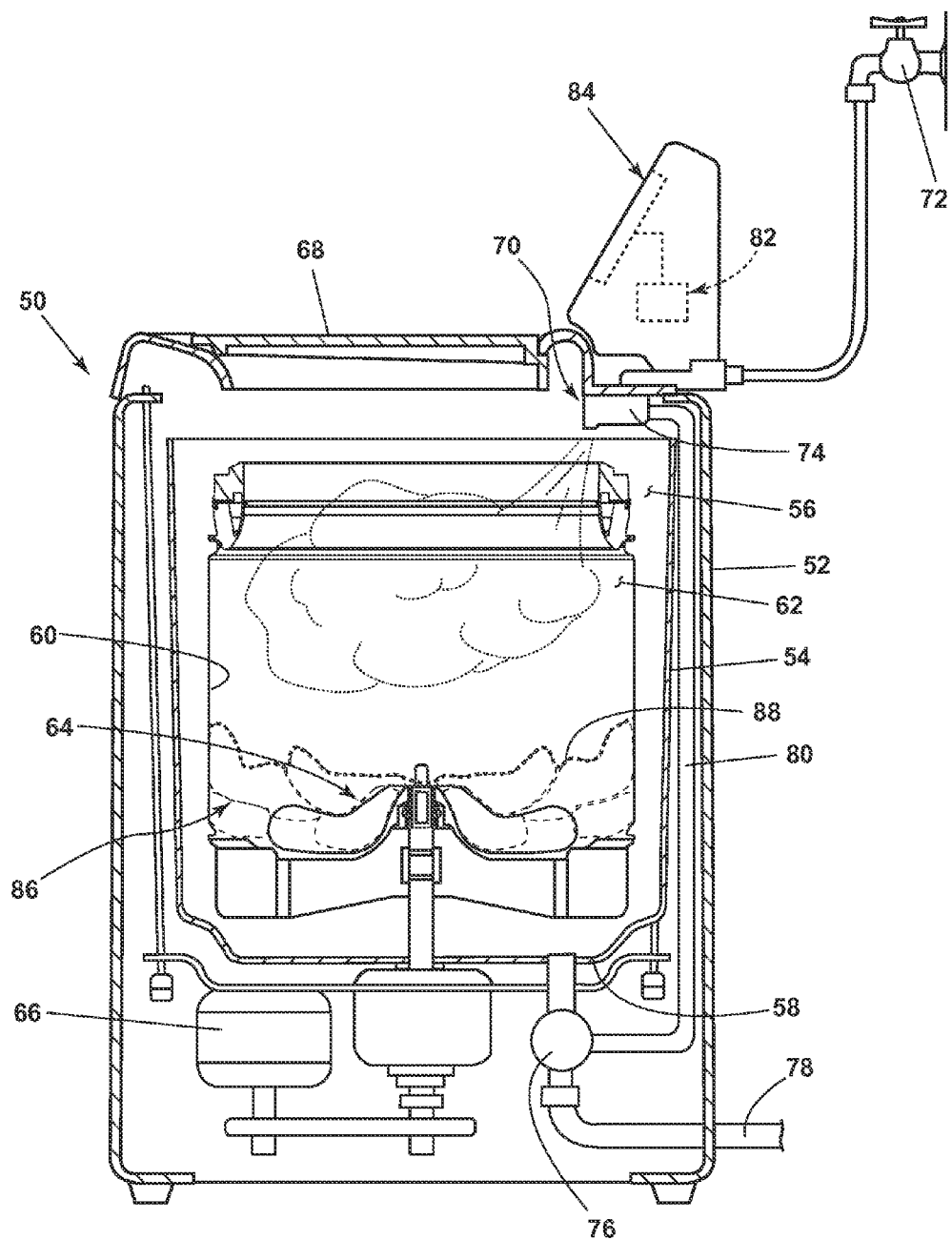

Referring now to FIG. 2B rotation of the drum 60 during the laundry load detection phase 22 may shift the laundry load 86 within the treating chamber 56 such that the laundry spreads out and forms a depression ring around the clothes mover 64. In general, the movement of the load items relative to each other is minimal during the shift of the load to minimize dye transfer that may occur from frictional contact between load items during movement of one load item relative to another. The shifting of the laundry to form the depression ring may increase the surface area of the first strike surface 88 that is exposed during the pre-wetting phase 12 and the pre-wash phase 14. In one example, the pre-wetting phase 12 may coincide with the laundry load detection phase 22 such that the first strike surface 88 is wetted as the laundry load 86 shifts about the clothes mover 64. In general, laundry items that are placed into the drum 60 by a user prior to the start of a cycle of operation are typically piled on top of each other within the treating chamber 62 around and possibly over the clothes mover 64, providing a generally "flat" first strike surface 88, such as is illustrated in FIG. 2A. As the drum 60 is rotated at low speed, the laundry 68 may move from the generally flat distribution illustrated in FIG. 2A to the depression ring illustrated in FIG. 2B.

Figure 4:
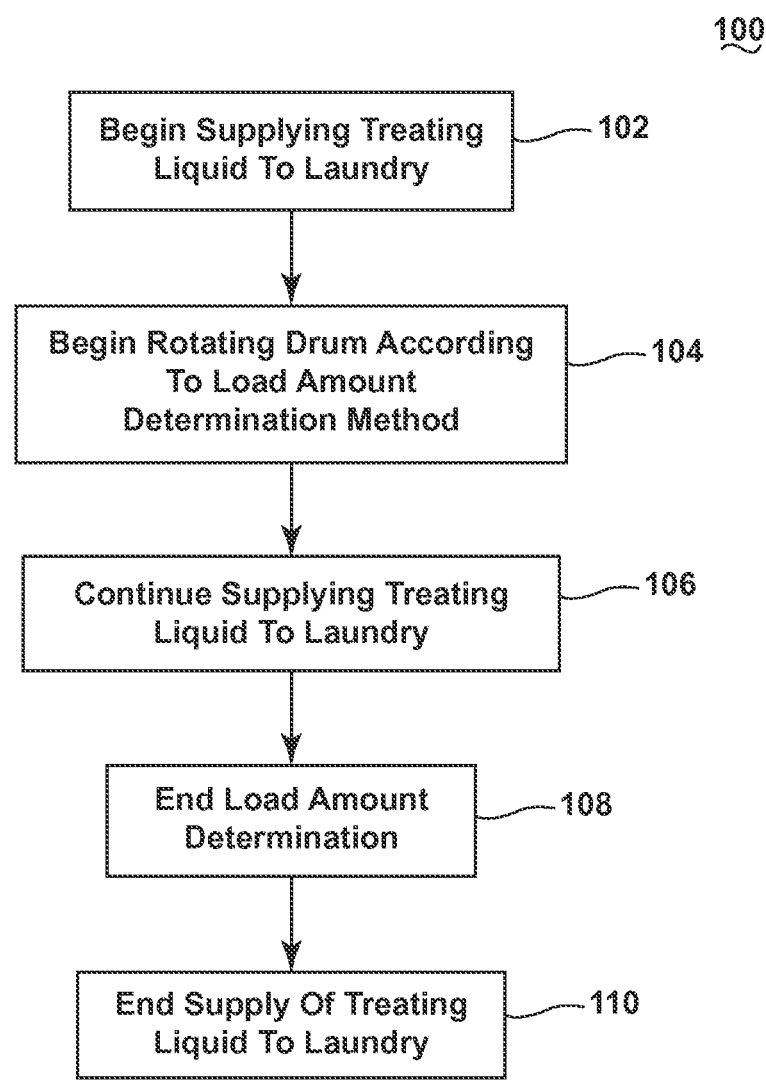
FIG. 4 is a flow chart illustrating a method for supplying a treating chemistry according to an embodiment of the invention.

FIG. 4 illustrates a method 100 for supplying a treating chemistry while determining the amount of laundry that may be used with the wash cycle 10 or with any other suitable method, including those further described herein. While the method 100 is described in the context of combining the load detection phase 22 and the pre-wetting phase 12 of wash cycle 10, the method 100 may also be used in a similar manner to combine the load detection phase 22 with the pre-wash phase 14. Inertia-based load amount determination methods, such as that described in U.S. Pub. No. 2011/0247148 to Chanda et al., now U.S. Pat. No. 8,914,930, for example, typically use motor torque information when the drum is rotated according to a predetermined drum rotation profile to determine the inertia of the system and use the determined inertia of the system to estimate the amount of laundry in the drum. These types of inertia-based methods generally utilize information already available, i.e. the motor torque, without the use of additional sensors, such as weight sensors, for example.

The method 100 utilizes the shifting of the laundry during the rotation of the drum according to an inertia-based load amount determination to facilitate distributing a treating chemistry onto the laundry, such as water during the pre-wetting phase 12 or a dye fixative during the pre-wash phase 14 of wash cycle 10, for example. The method 100 begins with assuming that a user has loaded the laundry into the treating chamber and selected a cycle of operation. At 102, a treating liquid may be supplied to the laundry in the treating chamber. This may include spraying the treating liquid into the treating chamber, such as through the sprayer 74 of clothes washer 50, for example.

At 104, the drum may be rotated according to the load amount determination method. Rotation of the drum may coincide with the supplying of the treating liquid at 102. The drum 60 may begin to rotate simultaneously with the supply of the treating liquid at 102 or at some delayed time after the start of the supplying of the treating liquid. The treating liquid may be supplied continuously or intermittently as the drum 60 is rotated during the load determination at 106. At 108, the load amount determination may end and the supply of treating liquid to the laundry may end at 110. The load amount determination 108 and supply of treating liquid at 110 may end simultaneously or sequentially.

As described with respect to FIGS. 2A and 2B above, as the drum 60 is rotated, the laundry 86 may shift within the treating chamber 62, increasing the first strike surface 88. Supplying the treating liquid as the laundry 86 shifts from the initial orientation shown in FIG. 2A to the orientation the laundry 86 assumes after rotating, illustrated in FIG. 2B, may increase the surface area of the laundry that is contacted by the treating liquid as the treating liquid may contact the laundry surface exposed in the initial orientation, the orientation after rotating, and the transitional orientations in between. In addition, performing the load amount determination and the supply of the treating liquid coincidentally rather than sequentially can save cycle time. Furthermore, if the treating liquid is not added until after the load determination, the initially exposed fabric surfaces and the transitional fabric surfaces may not be covered by the treating liquid.

The amount of treating liquid supplied at 102 and 106 may be a small, known amount of liquid that may facilitate the load amount determination and also facilitate uniform distribution of the liquid onto the laundry. The amount of treating liquid may be far below an amount that would saturate the laundry load but is sufficient to just dampen the laundry, while minimizing the potential for liquid run-off from the laundry. For example, if the load amount has been determined, the amount of treating liquid may be between 5-10% of the load amount. Alternatively, the amount of treating liquid may be between 50-150 mL, which is likely to be sufficient to provide a layer of liquid on the exposed fabric surface, irrespective of load size. The treating liquid may further be applied as a mist, as described above, to facilitate a more uniform distribution of the liquid. While not meant to be limited by any theory, it is believed that the addition of a small volume of relatively uniformly applied liquid may provide additional mass to the laundry which increases the forces compressing the laundry around the periphery of the drum and provides for a more predictable distribution of the laundry within the drum, which may improve the accuracy of the inertia-based load amount determination. In addition, as described above with respect to the pre-wetting phase 12 of the cycle 10, pre-wetting the laundry with a small amount of a fine mist of water without saturating the laundry may facilitate distribution of a subsequently applied treating chemistry while minimizing the dye transfer that may occur if too much liquid is added.

Following the end of the supply of the treating liquid at 110, an optional extraction phase may be implemented in which the laundry is spun at a predetermined rate for a predetermined period of time to provide a relatively consistent liquid-to-cloth ratio to facilitate the load estimation. Alternatively, the additional mass provided by the added liquid may be subtracted from the load amount estimation if the effect of the additional mass is deemed significant enough to have impacted the outcome of the load amount estimation.

As discussed above, it is within the scope of the invention for the laundry load detection phase 22 and the pre-wetting phase 12 to be performed sequentially or simultaneously. Because the pre-wetting phase 12 does not saturate the laundry load 86 to a substantial degree, the amount of water added during the pre-wetting phase 12 is generally not considered to significantly effect the load amount determination. Thus, the laundry load detection phase 22 and the pre-wetting phase 12 may overlap to save cycle time without negatively effecting the laundry load detection. While the method 100 is described in the context of determining the amount of laundry while supplying a treating chemistry, it will be understood that the rotation of the drum 104 may be implemented without determining an amount of laundry. In addition, it is also within the scope of the invention for the treating chemistry to only be supplied to the shifted laundry at the end of the load amount determination.

Figure 5:
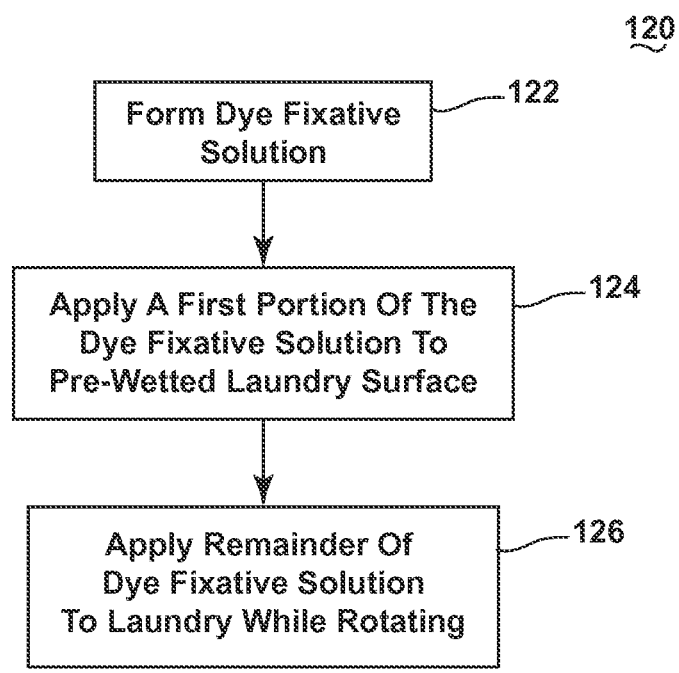
FIG. 5 is a flow chart illustrating a method for supplying a treating chemistry, such as a dye fixative, according to an embodiment of the invention.

Referring now to FIG. 5, a method 120 for applying a treating chemistry is illustrated. While the method 120 is described in the context of applying a dye fixative, it will be understood that the method 120 may also be used to apply other treating chemistries. The dye fixative application method 120 may be used as part of the cycle 10 to apply a dye fixative during the pre-wash phase 14, or as a separate cycle or part of another cycle. The method 120 may begin at 122 with forming a dye fixative solution. The dye fixative solution may include one or more dye fixatives and optional adjuncts, such as a solvent (e.g. water) and a viscosity modifier, for example. Forming the dye fixative solution may include providing a ready-to-use dye fixative solution to a dispenser fluidly coupled with the sprayer 74. Alternatively, the dye fixative solution may be mixed with water or other treating liquid in a suitable mixing chamber or in the sump 58 prior to providing the dye fixative solution to the sprayer 74. At 124, a first portion of the dye fixative solution formed at 122 may be sprayed onto the first strike surface 88 that has been pre-wetted with water as described above with respect to the pre-wetting phase 12 of the cycle 10. The dye fixative may be applied at 124 while the drum 60 is rotating at speeds where the resulting centrifugal force acting on the laundry is below 1 G, which, for short-hand reference, will be referred to as rotating at a speed less than 1G or similar language. Similarly, rotating at a speed where the resulting centrifugal force acting on the laundry is above 1 G, will be referred to as rotating at a speed above 1G or similar language.

Following application of the first portion of the dye fixative solution to the first strike surface 88 at 124, the remainder of the dye fixative solution may continue to be supplied into the treating chamber 62 through the sprayer 74 as the drum 60 continues to rotate to distribute the dye fixative through the laundry load 86. In one example, the drum 60 may be rotated at increasing speeds below 1 G from 20-60 rpm to facilitate downward flow of the dye fixative through the laundry load 86. The drum 60 may then be spun at increasing speeds above 1 G from 50-120 rpm, for example, to facilitate flow of the dye fixative laterally through the laundry load 86. All exemplary rotational speeds provided in this disclosure are for a basket or drum having a radius of 11 inches. As centrifugal force is a function of the radial distance from the axis of rotation to the center of gravity of the laundry item, speed alone is insufficient to define the centrifugal force. It will be understood that the rotational speeds may be adjusted based on the radius of the basket or drum without deviating from the scope of the invention.

While not meant to be limited by any theory, it has been observed that as the laundry is wetted with water or a treating chemistry, flow channels form within the laundry as the liquid distributes through the load. Once the flow channels are established, it may become difficult to wet regions of the laundry outside these established flow channels. Typically, the limitations of the flow channels may be overcome by repositioning the laundry, such as by agitation, for example, in which the laundry items move relative to one another. However, in cases where dye transfer is of concern, the mechanical action from inducing relative movement between laundry items of the load at this stage may facilitate dye transfer. Rotating the laundry at speeds below 1 G to initially distribute the dye fixative and then increasing the speed above 1 G may facilitate movement of the flow channels such that the distribution of the treating chemistry is increased while minimizing dye transfer due to frictional interactions between items.

Figure 6C:
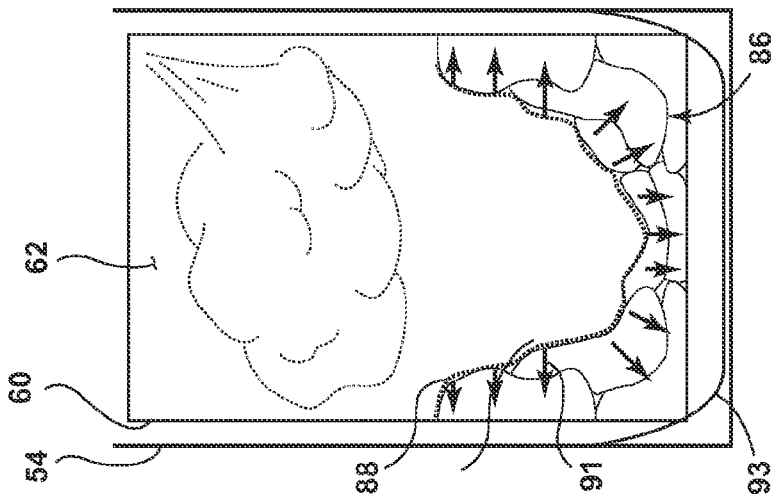
FIGS. 6A, 6B and 6C are cross-section, schematic side views of a clothes washer illustrating a method for wetting a laundry load according to an embodiment of the invention.
Figure 6B:
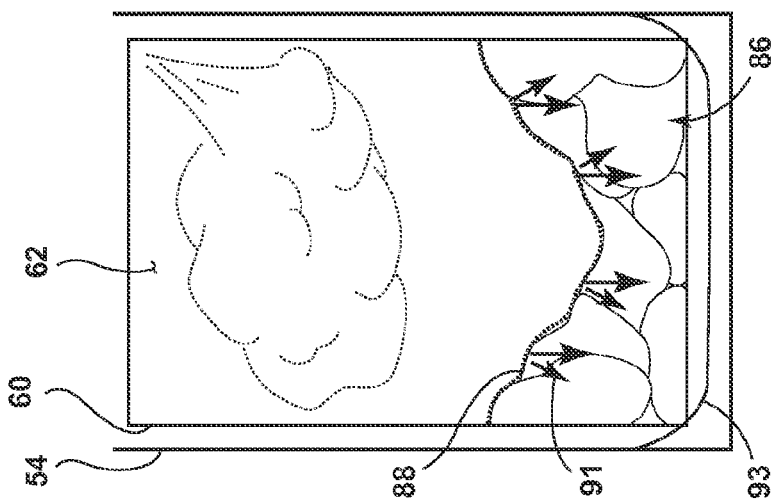
Figure 6A:
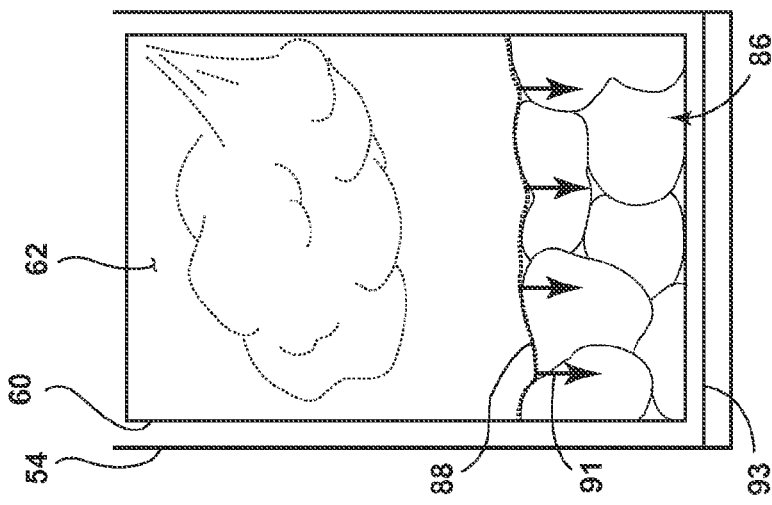

FIGS. 6A-B are a schematic representation of the change in flow channels through the load as the drum speed increases from below 1 G to above 1 G. Referring now to FIG. 6A, as the load is wetted with the dye fixative while the drum 60 is rotating at speeds below 1 G, gravity is the primary force acting on the liquid distributing through the laundry, so the flow channels may generally be considered to be primarily vertical, as illustrated by arrows 91. As the spin speed is slowly increased, centrifugal forces begin to play more of a role and the flow channels may begin to vary from vertical, as illustrated in FIG. 6B. As illustrated in FIG. 6C, as the spin speed increases to 1 G, the speed at which the centrifugal acceleration at the outermost extent of the drum 60 is equal to the acceleration due to gravity, the centrifugal forces at the periphery of the drum 60 are equal to gravity and the flow channels may vary from the initial vertical channels at the center of the drum to nearly 45 degrees at the periphery of the drum 60.

As the drum 60 is rotated above 1 G, the centrifugal force begins to exceed the force due to gravity and the flow channels may begin to approach a more horizontal orientation. In addition, at speeds above 1 G, the laundry begins to satellize. This movement of the laundry load is small enough such that dye transfer due to frictional contact is not significant, but still provides a sufficient degree of shifting of the load to aid in dispersion of the dye fixative. Thus, by varying the spin speed from below 1 G to above 1 G while spraying the dye fixative onto the laundry, a multitude of flow channels and load orientations may be produced which may facilitate distribution of the dye fixative within a shortened amount of time.

Still referring to FIGS. 6A-B, during the application of the dye fixative, some amount of liquid 93 may collect within the tub 54. As the rotation speed of the drum 60 is increased, the liquid 93 may travel up the sidewall of the tub 54 to such an extent that the liquid 93 may come into contact with an outer edge of the drum 60 where the drum sidewall meets the drum bottom wall, as illustrated in FIGS. 6A and B. The liquid 93 that comes into contact with the drum 60 may then be absorbed through the drum perforations (not shown) by laundry inside the treating chamber 62 adjacent the outer edge of the drum 60. This may facilitate distributing the dye fixative to the laundry located near the outer edge of the drum 60.

In addition to rotating the drum 60 at increasing spin speeds during spraying of the dye fixative, the rotation of the drum 60 may include periods where the speed of the drum 60 is held constant while the dye fixative continues to be sprayed. At specific speeds, centrifugal forces combined with a drum 60 which is configured to restrict the flow of liquid out of the drum 60, results in some amount of liquid being held near the outer edge of the drum 60 such that a paraboloid of sorts forms (not shown). The shape of the paraboloid depends on the speed at which the drum 60 is rotating and the configuration of the drum apertures which restrict the liquid flow. Forming the paraboloid in this manner may allow portions of the load at the outer edges of the drum 60 where the sidewall and bottom wall meet, which are not directly impacted by dye fixative being sprayed into the treating chamber 62 by the sprayer 74, to be wet with the dye fixative. While the wetting methods have been described in the context of wetting the laundry load with a dye fixative, it will be understood that the methods may also be used in a similar manner to wet the laundry with any other type of treating chemistry or to wet the laundry with water.

The amount of dye fixative or any treating chemistry applied during the pre-wash phase 14 may be automatically or manually determined based on the amount of laundry and/or a volume of water that will be applied to the laundry during the cycle of operation. When the pre-wash phase 14 supplies a treating chemistry, it may also be considered a treating chemistry phase, and in the specific embodiment of a dye fixative, a dye fixative phase. The amount of laundry may be determined automatically using one or more sensors or according to a load detection method, as discussed above. Alternatively, the user may indicate the amount of the laundry through the user interface by selecting an amount of laundry (e.g. small, medium, large, extra-large, or by inputting a mass or weight) or based on the cycle selection. The amount of treating chemistry supplied to a mixing chamber or to the sump 58 may be based on the amount of water to be applied to the laundry, which may be based on the amount of laundry and/or the selected cycle of operation. Alternatively, the amount of treating chemistry may be defined by an amount provided to the dispensing system by the user.

In one example, the amount of a dye fixative supplied is based on the load size and is within a predetermined range that is dependent on the type of dye fixative being used. For the exemplary dye fixative Sera Fast CTE, the predetermined range may be determined to be between 5 grams per kilogram of laundry and 10 grams per kilogram of laundry. For some dye fixatives, too much dye fixative may have undesired consequences and therefore maintaining the amount of dye fixative below a certain amount based on the amount of laundry may be beneficial. For example, if the concentration of dye fixative is too high, the dye fixative may not entirely partition onto the laundry fabric, but rather may preferentially remain in aqueous solution, which may draw dye from the fabric into the aqueous solution.

Figure 7:
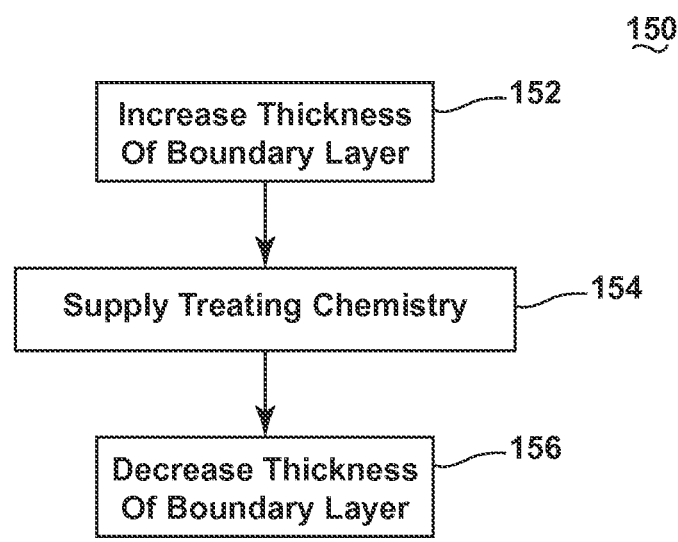
FIG. 7 is a flow chart illustrating a method for supplying a treating chemistry to a laundry item according to an embodiment of the invention.

Referring now to FIG. 7, an additional or alternative method 150 for facilitating distribution of a treating chemistry, such as a dye fixative, fabric softener, detergent, fabric finish or stain repellant, for example, onto the laundry is illustrated. The method 150 may be used with any method for distributing a treating chemistry, including the methods described herein, such as the cycle 10 of FIG. 1 or the method 120 of FIG. 5, for example. By way of non-limiting introduction, a fabric surface within a bulk liquid may be considered to have a boundary layer of fluid flow on the fabric surface. When a substance is added to the bulk liquid, initially the concentration of the substance at the boundary layer for a homogenous liquid is the same as the bulk concentration, $c_b$. The amount of substance and the time it takes for the substance to diffuse through the boundary layer depends on $c_b$ and the thickness of the boundary layer. A lower initial concentration and a thicker boundary layer may result in a slower rate of diffusion to the fabric surface.

The method 150 begins with assuming that a user has loaded laundry items into the treating chamber and initiated a cycle of operation. At 152 the thickness of the boundary layer of the fabric may be increased. At 154 a liquid including a treating chemistry may be supplied to the treating chamber for distribution onto the fabric. The supply of the treating chemistry may occur simultaneously with the increase in the thickness of the boundary layer or at some delayed time after the start of the increase in the thickness of the boundary layer at 154. After a predetermined period of time, the boundary layer may be decreased at 156 to facilitate diffusion of the treating chemistry through the boundary layer for interaction with the surface of the fabric.

The thickness of the boundary layer may be increased at 152 by having a low velocity of liquid flow through the fabric items, such as by having a slow drum rotation speed which causes little to no relative movement of the fabric items. Exemplary drum speeds are in the range of 20-120 rpm. An additional or alternative manner by which the thickness of the boundary layer may be increased includes maintaining the temperature of the liquid at a predetermined temperature to increase the viscosity of the liquid relative to the viscosity of the liquid in the subsequent boundary layer thickness decreasing phase 156. Additionally, or alternatively, less liquid may be applied to the load to decrease normal forces and decrease the pressure. For example, in a typical cycle for a 100% cotton load, the cycle may be configured to saturate the load to about 200% of the load weight. According to the method 150, the amount of liquid applied may be such that the load is saturated to a less degree than the load would typically be, such as just until saturation.

Decreasing the thickness of the boundary layer at 156 may be done at a predetermined time after the start of the supply of the treating chemistry 154 to provide time for the treating chemistry to distribute through the load, and may include rotating the drum at higher spin speeds, such as speeds greater than 120 rpm or speeds above 1 G, than used during the increasing thickness phase 152 or agitating/tumbling the laundry. In one example the drum may be rotated at speeds equal to or greater than 280 rpm. Alternatively or additionally, the viscosity of the liquid may be increased by increasing the temperature of the liquid and/or adding substances which may reduce viscosity and/or increase lubrication, such as a polyox, for example. Another example includes adding more liquid to the load to increase the pressure drop by increasing the normal force. The normal force can be increased by having more water in the fabrics than normal or, in the case of a horizontal axis washing machine, by increasing the drum speed so that the release of the fabric as it is rotated by the drum is at a greater height above the drum axis than is typically used.

In an exemplary embodiment in which a cationic dye fixative is applied to a cotton fabric, the positively charged dye fixative may be electrostatically attracted to the negatively charged cotton fabric such that the dye fixative may bond to the fabric surface before dispersing over the fabric surface, leading to localized spots of high concentrations of dye fixative. The thickness of the fabric surface boundary layer may be increased prior to supplying the treating chemistry to slow the rate at which the dye fixative reaches the cotton fabric and electrostatically bonds thereto, which may provide more time for the dye fixative to spread out and cover a larger surface area of the fabric surface. After a predetermined period of time, the boundary layer thickness can be decreased or collapsed to facilitate the dye fixative reaching the surface and electrostatically bonding to the cotton.

An alternative or additional method for facilitating distribution of the dye fixative on the laundry includes increasing the hydrophobicity of the fabric surface. Introduction of water to the fabric surface may interrupt the forces, such as Van der Waal's forces, for example, between the fabric surface and loosely held dyes at the fabric surface. The water may form hydrogen bonds with the fabric surface and/or dye and promote partitioning of hydrophobic dyes away from the fabric surface to the air-water interface. Increasing the hydrophobicity of the fabric surface may reduce this partitioning of the dye away from the fabric surface in the presence of water. The hydrophobicity of the fabric surface may be increased by applying an oil to the fabric surface, such as a natural fatty acid-based oil, for example. The oil may be applied to the fabric surface through spraying, misting or vapor deposition, and/or may be supplied as an emulsion. The oil on the fabric surface may facilitate the interaction between the fabric and the dye to retain the dye at the fabric surface, even as water or a water-based treating chemistry, such as a dye fixative, for example, is supplied to the laundry. The oil may then be removed, such as during a subsequent wash phase with a surfactant, for example.

In the context of the wash cycle 10, the oil may be supplied to the laundry prior to the pre-wash phase 14 to inhibit dye transfer that may occur as the dye fixative solution is being supplied to the laundry. In one example, this may result in the ability to apply a greater volume of the dye fixative solution to the laundry to facilitate distribution of the dye fixative solution without promoting excessive dye transfer. In another example, the application of the oil to the fabric surface may negate the use of the pre-wetting phase 12.

Another method by which distribution of the dye fixative on the fabric surface may be facilitated includes preparing a delayed or trigger-released dye fixative. The dye fixative may be encapsulated inside a colloidosome microcapsule to prevent the dye fixative from prematurely adhering to the fabric surface and collecting in localized spots on the fabric surface. The encapsulated dye fixative may be formed by preparing a water water-in-oil-in-water (W/O/W) double emulsion in which the dye fixative is encapsulated in an oil shell which is then dispersed in an aqueous phase.

The oil shell may be formed from any suitable oil, and in an exemplary embodiment, is formed from a natural oil, such as sunflower oil, soybean oil or a vegetable oil, for example. Formation of the encapsulated dye fixative double emulsion generally includes mixing an oil phase and an aqueous phase in which the dye fixative is dispersed, emulsifying the oil and aqueous phase, stabilizing the oil shell, and transferring and re-dispersing the encapsulated dye fixative in an aqueous phase. The exact procedure by which the double emulsion may be formed depends on the oil used in the oil phase, the dye fixative, and the composition of the aqueous phase.

An exemplary double emulsion for encapsulating a dye fixative, such as a cationic methylene guanidine based dye fixative (commercially available under the trade name Retayne™), in a soybean oil shell is illustrative of the process and product envisioned. It will be understood that the process may be used in a similar manner to encapsulate other water-soluble dye fixatives in different oil shells and that additional or different steps and material may be included to obtained the desired encapsulated dye fixative.

The emulsification process begins with dispersing the dye fixative in an aqueous phase, which may include only water. An oil-in-water emulsion may be formed by mixing a desired oil phase, soybean oil for example, with the aqueous phase in which the dye fixative is already dispersed in the presence of an emulsifier. A non-limiting example of a suitable emulsifier includes a nonionic surfactant, such as polyethylene glycol sorbitan monostearate (commercially available as TWEEN® 60 from Sigma-Aldrich®). An exemplary ratio for the oil and aqueous phases is 50%/50% soybean oil/aqueous phase. The mixture may be stirred and optionally heated, e.g. 70° C., to promote the emulsification process. The oil-in-water mixture may then be introduced into an electrolyte solution for further mixing and homogenization, using an ultra-sonicator, for example, to form the desired emulsion. Non-limiting examples of emulsification machines which may be used to form the oil-in-water emulsion include a stifling vessel, a colloid mill, a toothed disc dispersing machine or a high-pressure homogenizer. The resultant oil encapsulated dye fixative comprises a dye fixative dispersed in water encapsulated within an oil shell which is stabilized by the nonionic surfactant.

The oil encapsulated dye fixative may then be transferred into an aqueous phase and re-dispersed to form the double emulsion. The oil shell may be stabilized by the further addition of a nonionic surfactant, such as polyethylene glycol sorbitan monostearate, with additional sonication. The stability and size of the oil encapsulated dye fixative droplet may be varied depending on the emulsification process machines and materials.

In another example, the colloidosome microcapsule may be formed by self-assembly or directed assembly of responsive materials, such as pH responsive materials, using copolymer-stabilized water/organic solvent/water (W/O/W) double emulsions. A water-in-oil-in-water (W/O/W) emulsion may be generated by self-assembling pH responsive materials at the liquid-liquid interfaces, for example, and removing the middle phase through evaporation. The outer shell may be hydrophobic and dissolve in water at a predetermined pH threshold. The pH of the dye fixative solution applied to the laundry may be kept outside the predetermined pH threshold until such time as it is desired to release the dye fixative to facilitate distribution of the dye fixative across a larger area of the fabric surface and decrease localized or spotty distribution of the dye fixative.

For example, if the outer shell dissolves at a pH>7, the treating liquid may be kept at a pH<7, such as by adding citric acid, for example. Increasing the pH above 7 releases the dye fixative from the colloidosome microcapsule. The pH may be increased above 7 at some predetermined delayed time following the beginning of the application of the treating liquid with the encapsulated dye fixative. Delaying the release of the dye fixative may facilitate more uniform application of the dye fixative through the laundry load. Because the dye fixative is attracted to the fabric surface, the dye fixative may have a tendency to concentrate at the first surface the dye fixative comes into contact, limiting its distribution. Encapsulating the dye fixative in a triggered-release microcapsule may allow for more time to distribute the dye fixative throughout the load before the dye fixative becomes strongly associated with the fabric surface. In another example, the oil shell may be broken or de-stabilized to release the dye fixative within by application of mechanical energy, such as may occur when laundry to which the encapsulated dye fixative has been applied is agitated, or based on changes in pressure or temperature. In yet another example, an additional material may be supplied to the laundry to de-stabilize the oil shell, triggering release of the dye fixative from within the oil shell.

Any of the water-soluble dye fixatives described herein may be encapsulated using the double emulsion process, non-limiting examples of which include cationic polymers containing functional groups selected from the group consisting of primary, secondary, and tertiary amines and their salts, polyacrylamide or polyethyleneimine based polymers, polymers containing a reactive vinyl, hydroxyl or epoxy functional group, poly diallyl dimethyl ammonium chloride (DADMAAC), poly(acrylamide-co-diallyldimethyl ammonium chloride), cetyl trimethyl ammonium bromide (CTAB), or cetyl pyridinium bromide (CPB).

The encapsulated dye fixative may be formed in a dispersing machine associated with the clothes washer on demand or provided as a prepared chemistry in a treating packet, for example. In one example, a mixture of the water-in-oil emulsion may be stored in a suitable container and provided to the consumer for addition to the clothes washer. The clothes washer may include a dispersing machine or mixing chamber capable of re-dispersing the water-in-oil emulsion in an aqueous phase to form the double emulsion, which may then be supplied to the laundry by the clothes washer during the cycle of operation. In another example, the water-in-oil emulsion may be mixed within a sump of the clothes washer with a suitable aqueous phase to form the double emulsion.

Figure 8:
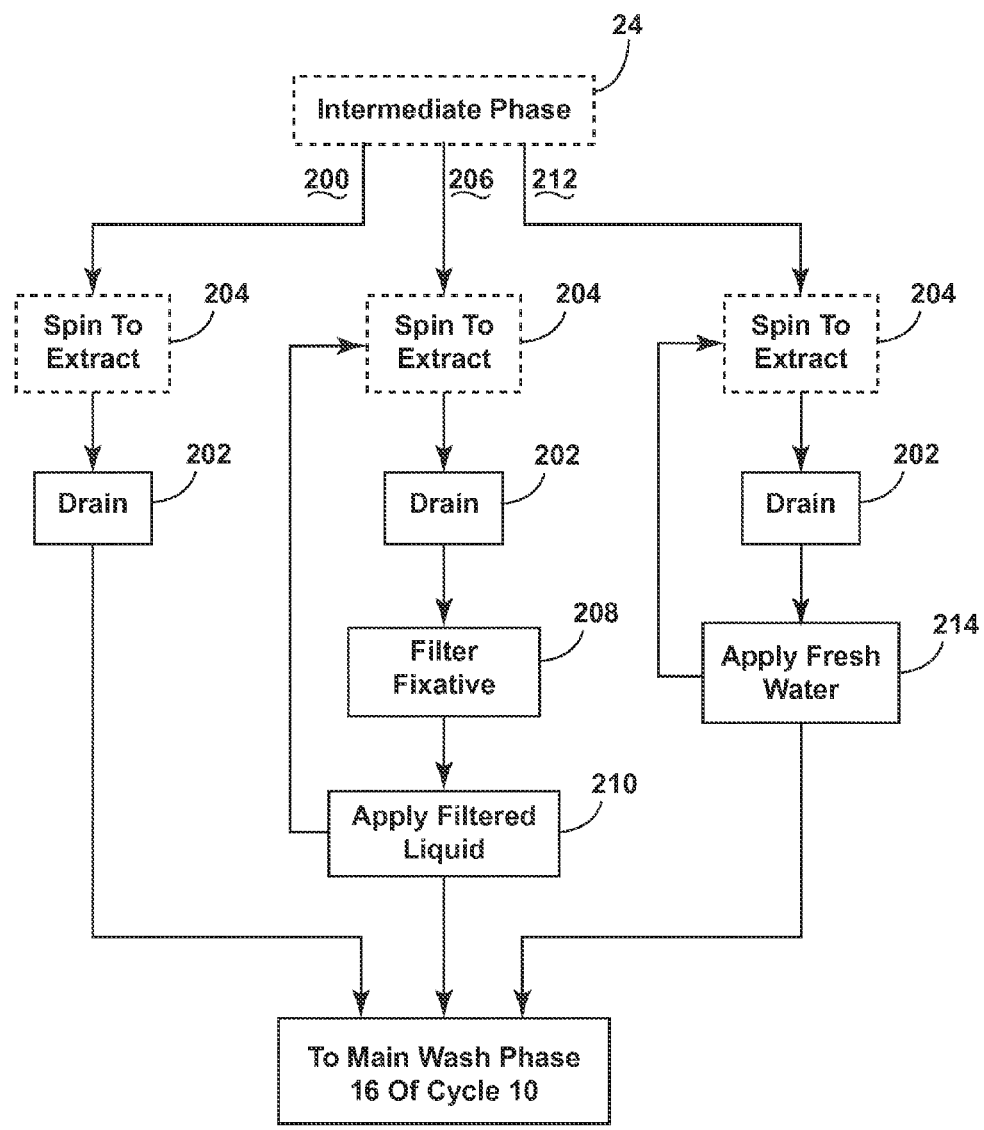
FIG. 8 is a flow chart illustrating methods for implementing an intermediate phase according to an embodiment of the invention.

Referring again to the wash cycle 10 of FIG. 1, the optional intermediate phase 24 may be implemented following the pre-wash phase 14 and prior to the main wash phase 16 to prepare the laundry for treatment during the main wash phase 16. FIG. 8 illustrates exemplary methods which may be used to implement the intermediate wash phase 24.

Method 200 may include a drain phase 202 in which treating liquid collected in the sump 58 is drained from the treating chamber 62 and an optional extraction phase 204 in which the laundry is rotated to facilitate the extraction of liquid from the laundry, which may subsequently be drained from the sump 58.

Method 206 may include the optional extraction phase 204 and drain phase 202 of method 200 and further include supplying the drained treating liquid to a filter to filter dye fixative from the treating liquid at 208. The filtered treating liquid may then be re-applied to the laundry in the treating chamber 62 at 210. The applied filtered treating liquid may then be drained at 202 following the optional extraction phase at 204. The drain 202, optional extraction 204, filtering at 208 and application of filtered liquid at 210 may be repeated a predetermined number of times or based on output from a sensor system indicative of an amount of dye fixative in the treating liquid drained at 202. The sensor system may include any suitable system for determining an amount of dye fixative in the treating liquid, non-limiting examples of which include optical sensor systems which may be used to perform UV/Vis absorbance/fluorescence spectroscopy or a conductivity sensor. For example, a UV/Vis absorbance/fluorescence system may provide an output representative of a sensed spectral absorbance and/or fluorescence of the treating liquid. It will also be understood that, as used herein, when referring to absorbance, transmittance, which is related to absorbance, may be used as an alternative to absorbance or in order to determine the absorbance.

The method 206 may be repeated multiple times until the output indicates that the amount of dye fixative in the treating liquid satisfies a predetermined threshold. This may include comparing the output to a predetermined reference value that may be a range of reference values, an upper threshold or a lower threshold. The term "satisfies" the threshold is used herein to mean that the variation satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted. In another example, the method 206 may be repeated multiple times based on the dye fixative, load amount and/or load type.

Alternatively, the optional intermediate phase 24 may include a method 212 which includes the optional extraction phase 204 and drain phase 202 of method 200 and further includes applying rinse water from the household water supply to the laundry and repeating the optional extraction at 204 and draining at 202. Similar to the method 206, the drain 202, optional extraction 204, and application of rinse water at 214 may be repeated a predetermined number of times or based on output from a sensor system indicative of an amount of dye fixative in the liquid drained at 202, as described above. For example, the method 212 may be repeated multiple times until the output indicates that the amount of dye fixative in the treating liquid satisfies a predetermined threshold. In another example, the method 212 may be repeated multiple times based on the dye fixative, load amount and/or load type.

While the intermediate phase 24 is illustrated in FIG. 1 between the pre-wash phase 14 and the main wash phase 16, it is within the scope of the invention for the intermediate phase 24 to alternatively or additionally be implemented between one or more of the phases 12, 14, 16, 18 and/or 20 of the cycle 10.

The main wash phase 16 may include the addition of a laundry detergent composition comprising one or more surfactants, detergents, soaps and optional additional adjuncts that are known for use in laundry detergent compositions, non-limiting examples of which include pH buffers, builders, viscosity modifying agents, colorants, fragrances, etc. In addition to washing the laundry with a laundry detergent composition, the laundry may also be treated with a dye absorber in the main wash phase 18. The dye absorber may be part of the laundry detergent composition or a separate agent that may be supplied to the laundry in the treating chamber before the laundry detergent composition is supplied or simultaneously with the laundry detergent composition. As will be described in more detail below, the laundry detergent composition may be formulated so as to not include anionic surfactants, or if anionic surfactants are included, only sulfate-based anionic surfactants. In such a case, surfactancy may be provided by nonionic surfactants or mixtures of cationic and nonionic surfactants. Anionic surfactants may promote dye removal and may also interact undesirably with dye fixative that may have been carried over from the pre-wash phase 14.

For example, the dye absorber may be provided to the tub 54 and diluted with water from the household water supply 72. The dye absorber and water in the tub 54 may be recirculated through the recirculation conduit 80 and back into the tub 54 without application to the laundry load 86 to mix the dye absorber and water prior to application the laundry load 86. Alternatively, the dye absorber may be mixed with water in a mixing chamber prior to spraying the dye absorber solution into the treating chamber 62. The dye absorber mixed with water may be applied to the laundry before the addition of a laundry detergent composition. Alternatively, following mixing of the dye absorber and water, the detergent composition may be added to the dye absorber solution, optionally mixed by circulation through the recirculation conduit 80, and then applied to the laundry load 86.

The rinse phase 18 may include supplying a rinse liquid to the treating chamber comprising a dye absorber that may be the same or different than the dye absorber supplied in the main wash phase 16. The rinse liquid may optionally include additional laundry adjuncts such as fabric softener, for example. The rinse phase 18 may include supplying the tub 54 one or more times with rinse liquid comprising a dye absorber in at least one of the rinses. Each time the tub 54 is filled with a rinse liquid or rinse water and subsequently drained, this may be considered a rinse stage. Although, depending on the volume of rinse liquid, it is possible to have multiple rinse phases without an intervening draining. Each rinse stage may optionally include agitating the laundry within the treating chamber 62 by activating the clothes mover 64 and/or rotating the drum 60, if dye absorber has been added in the main wash phase 16 and/or the rinse phase 18. Agitating the laundry may facilitate removal of undesired dyes, such as the removal of dyes that have transferred to white or light colored fabric in the load, for interaction and subsequent removal with the dye absorbers.

When a dye absorber is supplied in the rinse phase 18, the rinse phase 18 may be considered a dye removal or dye scrubber phase which can be implemented as part of a rinse phase of the selected cycle of operation or independent of a rinse phase of the selected cycle of operation. In one example, a dye removal/dye scrubber rinse phase 18 may be implemented automatically, based on sensor data, or manually, based on a selection by the user through a user interface of the appliance.

Figure 9:
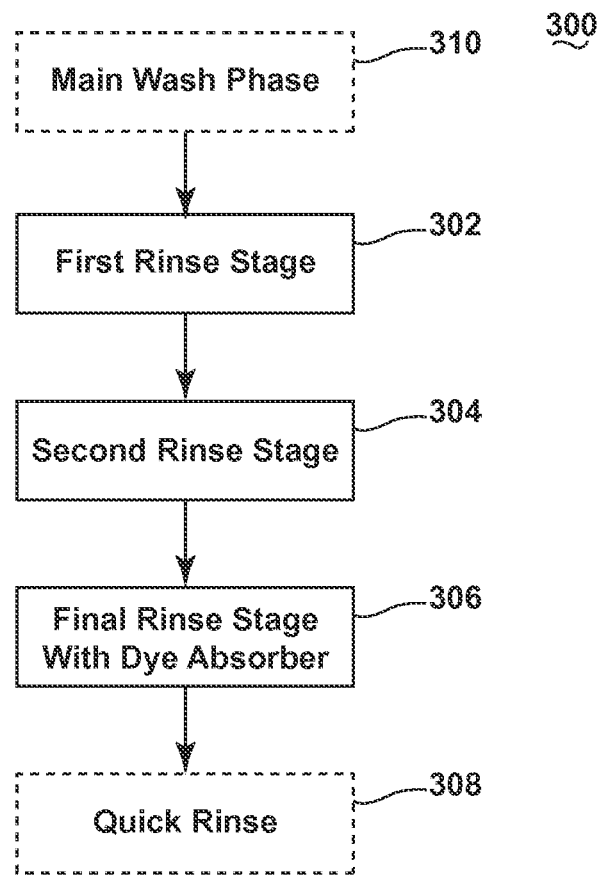
FIG. 9 is a flow chart illustrating a method for implementing a rinse phase according to an embodiment of the invention.

FIG. 9 illustrates an exemplary dye absorber rinse cycle 300 that may be used in the rinse phase 18 of the wash cycle 10, as part of another cycle of operation or as a separate cycle. The rinse cycle 300 may include a first rinse stage 302 followed by a second rinse stage 304. The first and second rinse stages 302 and 304 may include supplying a rinse liquid and/or rinse water to the treating chamber 62. The rinse liquid in the first and second rinse stages may include one or more treating chemistries, non-limiting examples of which include fabric softener, stain repellant, fragrance, wrinkle inhibitors, etc. . . . The first and second rinse liquid may also optionally include a dye absorber. During the final rinse stage, which in the exemplary rinse cycle 300 is the third rinse stage 306, the laundry may be rinsed in rinse liquid containing a dye absorber. Applicants have found that if dye absorber is not included in the final rinse stage 306, the likelihood of dye transfer occurring in the final rinse stage increases. While the rinse cycle 300 is illustrated as having three rinse stages, it will be understood that the rinse cycle 300 may have greater or fewer stages prior to the final rinse.

While not meant to be limited by theory, it is believed that during the first and second rinse stages 302 and 304 following a main wash phase 16 in which dye absorbers were supplied to the laundry, there may be enough residual dye absorbers carried by the laundry to inhibit dye transfer during the first and second rinse stages 302 and 304. However, each rinse stage rinses away at least a portion of the residual dye absorber. Thus, at the third rinse stage 306 the amount of residual dye absorber may be too low to inhibit dye transfer and a dye transfer event may occur. Supplying a rinse liquid in the third rinse stage 306 that includes dye absorber may inhibit dye transfer in the final rinse stage. In addition, even if dye transfer does occur in the first and second rinse phases without any dye absorber present, the dye transfer may still be removed in the third phase by supplying absorbers. However, if no dye absorber is present in the third/final rinse, there is no subsequent phase with absorber to remove the dye transfer. While additional dye absorber may be added in the rinse stages preceding the final rinse stage 306, this may not be necessary, for the reasons just discussed. In addition, too much dye absorber may be undesirable and may further increase costs to the consumer in the amount of chemistry they have to purchase.

Following the third rinse stage 306, an optional quick rinse 308 may be implemented with rinse liquid that does not include dye absorber to remove at least a portion of the dye absorber associated with the laundry. A quick rinse 308 may differ from the rinse stages 302, 304 and 306 in either or both a smaller amount of liquid supplied to the laundry and/or a shorter length of time the laundry is in contact with the liquid to minimize dye transfer. In addition, the quick rinse 308 may include minimal agitation of the laundry to minimize the likelihood of dye transfer by contact. The quick rinse 308 may be used to supply rinse liquid to remove at least a portion of the dye absorber associated with the laundry.

The combination of dye fixatives and dye absorbers in the same wash cycle may be complementary in that when a cationic dye fixative interacts with a fabric surface, the cationic dye fixative may provide a positive charge to the fabric surface which may attract soils, which are generally negatively charged. This attraction of loose soil may increase the appearance of fabric dinginess. The dye absorber in solution during the main wash phase 16 and rinse phase 18 may act as a sacrificial polymer that may preferentially attract the loose soils relative to the dye fixative on the fabric surface.

Stages 302 through 308 of the method 300 may be used with the wash cycle 10 or, alternatively, the method 300 may be used as a separate cycle. When part of a separate cycle, the method 300 may include a main wash phase 310. The main wash phase 310 may be similar to the main wash phase 16 of the cycle 10 in that the main wash phase 310 may include supplying dye absorbers to the laundry, however, the alternative cycle would not include the application of a dye fixative.

Figure 10:
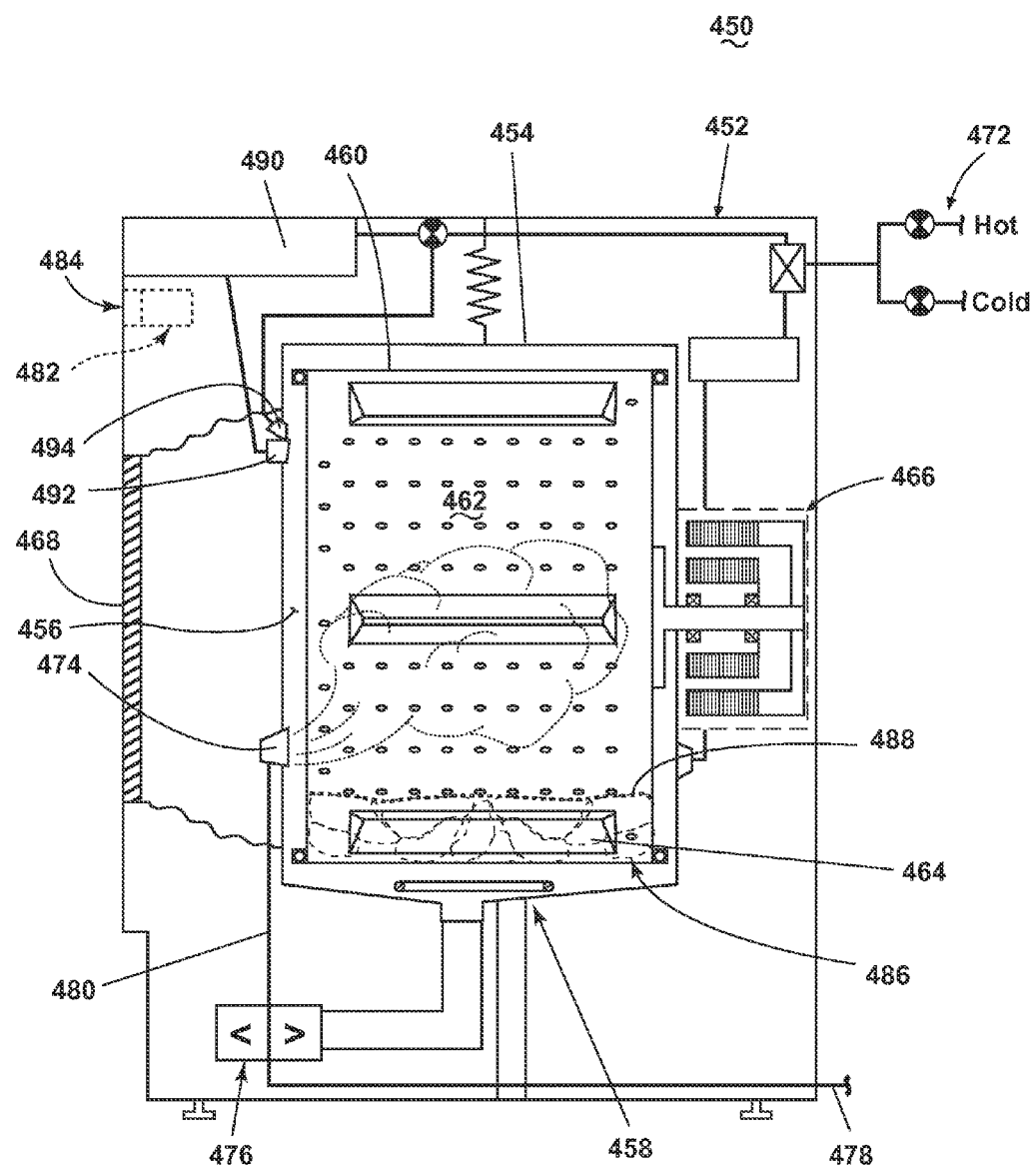
FIG. 10 is a cross-section, schematic side view of a horizontal axis clothes washer according to an embodiment of the invention.

FIG. 10 illustrates a clothes washer 450 that is similar to the clothes washer 50 except for the drum 460 is oriented generally horizontally rather than vertically. The clothes washer 450 is often referred to as a "front loader" or "horizontal axis" machine, even though the axis of rotation is not always perfectly horizontal. The clothes washer 50 is often referred to as a "top loader" or a "vertical axis" machine. Horizontal and vertical axis machines primarily differ in the manner in which they impart mechanical energy to the laundry. Horizontal axis machines impart mechanical energy by lifting and dropping, often referred to as tumbling, the laundry within the drum 460, whereas vertical axis machines have a clothes mover, such as an agitator, nutator, impeller, etc., within the drum which rotates to apply mechanical energy to the laundry. As many elements of the horizontal axis and vertical axis machines are similar, elements of the clothes washer 450 similar to those of clothes washer 50 have been labeled with the prefix 400.

The clothes washer 450 may also be used to implement the dye transfer prevention wash cycle 10 and any of the other methods described herein. However, because the orientation of the drum 460 and thus the orientation of the laundry within the treating chamber 462 is different in the horizontal axis clothes washer 450 than the vertical axis clothes washer 50, the manner in which liquid is supplied to the laundry may differ. It will be understood that all of the methods and compositions described herein may be used with both a horizontal axis clothes washer and a vertical axis clothes washer unless explicitly stated otherwise, even if the method or composition is described in the context of only one of the types of clothes washers.

The cycle 10 for a horizontal axis clothes washer may include the laundry load detection phase 22, which may be the same as that described above with respect to the vertical axis clothes washer 50 and the method 100, for example, or differ in the use of other inertia-based methods that are configured for use with horizontal axis clothes washers. However, in a horizontal axis clothes washer, the pre-wetting phase 12 may be skipped and the laundry may be initially wet in the pre-wash phase 14.

Application of a dye fixative in the pre-wash phase 14 in the context of the horizontal axis clothes washer 450 may include a combination of spraying a recirculating dye fixative solution into the treating chamber 462 from the tub 454 with the recirculation sprayer 474 and rotating the laundry through the dye fixative solution in the tub 454. For example, a dye fixative may be dispensed from a dispenser 490 and mixed with water supplied into the tub 454 from the water supply 472. The dye fixative and water supplied to the tub 454 may be mixed by recirculation through the recirculation conduit 480 without application to the laundry to form a dye fixative solution.

The drum 460 may be rotated such that the laundry rolls, flips, or tumbles through the dye fixative solution collected in the sump area 458 of the tub 454 with optional dwell times to facilitate wicking of the dye fixative solution. The dye fixative solution may also be continuously or intermittently sprayed into the treating chamber 462 through the recirculation sprayer 474, such as according to the method 120 of FIG. 5, for example. In this manner, both the exposed first strike surface 488 of the laundry facing the treating chamber 462 and the opposite side of the laundry facing the sidewall of the drum 460 are wet with the dye fixative solution. The drum 460 may further be rotated at increasing speeds up to a satellizing speed such that the laundry 486 redistributes within the drum 460 to expose additional laundry surfaces for wetting with the dye fixative solution. For some small loads it may not be necessary to recirculate solution through the sprayer 474 to adequately wet the load with the dye fixative solution.

Figure 11:
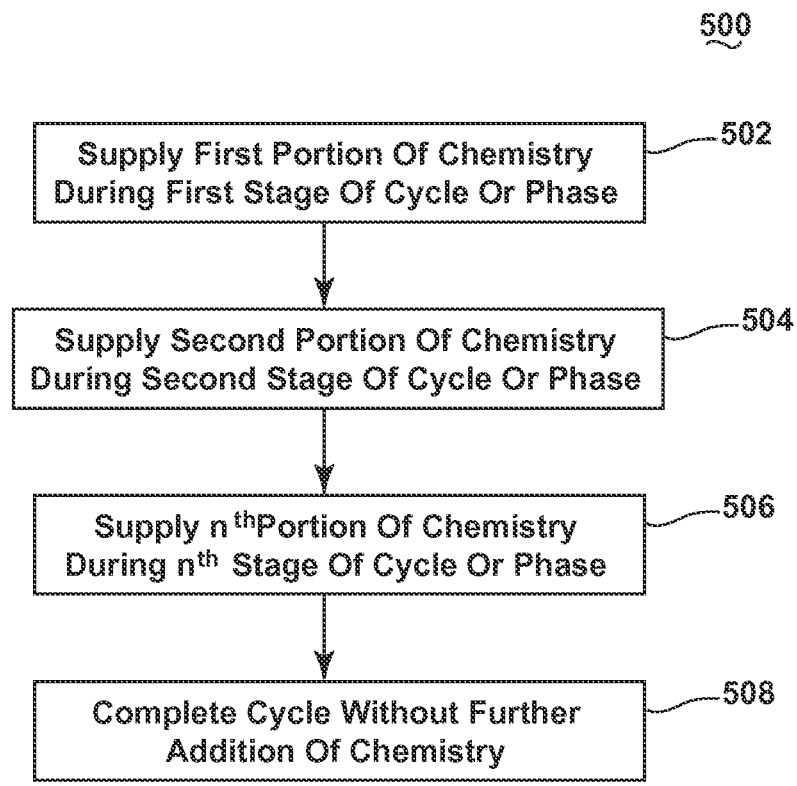
FIG. 11 is a flow chart illustrating a method for supplying a treating chemistry according to an embodiment of the invention.

Referring now to FIG. 11, a dispensing control method 500 for dispensing dye fixatives and dye absorbers in a clothes washer is illustrated. The dispensing control method 500 may be used with the wash cycle 10 of FIG. 1 to dispense a dye fixative in the pre-wash phase 14 or a dye absorber in the main wash phase 16 or rinse phase 18. The dispensing control method 500 may also be used with any other cycle of operation to dispense a dye fixative, dye absorber, or other treating chemistry.

The method 500 may begin with supplying a first portion of the treating chemistry, such as a dye fixative or dye absorber, during a first stage of the cycle of operation or a first stage of a phase of the cycle of operation at 502. Supplying a portion of a treating chemistry may refer to dispensing a portion of an undiluted treating chemistry into a liquid (e.g. water, a wash liquid, or a rinse liquid) for dilution and then supplying the diluted treating chemistry to the treating chamber. Alternatively, supplying a portion of a treating chemistry may refer to supplying a portion of a treating chemistry solution in which a treating chemistry has already been diluted with a liquid. The first stage may refer to a beginning of the cycle or phase or a predetermined time period after the beginning.

At 504 a second portion of the treating chemistry is supplied during a second stage of the phase. An $n^{th}$ portion of the treating chemistry may be supplied at successively later stages of the phase at 506 until a final portion of the chemistry is supplied. The cycle or phase may be completed at 508 without further addition of the treating chemistry. The amount of treating chemistry supplied during each stage of the cycle or phase and the timing within the phase during which the treating chemistry is supplied may be determined experimentally or empirically so as to maintain a concentration of the treating chemistry in the treating chamber at a predetermined concentration or within a predetermined range based on the treating chemistry.

A control system, such as an open loop control system, may be used to control the amount and timing of supplying at each stage based on the treating chemistry being supplied according to a control algorithm associated with the control system. The treating chemistry may be supplied at each stage as either a single shot at a beginning of each stage or supplied intermittently or continuously throughout the course of each stage. When the treating chemistry is supplied throughout the stage, the amount of chemistry supplied may be controlled by controlling a rate at which the chemistry is supplied or a duration of on/off times of a pump for supplying the chemistry. This may include controlling the rate or on/off periods of a dispenser metering pump or a pump used for recirculating liquid from the sump into the treating chamber. The type of treating chemistry may be determined automatically based on sensor information or the selected cycle information or may be determined manually based on user input.

For example, the first portion of the treating chemistry supplied at the beginning of the phase may be determined to be an amount which brings the concentration of the treating chemistry in the treating chamber to within a predetermined preferred or effective range, above a predetermined lower threshold and/or below a predetermined upper threshold. The amount of the second portion of treating chemistry and the timing of the second stage may be determined so as to maintain the concentration of the treating chemistry in the treating chamber within the predetermined range such that the concentration of the treating chemistry remains relatively constant from the first stage to the second stage. The amount of each $n^{th}$ portion and the timing of each $n^{th}$ stage for dispensing may be determined so as to maintain the concentration of the treating chemistry within the predetermined range throughout each stage. The amount and timing of the last portion of treating chemistry supplied during the last stage may be determined so as to maintain the concentration of the treating chemistry within the predetermined range until the end of the cycle or phase.

An exemplary algorithm for controlling dispensing according to the method 500 may include supplying 50% of a total dose of a treating chemistry at the beginning of the cycle or phase, supplying the next 35% of the total dose over the course of the first half of the cycle or phase, and the remaining 15% of the total dose during the third quarter of the cycle or phase with no additional treating chemistry supplied during the final quarter of the cycle. In this manner, as the treating chemistry is depleted or "used up" as the cycle or phase progresses, the remainder of the treating chemistry dose may be supplied to replenish the depleted treating chemistry such that the concentration of the treating chemistry remains relatively constant as the cycle or phase progresses.

Alternatively, rather than an open loop control system in which the dispensing of the treating chemistry is not controlled based on feedback to the controller, the method 500 may be implemented using a closed loop system based on sensor information. A sensor system may be configured to provide sensor data indicative of a concentration of the treating chemistry which may provide feedback to the closed loop system which includes a control algorithm to vary the amount and/or timing of the treating chemistry supplied. For example, the closed loop system may continuously vary a rate at which treating chemistry is supplied during each stage based on the feedback from the sensor system.

The sensor system may include any suitable system for determining a characteristic of the liquid indicative of the concentration of a dye(s) in the liquid. The sensor system may determine the concentration of the dye in liquid that is being recirculated within the clothes washer, collected in the sump of the clothes washer or drained from the clothes washer. Non-limiting examples of suitable sensor systems include ultraviolet or visible light absorbance/transmittance or fluorescence systems, a conductivity sensor, and/or a turbidity sensor.

For some chemistries, such as dye fixatives and dye absorbers, it may be desirable to maintain the concentration of the chemistry within a predetermined range to avoid failure modes and unnecessary costs to the consumer. The concentration of available dye fixative or dye absorber in solution, i.e. fixative or absorber that is available for associating with dye molecules, may decrease over time through the course of the cycle or phase as the fixative or absorber complexes with dye in solution or on fabric or otherwise becomes unavailable, such as by interaction with surfaces of the clothes washer or other contaminants in solution. As the amount of available dye fixative or dye absorber is depleted, the concentration of the dye fixative or dye absorber may decrease to a concentration outside of a predetermined range or below a predetermined threshold, making it difficult to maintain a constant concentration throughout the cycle or phase or to keep the concentration within a predetermined range or above a predetermined threshold.

If there is not enough available dye fixative or dye absorber in solution, the fixative/absorber may not be able to adequately prevent dye transfer. For example, for dye absorbers, sufficient available dye absorber in solution may be needed to ensure that sufficient absorber is present to capture and suspend any fugitive dyes in solution before the dyes can redeposit on another garment in the laundry. If the concentration of dye fixative is too low, there may not be sufficient dye fixative present to prevent the liquid in the treating chamber from lifting the dye from the fabric.

One way to address the depletion of available dye fixative/dye absorber through the course of the phase or cycle may be to add a high concentration of dye fixative/dye absorber, e.g. a concentration higher than the desired predetermined range or threshold. However, if the concentration is too high, the possibility of fixatives/absorbers depositing on components of the clothes washer and leading to undesired build-up may increase. In addition, for some fixatives, increasing the concentration above a certain threshold may decrease the efficacy of the dye fixatives and even exacerbate dye transfer. Some dye absorbers may form undesirable suds if the concentration becomes too high. Furthermore, even when the concentration of the dye fixative or dye absorber is increased at the beginning of the cycle such that the identified problems above are avoided, the concentration may still not be enough to maintain the concentration within a desired range through the course of the cycle or phase.

Figure 12:
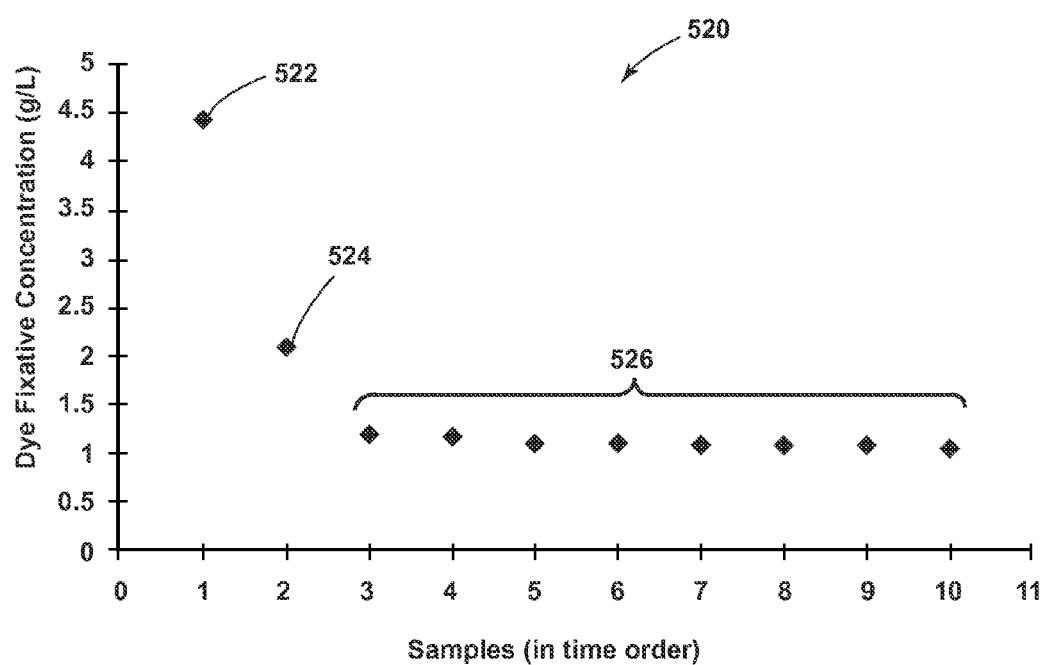
FIG. 12 is a graph representing change in concentration of a dye fixative over time according to an embodiment of the invention.

For example, FIG. 12 illustrates a graph 520 representing the change of a concentration of a dye fixative, such as a cationic methylene guanidine based dye fixative commercially available under the trade name Retayne™ (available from G&K Craft Industries), for example, during mixing of the dye fixative with treating liquid prior to the start of recirculation at 522, at the start of recirculation at 524 and at subsequent 30 second intervals during recirculation at 526. FIG. 12 is used for illustrative purposes only for the purpose of describing an embodiment of the invention and is not meant to limit the invention in any manner. Consider, for example, the case described above in which the dye fixative is supplied to the laundry in a concentration of about twice the desired concentration. For example, when the desired predetermined concentration range for the dye fixative for the cycle is 2-2.5 g/L, the dye fixative may be added at the beginning of the cycle or phase, prior to the start of circulation, at a concentration of approximately twice the desired concentration. As may be seen in FIG. 12, at the start of recirculation of the treating liquid at 524, the concentration of the dye fixative has already decreased from the initial concentration of almost 4.5 g/L to about 2 g/L. As the cycle or phase continues, the concentration of the dye fixative decreases further to about 1 g/L, which is below the desired predetermined range. Thus, simply overcharging the dye fixative at the start of a cycle or phase may not be suitable for maintaining the concentration of the dye fixative within the predetermined range throughout the course of the cycle or phase.

While the open and closed loop control systems of the method 500 have been described in the context of dye fixatives and dye absorbers, the method 500 may be useful with other treating chemistries as well, such as detergents, surfactants or bleaches, for example. For example, in a cold water sanitization cycle, the concentration of chlorine may be kept relatively constant at a low level throughout the course of the cycle or phase that is sufficient to sanitize the laundry while not affecting the colorfastness of the laundry. However, if the concentration varies outside a predetermined range, either sanitization may not be achieved or colorfastness of the laundry may be effected.

Figure 13:
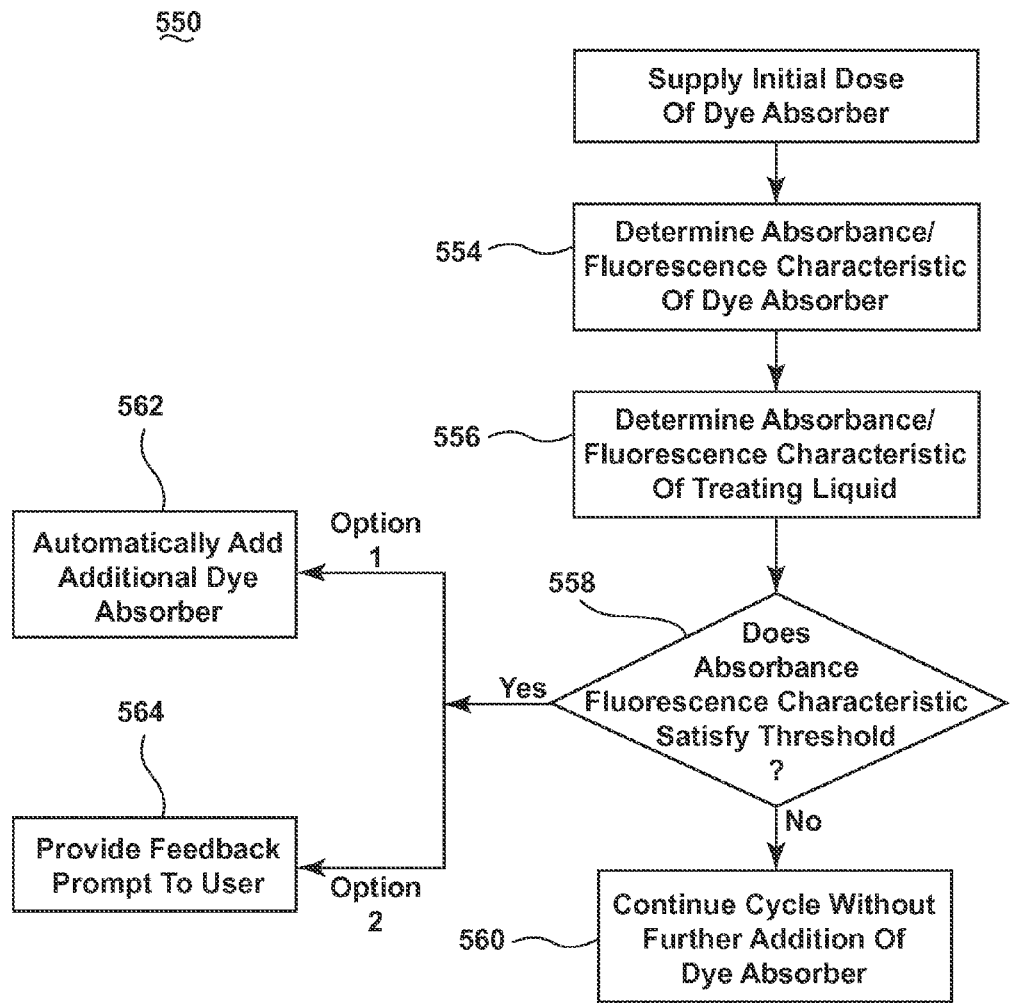
FIG. 13 is a flow chart illustrating a method for determining an amount of dye absorber to supply during a cycle of operation according to an embodiment of the invention.

Referring now to FIG. 13, a method 550 for determining an amount of dye absorber to add during a cycle of operation is illustrated. The method 550 may be used to control the supply of dye absorber to the laundry as needed so as to provide sufficient dye absorber in solution to inhibit dye transfer while minimizing excess dye absorber. The method 550 may be used with the closed loop system of method 500 or any other method for dispensing a dye absorber. While the method 550 is described in the context of dye absorbers, it will be understood that the method 550 may be used in a similar manner with dye fixatives or other chemistry.

The method 550 begins with the assumption that a user has loaded the clothes washer with one or more laundry items and selected a cycle of operation which uses dye absorbers. At 552 an initial dose of dye absorber may be supplied to the treating chamber for treating the laundry. The amount of initial dye absorber supplied may be determined automatically based on sensor data, characteristics of the load (e.g. load amount), or the selected cycle, for example, or manually based on information provided by the user.

At 554 an absorbance and/or fluorescence (Abs/F) characteristic of the dye absorber, which will be described in further detail below, may be determined. The Abs/F characteristic may be of the dye absorber or of a composition which includes a dye absorber. The Abs/F characteristic of the dye absorber may be determined based on information stored in a memory accessible by a controller of the clothes washer. The information may be in the form of a look-up table of absorbance or fluorescence spectra or data for different dye absorbers. The identity of the dye absorber may be determined automatically based on sensor data or manually based on user input and used to find the absorbance or fluorescence spectra or data for the dye absorber in the look-up table. Alternatively, the absorbance or fluorescence spectra for the dye absorber may be determined by the clothes washer prior to application of the dye absorber to the laundry items. In one example, the identity of the dye absorber may be determined using one or more sensors in the dispenser to determine a characteristic of the dye absorber and a look-up table stored in the controller may be used to determine the identity and/or spectra for the identified dye absorber. In yet another example, the identity of the dye absorber and/or the Abs/F characteristic may be determined based on information carried by a container storing the dye absorber that may be communicated wirelessly with the clothes washer controller (e.g. through an RFID system) or through a hard-wire connection or which may be read by an appropriate sensor provided on the clothes washer (e.g. a bar code/bar code reader system).

At 556 an Abs/F characteristic of the treating liquid after the dye absorber has been supplied to the laundry in the treating chamber may be determined. The Abs/F characteristic may be based on the absorbance or fluorescence of a dye absorber-dye complex in solution or suspended within the liquid mixture, which may be representative of the dye absorber level in the liquid mixture. The Abs/F characteristic may be determined based on output provided by an optical sensor representative of a sensed spectral absorbance and/or fluorescence of the treating liquid. It will also be understood that when referring to absorbance herein, transmittance, which is related to absorbance, may be used as an alternative to absorbance or in order to determine the absorbance. For some dyes and dye absorbers, the dye absorber-dye complex UV and/or visible light absorbance or fluorescence spectrum may be measurably different than the absorbance or fluorescence spectrum for the individual dye and dye absorber components of the complex. The Abs/F characteristic may be based on the absorbance/fluorescence of the treating liquid at a single wavelength or over a range of wavelengths.

Figure 14:
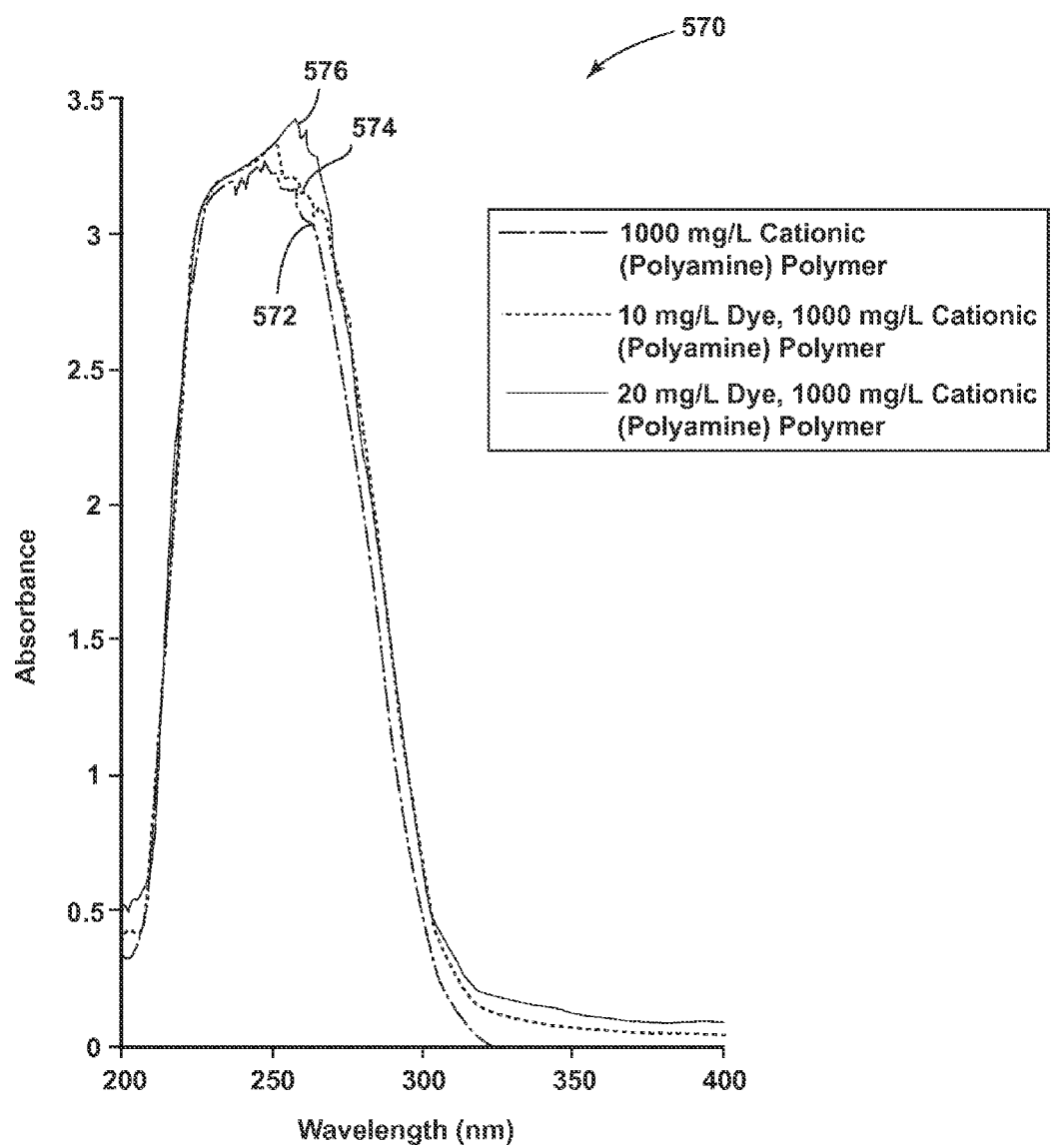
FIG. 14 is a representative absorbance spectrum for a dye absorber in the presence and absence of a dye according to an embodiment of the invention.

FIG. 14 illustrates an exemplary absorbance spectrum 570 for a cationic polyamine dye absorber in the presence and absence of a dye. As may be seen by dye absorber spectrum 572, the dye absorber in the absence of dye has a strong absorbance in the ultraviolet region. As may be seen by spectra 574 and 576, in the presence of increasing concentration of dye, 10 mg/L and 20 mg/L, respectively, the absorbance spectrum shifts compared to the absorbance spectrum 572 of the polyamine dye absorber alone. This shift in absorbance in the presence of dye may be used as an indication of the presence of a dye absorber-dye complex, which may be used to determine if enough dye absorber is present in the treating liquid to complex with dye in solution.

Referring back to FIG. 13, at 558 it may be determined if the Abs/F characteristic of the treating liquid satisfies a predetermined threshold at one or more wavelengths. This may include comparing the Abs/F characteristic to a predetermined reference value that may be a range of reference values, an upper threshold or a lower threshold. The reference value may be based on the known characteristics of the dye absorber. In the embodiment of FIG. 13, the threshold is a lower threshold. If the Abs/F characteristic satisfies the lower threshold it may be determined that there is not sufficient uncomplexed dye absorber in solution and one of two options 562 or 564 may occur. If the Abs/F characteristic does not satisfy the lower threshold, it may be determined at 560 that there is uncomplexed dye absorber in solution and additional dye absorber is not needed. The term "satisfies" the threshold is used herein to mean that the variation satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

In a first option 562, an additional dose of dye absorber may be automatically supplied to the laundry. The amount of the additional dose of dye absorber may be a predetermined amount of dye absorber based on the Abs/F characteristic of the treating liquid determined at 558 or independent of the Abs/F characteristic. The Abs/F characteristic of the treating liquid may then be determined again at 556 and a determination of whether the Abs/F characteristic of the treating liquid is below the predetermined threshold is made at 558. The elements 556, 558 and 562 of method 550 may be repeated a predetermined number of times or until the Abs/F characteristic is below the threshold.

Alternatively, or additionally, a second option 564 includes communicating to the user that the amount of dye absorber was low or may not have been sufficient for the load and providing the user with additional instructions. In one example, the user may be prompted to add more dye absorber to the treating chamber and restart the cycle. This may be useful in clothes washers with single dose dispensers in which the entire dose of dye absorber provided in the dispenser is supplied to the treating chamber. In another example, the user feedback could include warning the user to inspect the load at the end of the cycle and optionally warning the user to not dry the laundry under high heat. In another example, the feedback may include communicating information to the clothes dryer to dry at a low temperature or to block a high temperature selection, in a manner similar to that described below in method 1500 of FIG. 26.

One example of a dye fixative composition according to an embodiment of the invention, which may be suitable for use according to any of the methods described herein, includes three cationic dye fixatives providing the composition with a tri-modal molecular weight distribution, i.e. the composition contains three different discrete populations, each within a predetermined range of weight average molecular weight Mw. The combination of cationic fixatives having three different Mw may be selected to inhibit dye bleeding of different dye types within a mixed load of laundry or within a laundry item having multiple dye types. As discussed above, the various dye types interact with the fabric differently and thus it is challenging to find a single dye fixative that can address dye bleeding for all of the different dye and fabric types.

For example, acid dyes are typically smaller than direct dyes and thus have a higher diffusivity and smaller conformation. A suitable dye fixative for acid dyes may be a dye fixative that is capable of forming a direct electrostatic bond with an individual acid dye molecule and neutralize the charge. In addition, because acid and reactive dyes are typically small molecules, generally in the range of 10 kDa, a dye fixative for acid and reactive dyes may have to have high diffusivity to reach the fabric surface before the acid/reactive dyes release from the fabric surface.

Direct dyes in contrast are larger molecules with anionic sites that remain on fabrics because of favorable partitioning with the fabric as compared to the wash liquid. A suitable dye fixative for direct dyes may be a large cationic molecule that can bind to negatively charged fabric surfaces, such as cotton/cellulose, and form a polymeric film on the fiber surface to prevent the release of direct dyes from the surface. Because direct dyes are typically large molecules, small fixative molecules are not always effective at inhibiting release of direct dyes from fabric surface.

According to one embodiment, the dye fixative composition may be designed so as to inhibit dye bleeding of both direct and acid dyes. The first dye fixative may be a large polymer having cationic functional groups capable of inhibiting dye bleeding of direct dyes having an Mw greater than 200 kDa and a zeta potential greater than 20 mV. Non-limiting examples of polymers suitable for use as the first dye fixative include cationic polymers containing functional groups selected from the group consisting of primary, secondary, and tertiary amines and their salts, quaternary ammonium and phosphonium salts, such as poly diallyl dimethyl ammonium chloride (DADMAAC) and poly(acrylamide-co-diallyldimethyl ammonium chloride), polyacrylamide, and polyethyleneimine. In one example, the first dye fixative may include a reactive functional group, such as a vinyl group, a reactive hydroxyl group or an epoxy, for example, which may form a covalent bond with the fabric.

The second and third dye fixatives may be selected so as to inhibit dye bleeding of reactive/acid dyes. The second dye fixative may be selected from polymers having cationic functional groups having an Mw less 10 kDa but greater than 1 kDa and a zeta potential of greater than 20 mV. Non-limiting examples of polymers suitable for use as the second dye fixative include cationic polymers containing functional groups selected from the group consisting of primary, secondary, and tertiary amines and their salts, and quaternary ammonium and phosphonium salts.

The third dye fixative may be selected from surfactants, polymers and/or monomers having an Mw less than 1 kDa, a zeta potential greater than 20 mV and a diffusivity greater than $5 \times 10^{-6}$ cm$^2$/s. Non-limiting examples of substances suitable for the third dye fixative include cetyl trimethyl ammonium bromide (CTAB), cetyl pyridinium bromide (CPB); diallyl dimethyl ammonium chloride (DADMAAC). In one example, the dye cationic fixative includes at least one polymer and/or monomer having a cationic functional group in combination with a cationic surfactant.

The combination of different Mw dye fixatives are selected so as to address dye bleeding from multiple different types of dyes. Contrary to an industrial setting in which the fabrics and dye types are uniform and/or at least well known to the user, in a residential setting different fabrics and dye types may be mixed into a single load and therefore a dye fixative composition that may address dye bleeding from different dye types may be beneficial to the user in a residential setting. In addition, the smaller, high diffusivity cationic molecules of the second and third dye fixative may partition to the fabrics first compared to the larger polymer of the first dye fixative. The initial layer of smaller cationic molecules on the fabric surface, such as a cellulose fabric surface, may diffuse the negative surface charge of the cellulose, providing improved transportation of the larger cationic molecules on the cellulose and hence improved distribution.

The dye fixative composition may also include an anionic fixative that has a very low diffusivity and partitioning coefficient onto the laundry fabric so that the anionic fixative partitions onto the fabrics last, after the first, second and third dye fixatives. The anionic fixative may inhibit dye bleeding for acid dyes by fixing on a positively charged nylon surface and forming a polymeric film on the surface. In addition, the anionic fixative may interact with the cationic dye fixative which has already deposited onto a fabric surface, such as a cotton surface, and decrease or neutralize the positive charge imparted to the surface by the dye fixative. This may decrease the attraction of negatively charged soils to the fabric surface. Alternatively, the rate at which the anionic fixative deposits on the fabrics surface relative to the cationic dye fixative may be slowed by selecting an anionic fixative that has a larger molecular weight than the cationic dye fixative. Non-limiting examples of anionic fixatives include polymers with the following functional groups—sulfonate, carboxylate, acrylic acid, some examples of which include poly(acrylic acid), poly (methaacrylic acid), poly(styrene sulfonate), poly(acrylamide-co-acrylic acid), poly(vinylsulfonic acid). In an exemplary embodiment, the anionic fixative has an $M_w$ of 200 kDa or greater.

The first and second dye fixatives may comprise a polymer having cationic functional groups, as described above. Alternatively, either or both the first and second dye fixatives may be a zwitterionic molecule that includes both cationic and anionic functional groups that become charged depending on cycle conditions. Non-limiting examples of cationic functional groups include primary, secondary, and tertiary amines. Non-limiting examples of anionic functional groups include sulfonates and carboxylates. The zwitterionic molecule may be selected to provide the desired cationic or anionic charge at a predetermined time or stage during a cycle of operation. In one example, the zwitterionic molecule may include a cationic functional group that is charged at least between pH 6-8.

In another example, either or both the first and second dye fixatives may include a dye-reactive functional group covalently bonded to the dye fixative to destroy or otherwise disable the ability of a dye to color a fabric. The dye-reactive functional group may include a reactive group, such as an oxidizing agent (e.g. sodium hypochlorite) or a reducing agent (e.g. sodium thiosulfate). In another example, the dye-reactive functional group may include catalyst materials that generate oxygen radicals, which may be short lived. Non-limiting examples of suitable oxygen radical generating functional groups include metal silicates, polyoxometalates and/or other metal complexes. In one example, the first dye fixative may be configured to partition preferentially to the fabric surface such that the reactive functional group is available to react with loose dyes adjacent the fabric surface.

The dye fixative composition may further include an oxidizing agent, such as hydrogen peroxide or a peroxide generating substance, and is preferably acidic, having a pH less than 7. Preferably, the oxidizing agent is active at cold wash temperatures (e.g. less than 85° F.). A non-limiting example of a suitable oxidizing agent includes peracetic acid. In one example, the oxidizing agent may be a component of the dye fixative formulation. In another example, the dye fixative may include chemicals that interact with a component of the wash detergent composition to produce hydrogen peroxide, non-limiting examples of which include an enzyme alcohol oxidase provided in the dye fixative composition that reacts with ethanol present in the wash detergent composition to produce hydrogen peroxide. In another example, the dye fixative formulation may include acetic acid in an amount to provide the dye fixative formulation with a pH less than 7.

Another example of a dye fixative composition includes a mixture of cationic surfactants and nonionic surfactants that are capable of forming self-assembled monolayers on the surface of the fabric. In one example, the mixture can include a mixture of cationic surfactants and high hydrophyllic-lipophyllic balance (HLB) nonionic surfactants. The cationic surfactants may have a zeta potential of greater than +20 mV. In one example, the zeta potential is preferably between +20 mV and +40 mV. The nonionic surfactants may have an HLB in the range of 8-14. The cationic surfactants are capable of electrostatic interaction with the surface of the fabric, such as a cotton fabric, for example, and may form a first monolayer on the fabric surface which retains the dye at the fabric surface. The nonionic surfactants may provide screening of the electrostatic repulsion between the head groups of the cationic surfactants and further allow for a higher packing density of the assembled surfactant layer on the fabric surface. The length of the alkyl chains of the surfactants may be selected so as to provide a film having a predetermined thickness on the fabric surface. In addition, a ratio of the concentration of the cationic and nonionic surfactants may be selected to provide a desired packing density when assembled at the fabric surface. For example, a lower packing density may allow for penetration of water through the film to the fabric surface to facilitate the removal of soils from the fabric surface, while still retaining the dye at the fabric surface. Alternatively, the packing density may be selected so as to provide little to no water penetration of the film.

An example of a dye absorber composition according to an embodiment of the invention, which may be used according to any of the methods described herein, includes a combination of cationic and nonionic dye absorbers. There are a variety of different dye types with different surface charges. For example, direct and acid dyes generally are negatively charged while disperse and vat dyes are typically neutral under conditions normally found in a wash liquid during a wash cycle in a clothes washer. The dye absorbers of the composition may be selected to accommodate the various types of loose dye that may bleed during a cycle of operation.

The cationic dye absorber component may include a water soluble cationic absorber, examples of which are well known, such as polyvinylpyrrolidone. In another example, the cationic dye absorber may include a zwitterionic dye absorber that becomes cationically charged depending on conditions in solution in the treating chamber. The cationic dye absorber component may also include a surfactant system comprising one or more cationic surfactants configured to be present in the treating liquid when applied to the laundry at a concentration above the critical micelle concentration (CMC) of the surfactants. Cationic surfactants above the CMC may interact with acid and direct dyes such that loose dye, for example dye that has transferred to other fabrics in the load, which is not removed by a long chain cationic polymeric dye absorber, may be removed by the cationic surfactants. Non-limiting examples of suitable cationic surfactants include cetyltrimethylammonium bromide (CTAB) and cetylpyridinium bromide (CPB).

The nonionic dye absorber component may include emulsifiers to absorb disperse and vat dyes in solution. In one example, the emulsifier may be a surfactant system. In one example, the surfactant system includes one or more nonionic surfactants having an HLB in the range of 8 to 18 and capable of forming micelles between 10 to 40° C. in an aqueous solution. Preferably, the nonionic surfactants are configured to be present in the treating liquid when applied to the laundry at a concentration above the CMC of the surfactants. An exemplary surfactant system may also include a block co-polymer. In another example, the surfactant system may additionally or alternatively include one or more zwitterionic or amphoteric surfactants. In yet another example, the emulsifier may additionally or alternatively include host-guest complexes, such as cyclodextrin, for example.

In another example, the emulsifier of the nonionic dye absorber component may be in the form of colloidal particulates which form a Pickering emulsion. In general, colloidal particulates are considered as changing the interfacial energy to form stable emulsions of dye molecules in the liquid, rather than changing the surface tension of the liquid. Colloidal particulates, such as nano-crystalline cellulose, silica, particulates with positively charged functional groups, clay or silica-covered particles, for example, can act as Pickering emulsions to complex with and suspend dye molecules in solution.

The dye absorber composition may also include additional adjuncts, non-limiting examples of which include chelators and builders, such as EDTA and STPP.

Figure 15:
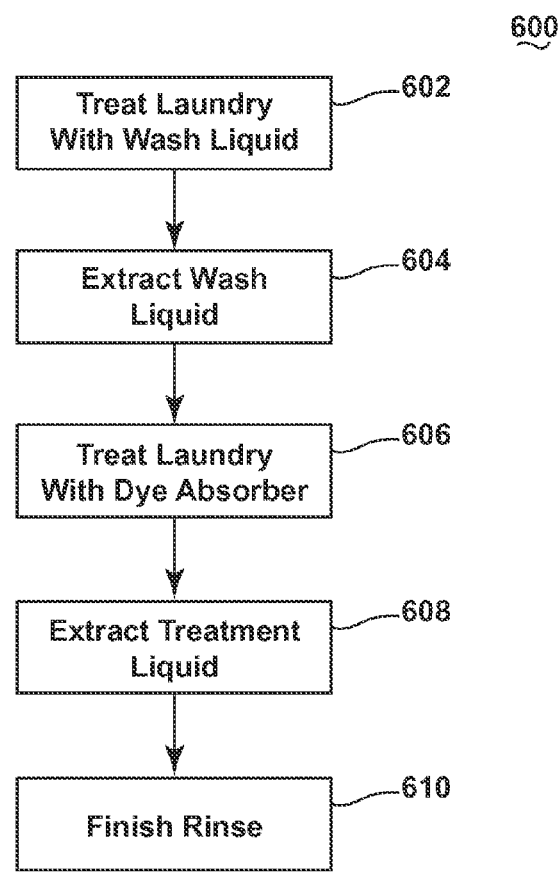
FIG. 15 is a flow chart illustrating a method for removing dye according to an embodiment of the invention.

FIG. 15 illustrates a method 600 for removing dye that is loose in solution or has transferred to other fabric in the laundry load which may be used with the dye absorber composition just described including a combination of cationic and/or nonionic dye absorber components. The method 600 may be used with the wash cycle 10, other wash cycle, or as a separate cycle of operation. The method 600 may be implemented during a cycle of operation to remove loose dye that has transferred in the currently running cycle. Alternatively, the method 600 may be used to remove loose dye that has transferred in a previously run cycle. The method 600 includes treating the laundry with a wash liquid including at least one surfactant and optionally enzymes, such as a laundry detergent, to lift soils from the fabric at 602, such as may occur during a main wash phase of a wash cycle. Following treatment with a wash liquid at 602, the laundry load may be rotated at high speeds to extract the wash liquid, which includes the detergent composition and soil which has been lifted from the laundry, from the laundry load at 604.

At 606 the laundry may be treated with a dye absorber composition. In one exemplary embodiment, the dye absorber composition may include a combination of the cationic and nonionic dye absorber components described above. The dye absorber composition may optionally include zwitterionic dye absorber components, as described above, without the addition of additional anionic surfactants and/or enzymes (e.g. no additional laundry detergent is added).

The dye absorber composition may include at least one water soluble cationic dye absorber, a surfactant system comprising at least one surfactant and an emulsifier. The at least one water soluble cationic dye absorber may include a polymeric dye absorber, such as polyvinylpyrrolidone, or a zwitterionic dye absorber that becomes cationically charged depending on conditions in solution in the treating chamber, for example. The surfactant system may include cationic and/or nonionic surfactants above the CMC. Non-limiting examples of suitable cationic surfactants include cetyltrimethylammonium bromide (CTAB) and cetylpyridinium bromide (CPB). Non-limiting examples of suitable nonionic surfactants include surfactants having an HLB in the range of 8 to 18 and capable of forming micelles between 10 to 40° C. in an aqueous solution The emulsifier may include a Pickering emulsion to complex with dyes in solution or that may have transferred to other fabrics. In one example, the emulsifier component may include cationic colloidal particulates capable of forming Pickering emulsions to complex with loose acid and direct dyes present in solution or that may have transferred to other fabrics. Additionally, or alternatively, the surfactant system may include nonionic surfactants present above the CMC to complex with loose disperse and vat dyes in solution or that may have transferred to other fabrics. In another example, the emulsifier component may include a host-guest complex. In yet another example, the emulsifier component may include a surfactant system comprising at least one surfactant present at a concentration above the CMC of the at least one surfactant.

The dye absorber treatment phase 606 may include mechanical agitation to facilitate removal of loose dyes, such as loose dyes that may have transferred onto light or white colored fabrics. In this manner the dye absorber treatment phase 606 may be considered a dye removal or dye scrubber phase in that dye absorbers are supplied to the laundry to complex with dyes for removal from the laundry load. While the dye absorber treatment phase 606 is described for use with the composition including a combination of cationic and nonionic dye absorbers described above, it will be understood that the dye absorber treatment phase 606 may be used with other dye absorber compositions in a similar manner. In addition, while the dye absorber composition is described in the context of the method 600, the composition may be used with other methods.

The concentration of one or more of the surfactants in the dye absorber composition may be monitored during the treatment phase 606 to maintain the concentration above the CMC for that particular surfactant. The concentration may be monitored using one or more sensors or may be determined empirically by the controller using pre-programmed algorithms and based on information related to the amount of laundry, the volume of liquid supplied during the cycle of operation, the amount of absorber composition supplied and/or the concentration of the dye absorber composition supplied. The concentration may be controlled by controlling the dosage of the surfactant and/or controlling an amount of water supplied to the treating chamber. For example, if the concentration is too high above the CMC, additional water may be added to dilute the surfactant concentration. In another example, if the concentration is too low, additional dye absorber composition may be added to increase the surfactant concentration.

The amount of treating composition to supply to the treating chamber during the treatment phase 606 may be based on the amount of treating chemistry provided to the dispenser and/or based on an amount of laundry in the treating chamber. The amount of laundry may be determined during a load amount determining phase that may be part of the method 600 or part of the cycle of operation used with the method 600. In one example, the laundry treating appliance may use the load detection phase 22 described above with respect to FIG. 1 or any other suitable load detection method to determine the amount of laundry. In another example the load amount may be determined based on input by the user related to the load amount. In yet another example, the amount of treating composition can be supplied based on an amount of liquid supplied to the treating chamber to achieve the desired concentration of surfactants in the treating liquid during the treatment phase 606.

At 608 the treatment liquid applied at 606 may be extracted from the laundry. This may include draining treatment liquid collected in a sump of the clothes washer so that it is no longer recirculated back onto the laundry and may optionally include spinning the laundry at high speeds to facilitate the extraction of liquid from the laundry. The dye absorber treatment at 606 and extraction at 608 may be repeated one or more times and may be considered part of a dye removal or dye scrubber phase to remove dye that is loose in solution and/or has transferred to other fabric in the laundry load implemented as part of a rinse phase of a wash cycle or independent of a rinse phase of a wash cycle. Following the extraction at 608, a final rinse may be implemented at 610. The final rinse may include additional dye absorber and optionally other rinse agents, such as a fabric softener, for example. Alternatively, the final rinse may include water or a rinse liquid which includes rinse agents, such as a fabric softener. If the final rinse at 610 includes dye absorber, the final rinse may be implemented with mechanical agitation of the laundry load; if the final rinse at 610 does not include dye absorber, the final rinse may be restricted to only mechanical motion which does not facilitate relative fabric-to-fabric motion, which may facilitate dye transfer.

Figure 16:
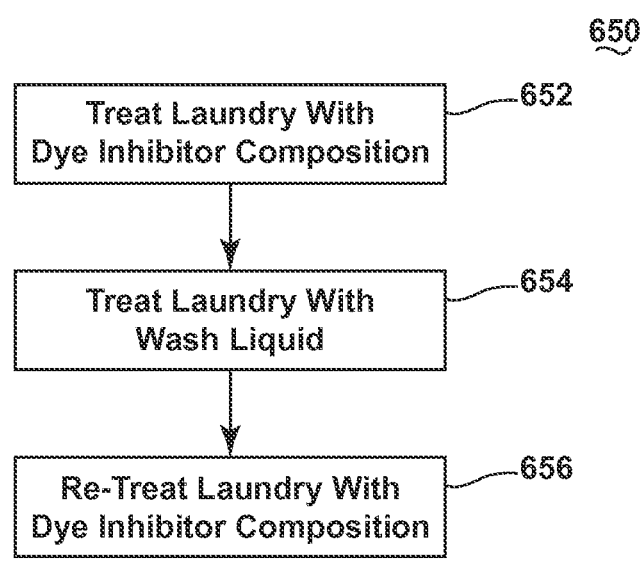
FIG. 16 is a flow chart illustrating a method for inhibiting dye transfer during a cycle of operation according to an embodiment of the invention.

FIG. 16 illustrates a method 650 for inhibiting dye transfer during a wash cycle which includes treatment of the laundry with a dye transfer inhibiting composition including a fabric softener and a dye absorber composition. The dye absorber composition may include the dye absorber composition described above which includes a combination of cationic and nonionic dye absorber components or some other dye absorber composition. The fabric softener may include at least one cationic small chain polymer and/or at least one silicone-based polymer which is capable of acting as a dye fixative. The method 650 may be used with the wash cycle 10, with another wash cycle or as a separate cycle of operation.

The method 650 begins with treating the laundry with a first dose of the dye inhibitor composition at 652. At 654, the laundry may be washed according to a wash phase of a selected cycle of operation with a wash liquid that includes at least one surfactant and optionally enzymes, such as a wash liquid containing a laundry detergent composition, to lift soils from the fabric. At 656, a second dose of the dye inhibitor composition may be supplied to the treating chamber for treating the laundry. The second dose of the dye inhibitor may be dispensed during a rinse phase to replenish fabric softener which may have been removed from the laundry during the wash phase at 654. The second dose of dye absorbers may facilitate removal of transferred loose dyes during the rinse phase.

While not meant to be limited by any theory, the softener component of the dye transfer inhibiting composition may form a thin film on the surface of the fabric from the electrostatic interaction of the positively charged fabric softener and the cellulose substrate that may fix or retain loose dyes on the surface of the laundry. The dye absorbers may be provided in the composition to complex with loose dyes in solution that may have been released from the surface of the laundry fabric. Some surfactants, especially those containing anionic functional groups, may increase the release of dyes from the fabric surface into solution during treatment with a laundry detergent including such surfactants. The presence of the fabric softener, which may act as a dye fixative to fix dyes at the surface of the laundry, in combination with dye absorbers available for complexing with loose dyes, may decrease the rate of release of dyes from the fabric surface and the subsequent dye transfer that may occur during washing with a laundry detergent.

Figure 17A:
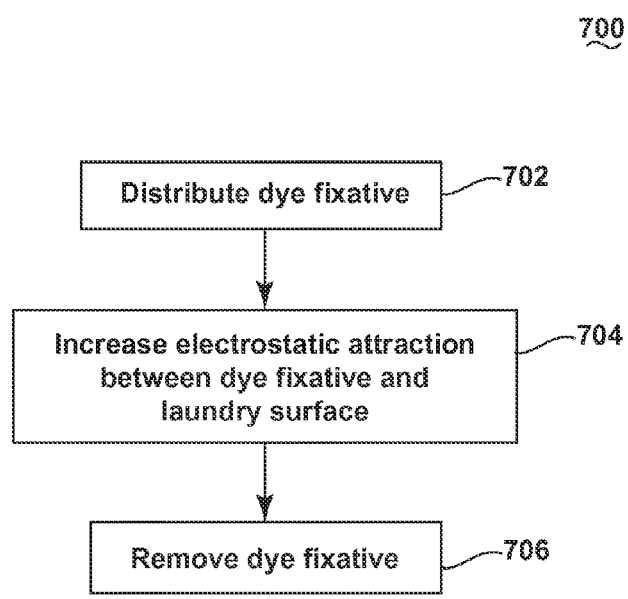
FIG. 17A is a flow chart illustrating a method for supplying a dye fixative to a laundry load according to an embodiment of the invention.

FIG. 17A illustrates a method 700 for facilitating distribution of a dye fixative on a laundry load. Dye fixatives may interact electrostatically with fabrics resulting in localized spots of high concentration of dye fixative and non-uniform distribution on the laundry items. For example, cationic dye fixatives can interact electrostatically with the cellulose of cotton fibers, making uniform distribution of the dye fixative on the fabric difficult. Uniform distribution of the dye fixative on the fabric facilitates inhibition of dye transfer from the fabric surface. The method 700 may utilize a dye fixative having a characteristic which may be adjusted or manipulated in order to control a strength of the interaction between the dye fixative and a fabric surface so as to facilitate the desired distribution, dye fixing and optional fixative removal. The method 700 may be used with the wash cycle 10 of FIG. 1 or any other suitable wash cycle.

The strength or degree of interaction between a charged molecule, such as a cationic dye fixative, and a charged surface, such as a cotton fiber surface, may be controlled by adjusting the potential of the molecule and/or the surface. Zeta potential is a measure indicative of a potential of a charged material in solution. Solution conditions, such as pH, ionic strength, temperature and pressure can affect the measured zeta potential of a material. The method 700 may be used with a dye fixative having a tunable or adjustable zeta potential which may be controlled to provide a desired degree of interaction between the dye fixative and a laundry surface.

The method 700 may begin at 702 with distributing a dye fixative to the laundry. Distributing the dye fixative may include supplying a treating composition comprising at least one dye fixative to wet or saturate the laundry. The treating composition may be configured to provide an essentially neutrally charged dye fixative. As used herein, a neutrally charged dye fixative is a dye fixative having a zeta potential near zero, preferably within ±10 mV. Providing a neutrally charged dye fixative to the laundry may provide a more uniform distribution of the dye fixative to the laundry by minimizing the electrostatic attraction between the dye fixative and the fabric surface. Minimizing the electrostatic attraction between the dye fixative and the fabric surface during the distributing at 702 may inhibit the formation of localized spots of high concentration of dye fixative by allowing the dye fixative to spread or distribute on the fabric surface before becoming strongly attracted to the surface.

Once the dye fixative has been distributed to the laundry, it is desirable to increase the strength of the interaction between the dye fixative and the fabric surface in order for the dye fixative to remain associated with the fabric surface and to interact with dye molecules associated with the fabric to inhibit transfer or bleeding of the dye molecules from the surface. Thus, at some predetermined point following the distribution of the dye fixative, at 704 the zeta potential of the dye fixative may be changed such that an electrostatic interaction between the dye fixative and the fabric surface and/or dye molecules associated with the laundry fabric increases.

Depending on the nature of the dye fixative and the fabric surface, the zeta potential of the dye fixative may be increased or decreased such that the electrostatic attraction between the dye fixative and the fabric surface increases. In the case of a cationic dye fixative and a cotton fabric, the zeta potential of the dye fixative may be increased to increase the electrostatic attraction between the dye fixative and the cotton fabric. The zeta potential of the dye fixative may be changed by altering the pH, ionic strength, temperature and/or pressure of the fluid within which the dye fixative is dissolved or suspended. For example, the pH may be changed to a desired pH by adding a suitable pH buffer or using electrolysis to alter the pH, as discussed further below. In another example, the ionic strength of the fluid may be changed by providing a salt or salt solution to the fluid. Non-limiting examples of salts that may be used to adjust the ionic strength include sodium chloride, sodium sulfate, and ammonium sulfate.

At 706, the dye fixative may be removed from the fabric surface, such as by changing the zeta potential of the dye fixative again to facilitate removal of the dye fixative from the fabric surface. For example, typically, it is desirable to have a dye fixative associated with the laundry fabric during a wash phase in a cycle of operation to inhibit dye transfer during the wash phase. As discussed previously, elements such as the detergent, temperature, amount of liquid and mechanical energy used during the wash phase may promote or facilitate dye transfer during the wash phase, thus making it desirable to use a dye fixative to inhibit dye transfer. However, it may not be desirable to leave the dye fixative on the laundry at the end of the cycle of operation. Thus, following the wash and/or a rinse phase or stage, the dye fixative may be removed prior to the end of the cycle of operation. The zeta potential may be changed in the same or a different manner than described above at 704. To facilitate removal of the dye fixative, the strength of the electrostatic attraction between the dye fixative and laundry fabric is decreased, which may make it easier to rinse off the dye fixative using a rinse liquid, for example. In one example, the strength of the electrostatic attraction may be decreased by changing the zeta potential of the dye fixative back to zero, preferably ±10 mV, to make it easier to rinse away the dye fixative.

Figure 17B:
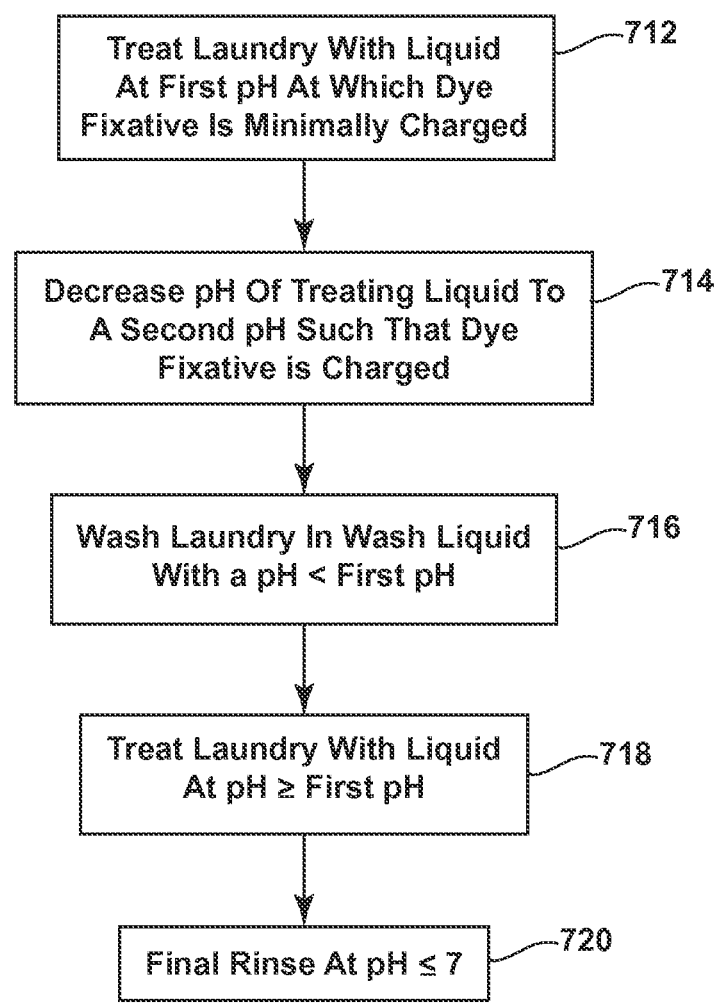
FIG. 17B is a flow chart illustrating a method for supplying a dye fixative to a laundry load according to an embodiment of the invention.

FIG. 17B illustrates an exemplary embodiment of the method 700 for facilitating distribution of a dye fixative on a laundry load in the context of a pH tunable dye fixative. In the example illustrated in FIG. 17B, the electrostatic interaction between the dye fixative and the fabric surface may be controlled by adjusting the pH of the liquid in which the dye fixative is dissolved or suspended in. The method 710 may begin at 712 with treating the laundry with a pH tunable dye fixative in a treating liquid at a first pH. A pH tunable dye fixative may refer to a polymer whose surface charge changes depending on the pH of the solution. The first pH may correspond to a pH at which the dye fixative is minimally charged, i.e. near the isoelectric point of the dye fixative. An exemplary class of pH tunable dye fixatives includes polymers having allylamine, vinylamine, acrylamide, ethyleneimine, or lysine based monomers or functional groups, poly(4-vinylpyridine), poly(2-vinylpyridine), poly(N,N-dimethylaminoethylmethacrylate), poly(2-diethylaminoethyl methacrylate), poly(N,N-diakyl aminoethyl methacrylate), poly(L-lysine), or chitosan.

An example of a suitable pH tunable dye fixative would be a dye fixative having a zeta potential of approximately ±10 mV at pH>8 and a zeta potential of greater than 20 mV at pH<6. For this exemplary dye fixative, the treating liquid at 712 may have a pH of approximately 8 or greater so as to provide a minimally charged or neutral dye fixative, to facilitate uniform distribution of the dye fixative to the fabric surface of the laundry, as discussed above.

At 714, the pH of the treating liquid may be decreased to a second pH which corresponds to a pH at which the majority of the dye fixative is charged. This may include adding liquid, such as a detergent, for example, to the treating liquid to bring the pH down to the second pH or, alternatively, the treating liquid supplied at 712 may be drained and fresh treating liquid at the desired second pH may be supplied to the laundry. Alternatively, electrolysis may be used to alter the pH. Electrolysis of the liquid produces an acid aqueous solution and an alkaline aqueous solution that may be used to change the pH of the wash bath. An example of using electrolysis in a domestic appliance is disclosed in U.S. Pub. No. 2013/0026046 to Sanville, et al., filed Jul. 6, 2011, entitled "On Site Generation of Alkalinity Boost for Ware Washing Applications," which is herein incorporated by reference in full. For the exemplary dye fixative described above, the second pH may be about 6 or less. Decreasing the pH to a value such that the majority of the dye fixative molecules are charged may facilitate fixing of the dye fixative to the fabric surface, which may promote the inhibition of dye transfer. The charged dye fixative molecule may have a stronger electrostatic bond with the fabric surface such that a dye fixative film or layer is formed on the surface of the fabric that inhibits the release of dye from the fabric surface.

The laundry may then be washed according to a wash phase of a selected cycle at 716. The pH of the wash liquid at 716 may be controlled such that the pH remains below the first pH. Above the first pH, the dye fixative molecules become uncharged or neutral, decreasing the strength of the bond between the dye fixative, the fabric surface and the dye, which may increase the amount of dye released from the fabric surface.

Following the laundry wash phase at 716, the laundry may be treated with a rinse liquid having a pH greater or equal to the first pH to again minimize the charge of the dye fixative molecules at 718 to facilitate removal of the dye fixative from the laundry. Neutralizing the dye fixative molecules in this manner may decrease the strength of the interaction between the dye fixative and a charged fabric surface, such as cellulose, making it easier to remove the dye fixative from the surface of the laundry. Treating the laundry at 718 with a liquid at a pH greater than or equal to the first pH may be done multiple times during a rinse phase of a cycle of operation or a single time during a final rinse of the rinse phase. The dye fixative removal phase at 718 may be implemented in the presence of dye absorbers to complex with loose dyes in solution to inhibit dye transfer during removal of the dye fixative.

An optional final rinse at 720 may be implemented to bring the pH down to at or below neutral such that the laundry fabrics are not significantly alkaline at the end of the cycle to improve the feel of the fabric. For example, the final rinse at 720 may include a rinse with fresh water from the water supply.

The pH, ionic strength, temperature and/or pressure to provide a dye fixative with the desired characteristic, such as the desired zeta potential, is based on the dye fixative and characteristics of the treating liquids used during the cycle of operation and may be determined empirically or using one or more formulas. Any combination of environmental characteristics, such as pH, ionic strength, temperature or pressure may be adjusted to provide the desired zeta potential of the dye fixative and thus provide a desired strength of interaction between the dye fixative and the fabric surface. For example, while the method 710 is described in the context of altering the pH, it will be understood that the method 710 may also include adjusting the ionic strength of the liquid at 714 or 718. In addition, while the methods 700 and 710 are discussed in the context of changing the zeta potential of the dye fixative, it will be understood that the zeta potential of the fabric surface may also be changed in order to facilitate distribution or removal of the dye fixative from the laundry. For example, rinsing the laundry with a rinse liquid having a high salinity may provide the fabric surface with salt ions which may provide an electrostatic screen or shield to reduce the attraction between the fabric surface and the dye fixative.

Figure 18:
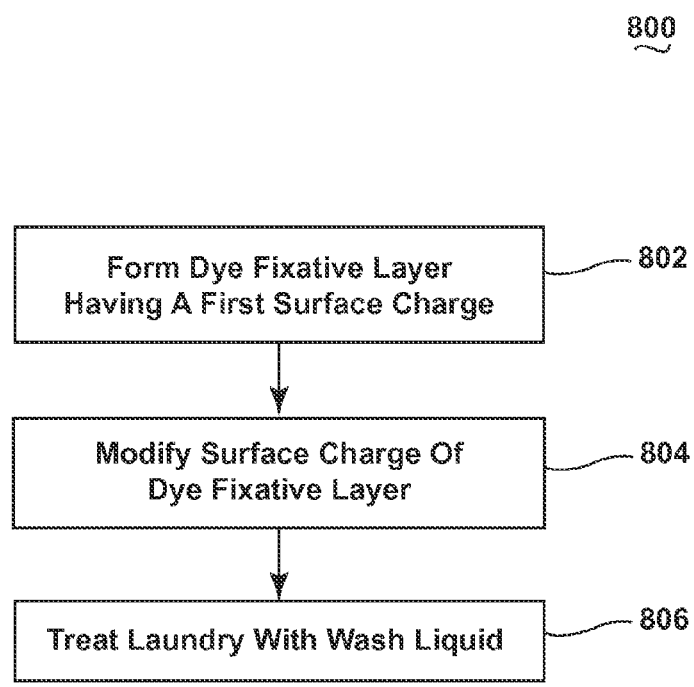
FIG. 18 is a flow chart illustrating a method for supplying a dye fixative to a laundry load according to an embodiment of the invention.

FIG. 18 illustrates a method 800 for treating a laundry load with a dye fixative during a wash cycle. The method 800 may be used with the wash cycle 10 of FIG. 1 or any other suitable wash cycle. In one example, the method 800 may be used during the pre-wash phase 14 of the wash cycle 10.

Many dye fixatives are charged molecules that interact electrostatically with the fabric surface and the dye to fix or retain the dye at the fabric surface. Thus, the presence of dye fixatives on the fabric surface may provide the fabric surface with a charged layer that may undesirably attract other substances to the fabric surface. For example, typical dye fixatives for use with cotton fabric and negatively charged acid or direct dyes are positively charged cationic molecules. When the cationic dye fixatives bond with the fabric surface, the fabric surface may present a more positively charged surface than the untreated fabric surface. This positive charge may attract negatively charged substances in solution to the fabric surface. For example, many soils are negatively charged and thus may be attracted to the positively charged dye fixative layer on the surface of the fabric. This may result in soils that have been lifted from the laundry during washing or soils that the laundry comes into contact with during use, depositing on the fabric to a greater extent than if the charged dye fixative layer was not present.

The method 800 provides a method by which the charge of a dye fixative layer present on the fabric surface may be changed or masked so as to minimize the attraction of undesirable substances, such as soils, to the fabric surface. At 802 a dye fixative layer having a first surface charge may be formed on the fabric surface. Formation of the dye fixative may be implemented by supplying a dye fixative composition to the laundry which is electrostatically attracted to one or more fabric surfaces of the laundry. For example, for cotton fabrics dyed with acid or direct dyes, the dye fixative will likely be a cationic dye fixative. Non-limiting examples of suitable cationic dye fixatives include dye fixatives containing functional groups selected from the group consisting of primary, secondary, and tertiary amines and their salts, and quaternary ammonium and phosphonium salts, such as poly diallyl dimethyl ammonium chloride (DADMAAC) and poly(acrylamide-co-diallyldimethyl ammonium chloride), polyacrylamide, and polyethyleneimine. Non-limiting examples of suitable cationic dye fixatives include those available under the trade name Sandofix SWE or WA, Sandolec CS, CL, WS, or CT, and Cartafix WE (all available from Clariant), a cationic methylene guanidine based dye fixative (commercially available under the trade name Retayne™ from G&K Craft Industries), and those available under the trade name Sera® Fast CT (available from Dystar).

At 804 the surface charge of the fabric dye fixative layer may be modified to neutralize or change the charge of the fabric dye fixative layer. Modifying the fabric dye fixative layer may include supplying a surface charge modifying agent having an electrostatic charge opposite that of the fabric dye fixative layer to the laundry in the treating chamber. The surface charge modifying agent may be attracted to the fabric-dye fixative layer and preferentially distribute to the fabric surface. The surface charge modifying agent may be supplied in an amount sufficient to neutralize the charge of the fabric-dye fixative such that the overall charge of the fabric surface is near neutral. Alternatively, the amount of surface charge modifying agent may be sufficient to provide the surface of the fabric with an overall surface charge that is different than surface charge of the fabric in the absence of the surface charge modifying agent.

In the example in which a cationic dye fixative is applied at 802, the surface charge modifying agent may be an anionic polymer. Non-limiting examples of suitable anionic polymers include polymers containing sulfonic or carboxylic groups having a molecular weight above 200 kDa and a zeta potential between 0 to −20 mV in pure solution, although other polymers having negatively charged functional groups may also be used. Non-limiting examples of commercially available anionic polymers include Syntan, Nylofast® (available from Clariant), and Sera Fast® NHF (available DyStar). The anionic polymers may be supplied such that the surface charge of the fabric is negative rather than positive. A negatively charged surface may be more likely to repel or inhibit the deposition of negatively charged soils compared to a positively charged cationic dye fixative layer. The anionic polymers may also provide the additional feature of acting as a dye fixative on acid nylon fabrics.

Alternatively, the surface charge modifying agent may include small anionic compounds. Non-limiting examples of suitable small anionic compounds include polymers having functional sulfonate, carboxylate and/or acrylic acid functional groups and having a molecular weight between 5-50 kDa. The small anionic compounds may interact with the cationic dye fixative layer on the fabric surface to dissipate the positive charge on the fabric such that the overall surface charge is near neutral. The small and polar nature of the anionic agents may facilitate more uniform distribution of the anionic agents through the treating liquid.

Subsequent treatment of the fabric item, such as drying in a clothes dryer following the end of the wash cycle, may be modified based on the type of surface charge modifying agent applied to the fabric surface. For example, if a sulfonate polymer is used as the surface charge modifying agent, the subsequent drying cycle should be limited to a temperature below 130° F. The recommended drying temperature may be communicated to the user through the user interface or may be automatically communicated by the clothes washer to the dryer, in a manner similar to that described below in method 1500 of FIG. 26.

In yet another example, the surface charge modifying agent may include a saline solution. The saline solution may be supplied to the laundry in the treating chamber to mask the charge of the dye fixative layer and interrupt electrostatic attraction between the charged dye fixative layer on the fabric and charged substances in the treating liquid. In the example of direct dyes, these types of dyes often have low wash fastness, i.e. are prone to bleeding when washed, because they are normally present as anionic molecules with the sodium counter-ion dissociated in an aqueous solution, such as a wash liquid, which increases hydrophilicity of the direct dye, and thus the solubility of the dye in the wash liquid. Adding additional sodium ions into the solution may shift the equilibrium of the system such that less sodium counter-ions dissociate from the dye, making the dye molecules have an overall neutral charge and making the dyes less soluble in the wash liquid. The concentration of sodium may vary depending on the amount of direct dye in the wash liquid. In one example, the sodium ions may be provided by adding sodium chloride and/or sodium sulfate at a sodium concentration of about 50 g/L.

Additional examples of substances suitable for use as the surface charge modifying agent include polyelectrolytes capable of forming layer by layer polymer films, non-limiting examples of which include poly(acrylic acid), poly (methacrylic acid), polyethyleneimine, poly(allylamine hydrochloride), poly(acryl)amide-2-methyl-propane sulfonate), poly(3-sulfopropyl methacrylate), poly(styrene sulfonate), poly(N,N,N-trimethyl-2-methacryloyl ethyl ammonium) bromide, poly(vinyl sulfate), poly (diallyldimethylammonium chloride), and poly(4-vinyl-N-methylpyridinium iodide).

Figure 19:
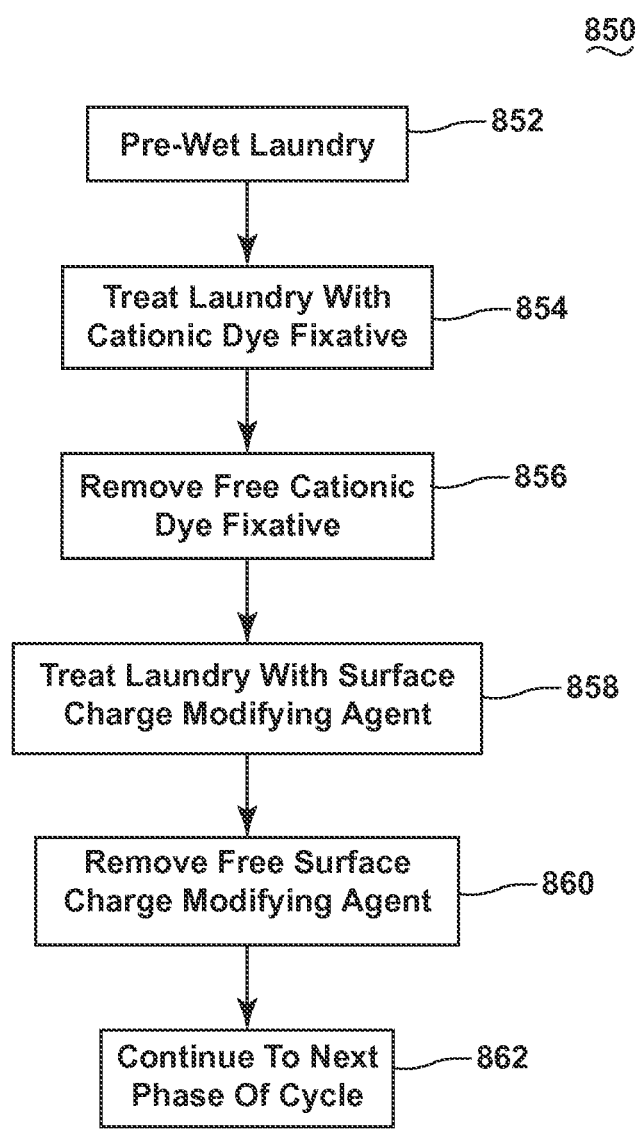
FIG. 19 is a flow chart illustrating a method of treating a surface of a laundry item according to an embodiment of the invention.

FIG. 19 illustrates an exemplary dye fixative treatment method 850 for treating a load of laundry with a cationic dye fixative. The method 850 may be implemented as part of the pre-wash phase 14 of the wash cycle 10, as part of any other suitable cycle of operation, or as a separate cycle. While the method 850 is described in the context of treatment with a cationic dye fixative, it will be understood that the method 850 may be implemented in a similar way for treatment with an anionic dye fixative through the use of an appropriate surface charge modifying agent for anionic dye fixatives.

The method 850 may begin with assuming that the user has loaded a load of laundry into the treating chamber and selected a cycle of operation that includes treatment of the laundry with a dye fixative. At 852 the laundry may be pre-wet with rinse water. The wetting phase at 852 may be the same as the pre-wetting phase 12 of cycle 10 or different. As described above, pre-wetting the laundry with water prior to the application of the dye fixative may facilitate more uniform distribution of the dye fixative on the fabrics by lowering interfacial driving forces and reducing a rate of fabric penetration and/or a rate of attachment of the dye fixative.

At 854 the laundry may be treated with a treating liquid including a cationic dye fixative. The amount of cationic dye fixative may be based on an amount of laundry and/or a type of fabric of the laundry. Any suitable automatic or manual method for determining an amount and/or type of fabric of the laundry known in the art or described herein may be used. Alternatively, the amount of cationic dye fixative may be a default amount based on the selected cycle of operation or the amount of treating chemistry provided by the user. Uniform distribution of the cationic dye fixative through the laundry load may further be facilitated by applying mechanical energy to the laundry, such as by tumbling or agitating the laundry load.

At 856, unbound or free cationic dye fixative, i.e. cationic dye fixative that is not bound to the fabric surface, may be removed. Removing the free cationic dye fixative may include draining cationic dye fixative that has collected in the sump of the clothes washer. The laundry may be optionally spun at 856 to facilitate extraction of dye fixative from the laundry for collection in the sump and subsequent draining. Alternatively, fresh water may be added as a rinse prior to spinning and draining.

At 858, the laundry may be treated with a treating liquid including a surface charge modifying agent which may be followed by a draining phase with optional laundry spin to facilitate extraction of liquid at 860. The amount of surface charge modifying agent to add may be determined in a similar or different manner to the amount of the cationic dye fixative added. In one example, the amount of surface charge modifying agent may be based on the amount of cationic dye fixative supplied to the laundry at 854. Free surface charge modifying agent may be removed at 860 in a manner similar to that described above at 856 for removing the cationic dye fixative. Following removal of free surface charge modifying agent, the cycle of operation may continue to the next phase of the selected cycle at 862. When the method 850 is used with the pre-wash phase 14 of the wash cycle 10, the main wash phase 16 may follow the removal of free surface charge modifying agent at 860.

In addition to providing dye fixatives to the fabric surface to inhibit dye transfer, it may be desirable under certain circumstances to also remove dye fixative from the fabric surface without facilitating dye transfer. For example, dye fixative may build up on the fabric surface over time from multiple treatments with a dye fixative. The dye fixative on the fabric may attract soils which may give the fabric a dirty or dingy appearance.

In one example, the dye fixative may be configured to release from the fabric surface upon exposure to predetermined conditions. Many dye fixatives are surfactants containing a positively charged head group and non-polar tail. A surfactant-based dye fixative may include a fatty acid tail that has a low melting temperature such that when heated in a dryer or treated with hot water, the dye fixative melts out of the fabric surface. Alternatively, the dye fixative may include a pH sensitive head group which changes it charge under certain pH conditions, which may promote partitioning of the dye fixative away from the surface. The pH of the treating liquid may be changed at a predetermined point in the cycle to trigger the pH sensitive head group of the dye fixative to change its charge and release from the fabric surface.

In another example, the dye fixatives may be actively removed from the surface of the fabric, such as by using nanoparticles to shear off or remove at least a portion of the fixative such that the dye fixative releases from the fabric surface. Alternatively, enzymes may be introduced which may alter the fabric surface such that the dye fixative releases from the fabric. In yet another example, the fabric surface may be excessively charged to repel the dye fixative from the fabric surface, such as by adding salts, such as sodium chloride.

The removal of the dye fixative may be performed at the end of a cycle to remove dye fixative applied in the present cycle and additional dye fixative which may have remained on the fabric after preceding cycles. Alternatively, the dye fixative may be removed at the beginning of a cycle, such as during a pre-wash phase, for example, The dye fixative may be removed at the beginning of the cycle to provide a relatively dye fixative-free fabric surface which may be subsequently treated with additional dye fixative. In this manner, the amount of dye fixative on the fabric surface may be controlled and limited, inhibiting the build-up of dye fixative on the fabric surface over time.

Figure 20:
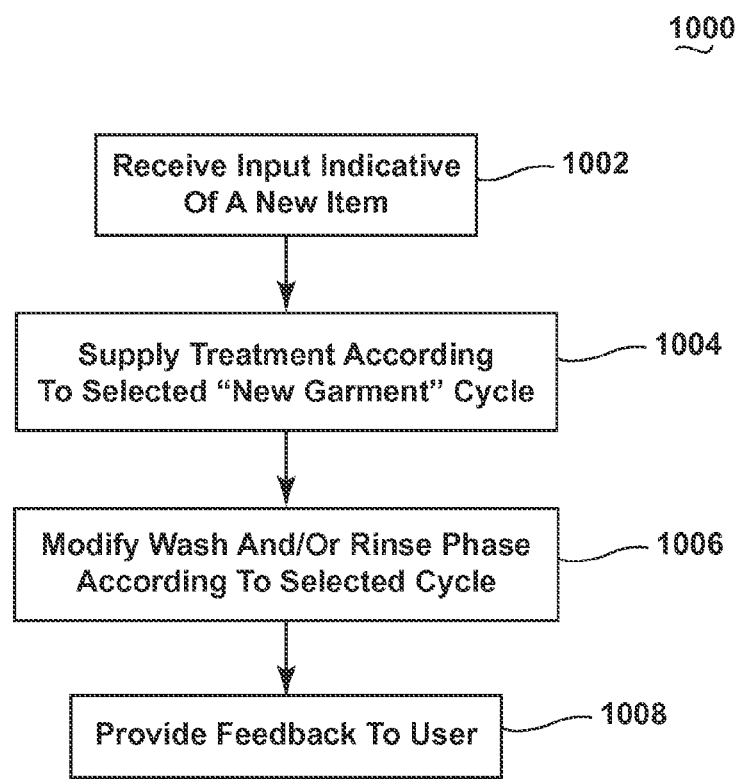
FIG. 20 is a flow chart illustrating a method for treating a new laundry item according to an embodiment of the invention.

FIG. 20 illustrates a method 1000 for treating new laundry items. As used herein a new laundry item refers to a laundry item that is being washed by the user for the first time. The new laundry item may be an unused laundry item or a used laundry item that has not been previously washed by the user. The method 1000 may be used for treating a single laundry item, multiple new laundry items or a combination of new laundry items and previously washed laundry items.

The method 1000 begins at 1002 with receipt by the clothes washer controller of an input indicative of a new laundry item for treatment by the clothes washer. The input may include a user selecting the new laundry item cycle or indicating the load contains a new laundry item through the user interface. Alternatively, the controller may receive the input when a new laundry item is detected by the clothes washer. A new laundry item may be detected optically, through radio frequency, or based on one or more predetermined conditions being met. Optical detection may include optically scanning a label provided on the laundry item, such as a bar code, detecting absorbance and/or transmittance of light emitted from a light source, or taking an image or video of the laundry item. Radio frequency detection may include receipt of information from an RFID tag provided on the laundry item by a suitable RFID reader provided on the clothes washer. Certain conditions, such as selection of a small load cycle or detection of a small load amount may also indicate a new laundry item.

Upon receipt of the input indicative of a new laundry item, the controller may automatically initiate a new laundry item cycle or prompt the user to select a new laundry item cycle. At 1004, the new laundry item cycle may begin and a treatment may be supplied based on the selected new laundry item cycle. At 1006 a wash and/or a rinse phase may be modified. At 1008 the clothes washer may optionally provide feedback to a user regarding an outcome of the "New Garment" cycle or recommendations for further laundry item care.

Figure 21:
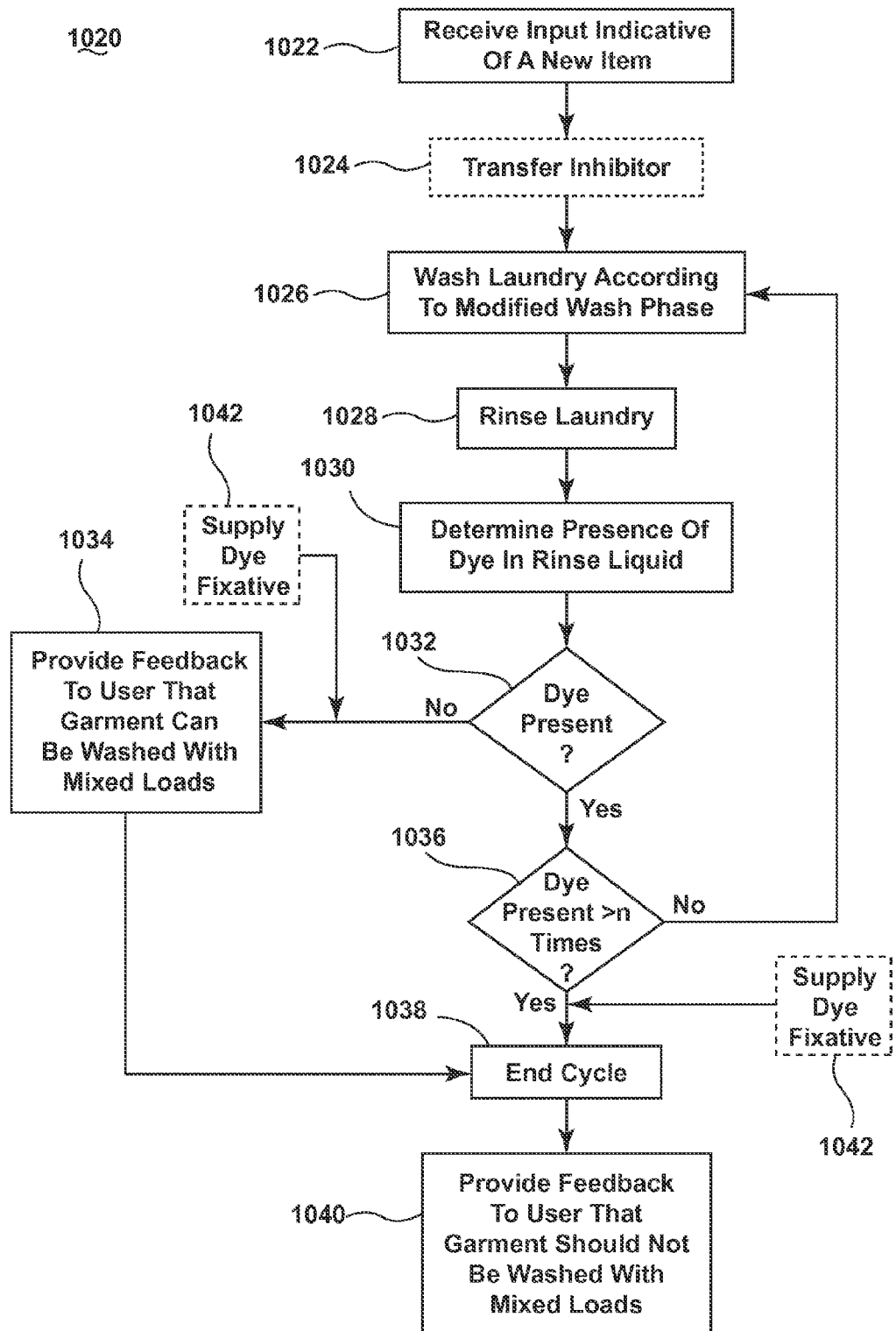
FIG. 21 is a flow chart illustrating a method for treating a new laundry item according to an embodiment of the invention.

FIG. 21 illustrates an exemplary method 1020 for treating new laundry items in a first wash cycle for a dyed laundry item. When a user goes to wash a new laundry item for the first time, there may be concern as to whether the new laundry item will bleed. In some cases a user will opt to wash the laundry item alone the first time as a precaution to avoid potentially ruining other laundry items with dye transferred from the new laundry item. In other cases, a user may inadvertently wash the new laundry item with other laundry items and dye may transfer from the new laundry item to the other laundry items in the load, potentially ruining these other laundry items. Some laundry items are over-dyed and may bleed the first few times they are washed, but after the first few washes, little to no additional bleeding may occur.

The method 1020 may be used to provide a user with information as to whether a new laundry item is suitable for washing with mixed loads or should be washed alone and optionally to provide a treatment to inhibit dye transfer.

The method 1020 may begin at 1022 with receipt by the controller of an input indicative of a new laundry item, as described above at 1002 of the method 1000 of FIG. 17. While the method 1020 is described in the context of a single item, it will be understood that the method 1020 may be used with multiple items. If multiple items are treated at the same time according to the method 1020, the multiple items should be similarly colored, such as multiple jeans, to avoid an undesirable dye transfer event.

At 1024 an optional dye transfer inhibitor may be supplied to the laundry item. The dye transfer inhibitor may be a dye fixative that may be supplied to the laundry item according to any of the methods described herein. Alternatively, the dye fixative may be applied as the temperature of the treating liquid is increased. Increasing the temperature may facilitate distribution of the dye fixative on the fabric surface of the laundry item, increase complexing of the dye fixative and fabric, and also facilitate bleeding of loose dyes which may be subsequently drained away. At the end of the dye fixative supply phase, unabsorbed dye fixative may be removed by draining treating liquid collected in the sump and optionally spinning the laundry items to extract treating liquid.

At 1026, the laundry item may be washed according to a modified wash phase. Because the laundry items are new items, it may be assumed that they are not heavily soiled and thus removing soils is not a primary concern during the wash phase at 1026, and the wash phase 1026 may therefore be quicker than a normal wash phase. The wash phase at 1026 may include supplying a laundry detergent composition and an additive at a predetermined concentration and at a predetermined temperature to facilitate removal of loose dyes from the laundry item. For example, the laundry detergent composition may be supplied to the laundry such that the concentration of surfactants is below the CMC to facilitate removal of loose or excess dye. The additive may be a dye absorber which may further facilitate removal of loose dyes. The laundry item may also be tumbled or agitated to facilitate releasing loose dyes from the surface of the laundry item through mechanical action. Because not all dyes are removed using the same methods, a combination of dye fixative, laundry detergent concentration, temperature, dye absorbers and mechanical action may be used to facilitate removal of loose/excess dye across a broader range of dye and fabric types.

At 1028 the laundry item may be rinsed according to one or more rinse phases. A presence of a dye in the rinse liquid may be determined at 1030 within the treating chamber, which may also include liquid that was previously in the treating chamber. Dye in the rinse liquid may be considered released dye in that the dye is no longer associated with a laundry item, but is present in solution in the rinse liquid. A suitable sensor system may be provided for determining the presence of a dye in the rinse liquid, non-limiting examples of which include optical sensor systems which may be used to perform UV/Vis absorbance/fluorescence spectroscopy or a conductivity sensor. For example, a UV/Vis absorbance/fluorescence system may provide an output representative of a sensed spectral absorbance and/or fluorescence of the treating liquid. It will also be understood that when referring to absorbance herein, transmittance, which is related to absorbance, may be used as an alternative to absorbance or in order to determine the absorbance. The sensor system may output a signal indicative of a presence of dye, including an amount of dye, in the rinse liquid. The sensor system may sense the dye and output the signal continuously or intermittently throughout the rinse phase 1028 or at one or more predetermined stages of the rinse phase 1028, such as the end of the final rinse, for example.

The controller may receive the output signal indicative of the presence of a dye from the sensor system and determine whether the output signal satisfies a predetermined threshold at 1032. This may include comparing the Abs/F characteristic to a predetermined reference value that may be a range of reference values, an upper threshold or a lower threshold. In the embodiment of FIG. 21, the threshold is an upper threshold. If the output signal does not satisfy the threshold, the controller may determine at 1034 that the laundry item is suitable for washing with mixed loads in an un-sorted wash cycle and provide feedback to the user through the user interface that the laundry item may be washed in mixed loads in future wash cycles. In this manner the output signal may indicate a dye inhibited condition.

The cycle may then be completed at 1038. Optionally, at 1042, a dye fixative may be supplied to the laundry item to facilitate inhibiting dye transfer in a future wash cycle and/or during use. The term "satisfies" the threshold is used herein to mean that the variation satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

If the output signal does satisfy the threshold, the controller may determine at 1036 that dye is present in the rinse liquid and that the laundry item is not ready for washing with mixed loads and should be washed in a sorted wash cycle. In this manner the output signal may indicate a non-inhibited condition, which may indicate that the laundry is not dye stable, i.e. dye may transfer from the laundry item to other surfaces during laundering and/or use. The method then returns to 1026 to repeat the modified wash phase 1026, rinse phase 1028 and determining the presence of dye in the wash liquid at 1030. The controller may be programmed to repeat the steps 1026, 1028, 1030 and 1032 a predetermined n number of times. If it is determined that dye has been determined to be present greater than n number of times at 1036, the cycle may end at 1038 and the controller may provide feedback to the user at 1040 that the laundry item should not be washed with mixed loads. For many laundry items, washing a predetermined number of times, usually around 3, is sufficient to remove enough loose dye to decrease the risk of a dye transfer event to an acceptable level. However, if a laundry item continues to bleed dye after multiple washings, the method 1020 may be completed and the user may be provided with feedback as to the dye transfer status of the laundry item. Optionally, at 1044, a dye fixative may be supplied to the laundry item to facilitate inhibiting dye transfer in a future wash cycle and/or during use.

The feedback provided to the user at 1034 and 1040 may be provided through text communicated through a user interface or with one or more illuminated indicators. For example, the user interface may be provided with a ready for mixed loads indicator which is illuminated green when the laundry item is ready for washing with mixed loads and red when the laundry item is not ready for washing with mixed loads. In another example, the user interface may communicate whether the laundry item is ready for washing with mixed loads and other additional care information, such as recommendations for further treatments.

In another example, the method 1020 may be configured for use in treating jeans, which are typically dyed with vat dyes. Rather than adding a dye fixative at 1024, an oxidizing agent may be added during the wash phase 1026 to facilitate oxidation of any unoxidized vat dyes and render them water insoluble, which may increase their wash fastness and decrease dye transfer. The method 1020 for use with jeans may be provided to the user as a cycle option when the user selects a jeans-only cycle.

While the method 1020 is described as including a dye determination process, the method 1020 may be used in a similar manner without determining the presence of dye. For example, the wash and rinse phases 1026 and 1028 may be repeated a predetermined number of times that may be set automatically by the controller or selected by the user.

Figure 22:
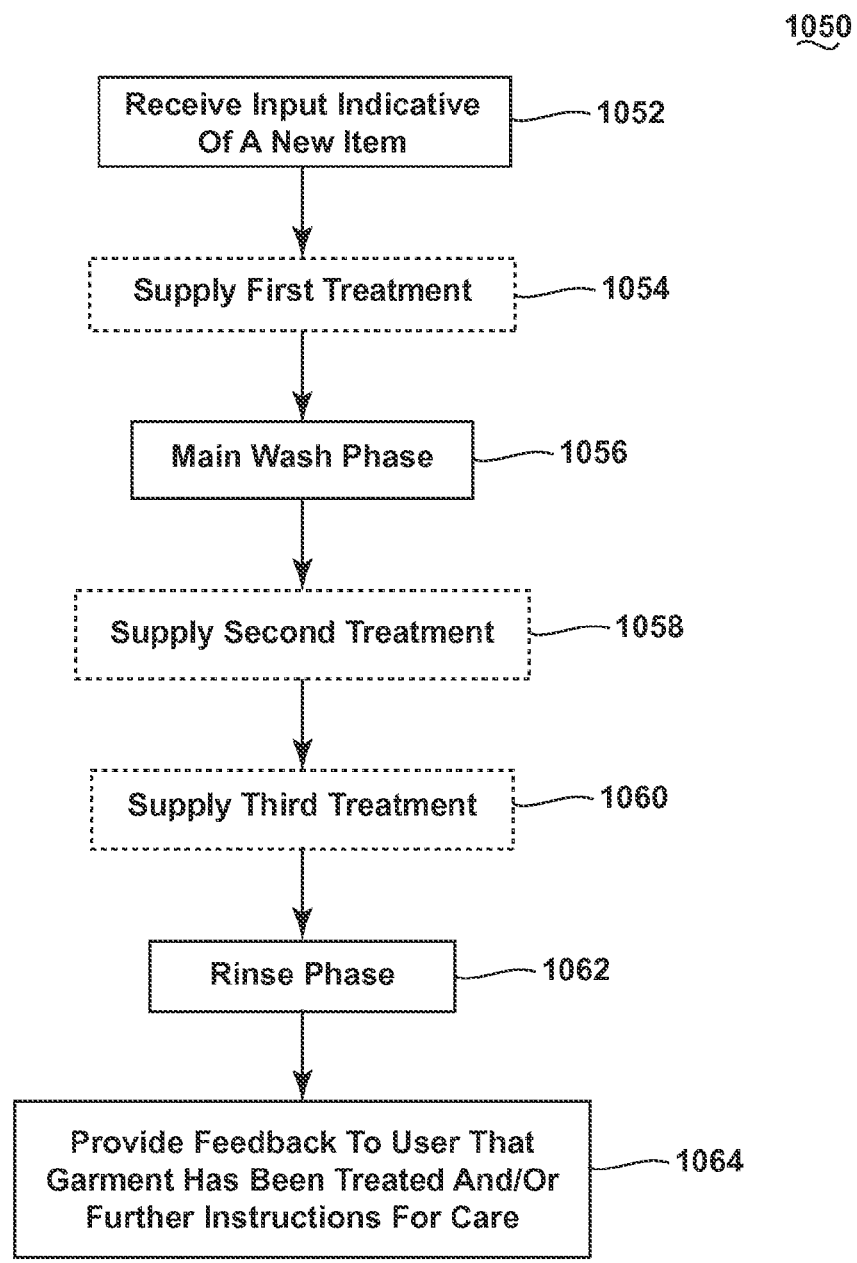
FIG. 22 is a flow chart illustrating a method for treating a new laundry item according to an embodiment of the invention.

FIG. 22 illustrates another exemplary method 1050 for treating new laundry items in a first wash cycle. The method 1050 may be used with new laundry items to remove treatments or finishes from the items or to apply additional treatments or finishes to the items that are more suitable for applying to laundry items that have not been worn or used. For example, the method 1050 may be used to remove a sizing agent from the laundry, if desired by the user, prior to wearing or using the laundry item. In another example, the method 1050 may be used to apply a stain repellant finish to the laundry item. The application of a stain repellant may lock-in stains present on the laundry item and thus it is preferable to apply a stain repellant prior to wearing or using the garment. However, some consumers wear or use the item before washing the item for the first time. Thus, as will be described below, the method 1050 may include a wash phase prior to the application of the stain repellant to remove soils or stains that may have occurred prior to the first wash.

The method 1050 may begin at 1052 with receipt by the controller of an input indicative of a new laundry item as described above at 1002 of the method 1000 of FIG. 20. While the method 1050 is described in the context of a single item, it will be understood that the method 1050 may be used with multiple items.

The method 1050 may include a main wash phase 1056 and a rinse phase comprising one or more rinses at 1062 which may be modified based on a treating agent supplied to the laundry items during one or more of first, second and/or third treatment supply phases 1054, 1058, and 1060. While three treatment supply phases are illustrated, it will be understood that more treatment phases may be used depending on the treatment to be applied.

In one example, the method 1050 may be used to remove a sizing agent from a new laundry item. Some users may deem the presence of a sizing agent on the laundry item as undesirable. For removal of a sizing agent, the main wash phase 1056 may include providing mechanical action, such as tumbling or agitation, and a wash liquid at a predetermined temperature and including a laundry detergent composition at a predetermined concentration to facilitate removal of the sizing agent. The second and optionally third treatment supply phases 1058 and 1060 may include additional mechanical action and application of wash liquid configured to facilitate removal of the sizing agent. For example, the wash liquid may be heated to the highest recommended temperature for that item and/or the concentration of a laundry detergent in the wash liquid may be increased to 1-3 times the recommended dosage. Because the laundry item is new, soil removal is not the primary concern and the wash phase 1056 and treatment phases 1058 and 1060 may be configured to optimize removal of the sizing agent rather than the removal of soil and stains, as in a typical normal wash cycle.

In another example, the method 1050 may be used to provide the new laundry item with a fabric finish. In this example, the main wash 1056 may include providing mechanical action, such as tumbling or agitation, and a wash liquid at a predetermined temperature and including a laundry detergent composition at a predetermined concentration. The main wash phase 1056 may be a quick or light wash phase because the laundry item is new and therefore does not likely have a high degree of soiling or staining. At 1058 one or more fabric finish treating agents may be supplied to the laundry item. The fabric finish agents may be supplied at a predetermined concentration and temperature depending on the agent. The fabric finish agent may be supplied at a high concentration in a low water volume with circulation to facilitate distribution of the fabric finish agent.

In one example, the fabric finish agent supplied in the second supply treatment 1058 may prepare the laundry item for a fabric finish agent supplied in the third supply treatment phase 1060. The second and/or third treatment supply phases 1058 and 1060 may include a temperature ramp profile that may activate or set the fabric finish. Alternatively, or in addition, the user may be provided with feedback at 1064 through a user interface to set/activate the finish in a high heat cycle in a clothes dryer at the end of the wash cycle. In yet another example, the clothes washer may communicate the recommended temperature setting automatically to the dryer.

Non-limiting examples of fabric finish agents that may be supplied during the treatment supply phases 1058, 1060 include stain repellants, UV blockers, soil release agents, insect repellant, flame retardant, water repellant, moisture wicking refresh agents, wrinkle release agents and wrinkle repellants.

In yet another example, the method 1050 may be used to treat a new laundry item that is being wash for the first time by the user, but may have been previously owned/used, such as used clothing purchased from a second-hand or thrift shop or yard sale. At 1056, the laundry items may be washed in the main wash phase to remove soils and stains by applying mechanical action and a wash liquid containing a laundry detergent composition. At 1058 a treatment composition comprising an enzyme, such as cellulase, may be supplied to the laundry. The cellulase may act as a fabric polisher, removing pilling, which may rehabilitate the appearance of the laundry item and make it look "newer".

The feedback provided to the user at 1064 may be provided through text communicated through a user interface or with one or more illuminated indicators. For example, the user interface may be provided with an indicator that changes color depending on the status of the treatment. In another example, the user interface may communicate care information, such as recommendations for further treatments. For example, the user interface may recommend dryer settings or future wash settings for the item.

Figure 23:
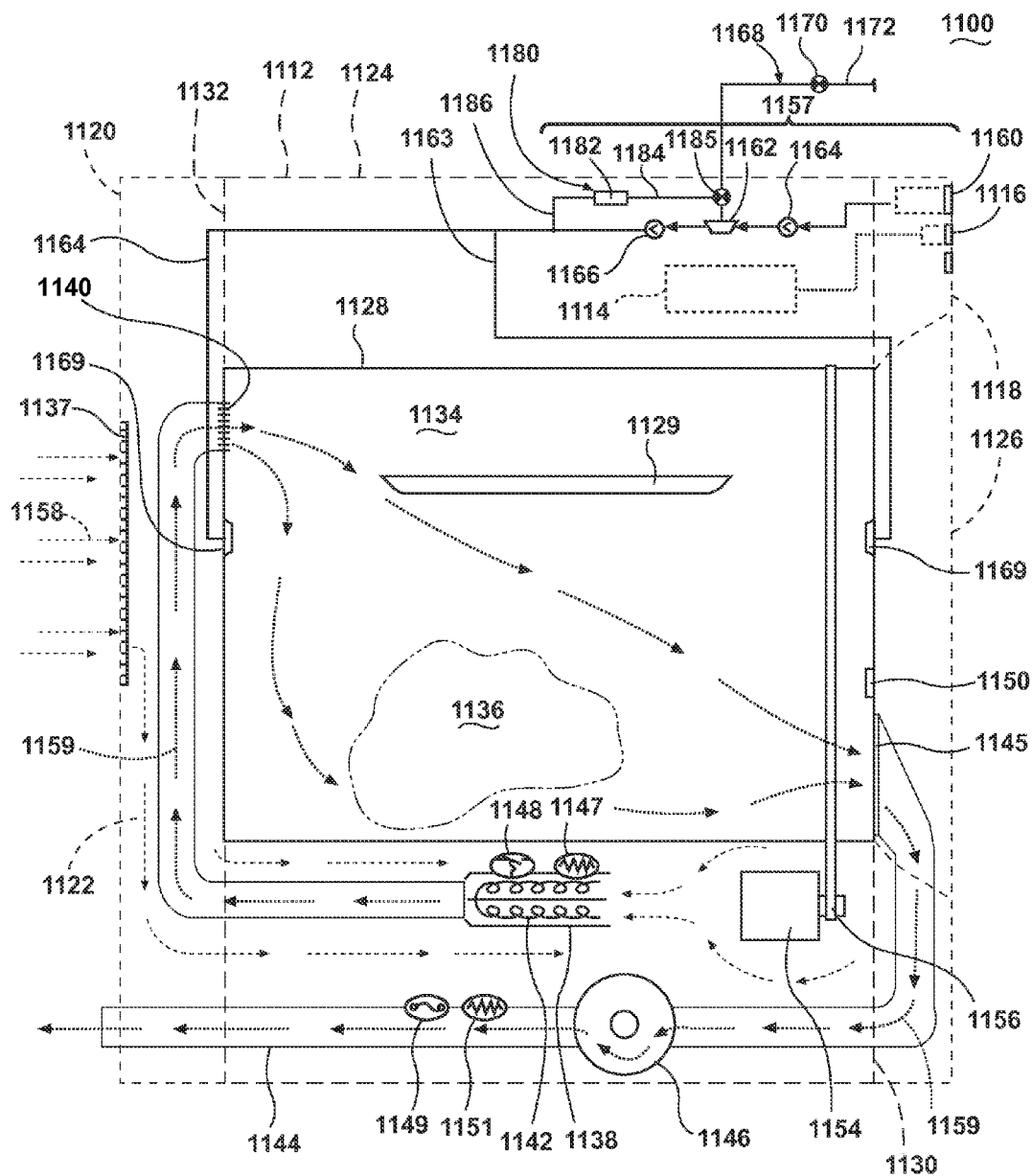
FIG. 23 is a schematic view of a clothes dryer.

Often, after fabric articles are washed, a user then dries the fabric articles. This may be problematic if dye has been transferred during the washing of the fabric articles as the drying may thermoset the transferred dye on the fabric articles, given the drying temperatures of contemporary clothes dryers. FIG. 23 illustrates one example of a clothes dryer 1100, which includes a cabinet 1112 in which may be provided a controller 1114 that may receive input from a user through a user interface 1116 for selecting a cycle of operation and controlling the operation of the clothes dryer 1100 to implement the selected cycle of operation. The user interface 1116 may be operably coupled with the controller 1114 and may provide an input and output function for the controller 1114. The cabinet 1112 may be defined by a front wall 1118, a rear wall 1120, and a pair of side walls 1122 supporting a top wall 1124. A chassis may be provided with the walls being panels mounted to the chassis. A door 1126 may be hingedly mounted to the front wall 1118 and may be selectively movable between opened and closed positions to close an opening in the front wall 1118, which provides access to the interior of the cabinet 1112.

A rotatable drum 1128 may be disposed within the interior of the cabinet 1112 between opposing stationary front and rear bulkheads 1130, 1132, which, along with the door 1126, collectively define a treating chamber 1134 for receiving fabric items for treatment. As illustrated, and as may be the case with most clothes dryers, the treating chamber 1134 may not be fluidly coupled with a drain. Thus, any liquid introduced into the treating chamber 1134 may not be removed merely by draining.

The drum 1128 may include at least one lifter 1129. In most dryers, there may be multiple lifters 1129. The lifters 1129 may be located along an inner surface of the drum 1128 defining an interior circumference of the drum 1128. The lifters may facilitate movement of the laundry 1136 within the drum 1128 as the drum 1128 rotates.

The drum 1128 may be operably coupled with an actuator in the form of a motor 1154 to selectively rotate the drum 1128 during a cycle of operation. The coupling of the motor 1154 to the drum 1128 may be direct or indirect. As illustrated, an indirect coupling may include a belt 1156 coupling an output shaft of the motor 1154 to a wheel/pulley on the drum 1128. A direct coupling may include the output shaft of the motor 1154 coupled with a hub of the drum 1128.

An air flow system may be provided to the clothes dryer 1100. The air flow system supplies air to the treating chamber 1134 and exhausts air from the treating chamber 1134. The supplied air may be heated or not. The air flow system may have an air supply portion that may form, in part, a supply conduit 1138, which has one end open to ambient air via a rear vent 1137 and another end fluidly coupled with an inlet grill 1140, which may be in fluid communication with the treating chamber 1134. A heater 1142 may lie within the supply conduit 1138 and may be operably coupled with and controlled by the controller 1114. If the heater 1142 may be turned on, the supplied air will be heated prior to entering the drum 1128.

The air flow system may further include an air exhaust portion that may be formed in part by an exhaust conduit 1144. A lint trap 1145 may be provided as the inlet from the treating chamber 1134 to the exhaust conduit 1144. An actuator in the form of a blower 1146 may be fluidly coupled with the exhaust conduit 1144. The blower 1146 may be operably coupled with and controlled by the controller 1114. Operation of the blower 1146 draws air into the treating chamber 1134 as well as exhausts air from the treating chamber 1134 through the exhaust conduit 1144. The exhaust conduit 1144 may be fluidly coupled with a household exhaust duct (not shown) for exhausting the air from the treating chamber 1134 to the outside of the clothes dryer 1100.

The air flow system may further include various sensors and other components, such as a thermistor 1147 and a thermostat 1148, which may be coupled with the supply conduit 1138 in which the heater 1142 may be positioned. The thermistor 1147 and the thermostat 1148 may be operably coupled with each other. Alternatively, the thermistor 1147 may be coupled with the supply conduit 1138 at or near to the inlet grill 1140. Regardless of its location, the thermistor 1147 may be used to aid in determining an inlet temperature. A thermistor 1151 and a thermal fuse 1149 may be coupled with the exhaust conduit 1144, with the thermistor 1151 being used to determine an outlet air temperature.

A moisture sensor 1150 may be positioned in the interior of the treating chamber 1134 to monitor the amount of moisture of the laundry in the treating chamber 1134. One example of a moisture sensor 1150 may be a conductivity strip. The moisture sensor 1150 may be operably coupled with the controller 1114 such that the controller 1114 receives output from the moisture sensor 1150. The moisture sensor 1150 may be mounted at any location in the interior of the dryer 1100 such that the moisture sensor 1150 may be able to accurately sense the moisture content of the laundry. For example, the moisture sensor 1150 may be coupled with one of the bulkheads 1130, 1132 of the drying chamber 1134 by any suitable means.

A dispensing system 1157 may be provided to the clothes dryer 1100 to dispense one or more treating chemistries to the treating chamber 1134 according to a cycle of operation. As illustrated, the dispensing system 1157 may be located in the interior of the cabinet 1112 although other locations are also possible. The dispensing system 1157 may be fluidly coupled with a water supply 1168. The dispensing system 1157 may be further coupled with the treating chamber 1134 through one or more nozzles 1169. As illustrated, nozzles 1169 are provided to the front and rear of the treating chamber 1134 to provide the treating chemistry or liquid to the interior of the treating chamber 1134, although other configurations are also possible. The number, type, and placement of the nozzles 1169 are not germane to the invention.

As illustrated, the dispensing system 1157 may include a reservoir 1160, which may be a cartridge, for a treating chemistry that may be releasably coupled with the dispensing system 1157, which dispenses the treating chemistry from the reservoir 1160 to the treating chamber 1134. The reservoir 1160 may include one or more cartridges configured to store one or more treating chemistries in the interior of the cartridges. A mixing chamber 1162 may be provided to couple the reservoir 1160 to the treating chamber 1134 through a supply conduit 1163. Pumps such as a metering pump 1164 and delivery pump 1166 may be provided to the dispensing system 1157 to selectively supply a treating chemistry and/or liquid to the treating chamber 1134 according to a cycle of operation. The water supply 1168 may be fluidly coupled with the mixing chamber 1162 to provide water from the water source to the mixing chamber 1162. The water supply 1168 may include an inlet valve 1170 and a water supply conduit 1172. It may be noted that, instead of water, a different treating chemistry may be provided from the exterior of the clothes dryer 1100 to the mixing chamber 1162.

The treating chemistry may be any type of aid for treating laundry, non-limiting examples of which include, but are not limited to, water, fabric softeners, sanitizing agents, de-wrinkling or anti-wrinkling agents, and chemicals for imparting desired properties to the laundry, including stain resistance, fragrance (e.g., perfumes), insect repellency, and UV protection.

The clothes dryer 1100 may also be provided with a steam generating system 1180, which may be separate from the dispensing system 1157 or integrated with portions of the dispensing system 1157 for dispensing steam and/or liquid to the treating chamber 1134 according to a cycle of operation. The steam generating system 1180 may include a steam generator 1182 fluidly coupled with the water supply 168 through a steam inlet conduit 1184. A fluid control valve 1185 may be used to control the flow of water from the water supply conduit 1172 between the steam generating system 1180 and the dispensing system 1157. The steam generator 1182 may further be fluidly coupled with the one or more supply conduits 1163 through a steam supply conduit 1186 to deliver steam to the treating chamber 1134 through the nozzles 1169. Alternatively, the steam generator 1182 may be coupled with the treating chamber 1134 through one or more conduits and nozzles independently of the dispensing system 1157.

The steam generator 1182 may be any type of device that converts the supplied liquid to steam. For example, the steam generator 1182 may be a tank-type steam generator that stores a volume of liquid and heats the volume of liquid to convert the liquid to steam. Alternatively, the steam generator 1182 may be an in-line steam generator that converts the liquid to steam as the liquid flows through the steam generator 1182.

It will be understood that the details of the dispensing system 1157 and steam generating system 1180 are not germane to the embodiments of the invention and that any suitable dispensing system and/or steam generating system may be used with the clothes dryer 1100. It may also within the scope of an embodiment of the invention for the clothes dryer 1100 to not include a dispensing system or a steam generating system.

Figure 24:
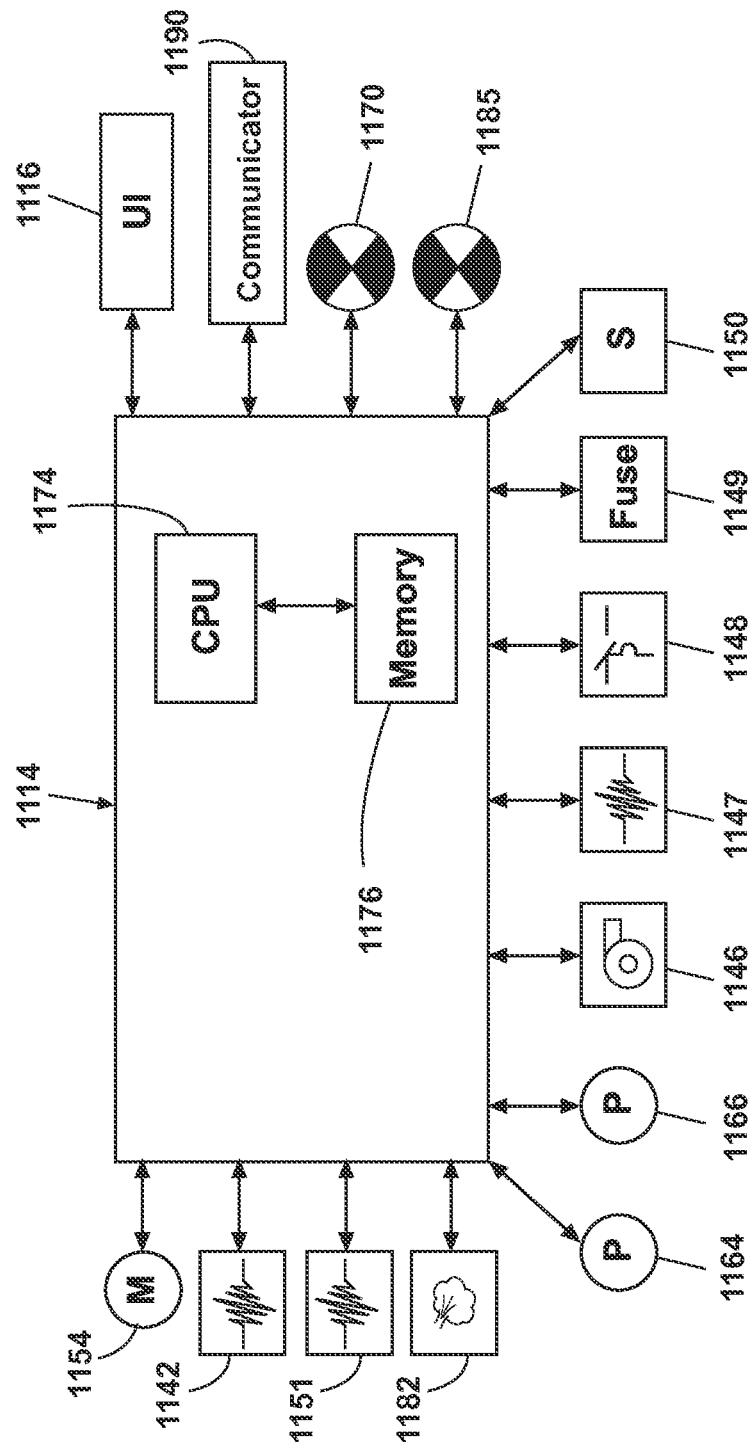
FIG. 24 is a schematic view of a controller of the clothes dryer of FIG. 23.

FIG. 24 is a schematic view of the controller 1114 coupled with the various components of the clothes dryer 1100. The controller 1114 may be communicably coupled with components of the clothes dryer 1100 such as the heater 1142, blower 1146, thermistor 1147, thermostat 1148, thermal fuse 1149, thermistor 1151, moisture sensor 1150, motor 1154, inlet valve 1710, pumps 1164, 1166, steam generator 1182 and fluid control valve 1185 to either control these components and/or receive their input for use in controlling the components. The controller 1114 may also be operably coupled with the user interface 1116 to receive input from the user through the user interface 1116 for the implementation of the drying cycle and provide the user with information regarding the drying cycle. For example, the user interface 1116 may receive information from a user that a dye transfer event has occurred and may provide an indication of a dye transfer event to the controller 1114. The user interface 1116 may be provided having operational controls such as dials, lights, knobs, levers, buttons, switches, and displays enabling the user to input commands to a controller 1114 and receive information about a treatment cycle from components in the clothes dryer 1100 or via input by the user through the user interface 1116. The user may enter many different types of information, including, without limitation, cycle selection and cycle parameters, such as cycle options as well as information regarding the load to be dried including the type of laundry and the type of dye transferred. Any suitable cycle may be used. Non-limiting examples include, Casual, Delicate, Super Delicate, Heavy Duty, Normal Dry, Damp Dry, Sanitize, Quick Dry, Timed Dry, and Jeans.

The controller 1114 may also be communicably coupled with a data communicator 1190 for receiving information from a washing machine and outputting information to the controller 1114. For example, the data communicator 1190 may provide an indication of a dye transfer event to the controller 1114. The data communicator 1190 may wirelessly communicate with the washing machine and/or may be hard-wired to communicate with the washing machine. The wireless communication may be any variety of communication mechanism capable of wirelessly linking with other systems and devices and may include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication is not critical to this invention, and later-developed wireless networks are certainly contemplated as within the scope of embodiments of this invention. Alternatively, the data communicator 1190 may be incorporated into the controller 1114 such that the washing machine may be communicably coupled with the controller 1114.

The controller 1114 may implement a treatment cycle of operation selected by the user according to any options selected by the user and provide related information to the user. The controller 1114 may also include a central processing unit (CPU) 1174 and an associated memory 1176 where a set of executable instructions comprising at least one user-selectable cycle of operation may be stored. One or more software applications, such as an arrangement of executable commands/instructions may be stored in the memory and executed by the CPU 1174 to implement the one or more treatment cycles of operation.

In general, the controller 1114 will effect a cycle of operation to effect a treating of the laundry in the treating chamber 1134, which may or may not include drying. The controller 1114 may actuate the blower 1146 to draw an inlet air flow 1158 into the supply conduit 1138 through the rear vent 1137 when air flow may be needed for a selected treating cycle. The controller 1114 may activate the heater 1142 to heat the inlet air flow 1158 as it passes over the heater 1142, with the heated air 1159 being supplied to the treating chamber 1134. The heated air 1159 may be in contact with a laundry load 1136 as it passes through the treating chamber 1134 on its way to the exhaust conduit 1144 to effect a moisture removal of the laundry. The heated air 1159 may exit the treating chamber 1134, and flow through the blower 1146 and the exhaust conduit 1144 to the outside of the clothes dryer 1100. The controller 1114 continues the cycle of operation until completed. If the cycle of operation includes drying, the controller 1114 determines when the laundry may be dry. The determination of a "dry" load may be made in different ways, but may be often based on the moisture content of the laundry, which may be typically set by the user based on the selected cycle, an option to the selected cycle, or a user-defined preference.

Further, the controller 1114 may receive an indication of a dye transfer event for the laundry to be dried from the user interface 1116 or the data communicator 1190. Based on such a determination, the controller 1114 may control operation of one or more specific drying actions or cycles based on the determined dye transfer event to limit any damage to the fabric items that the transferred dye may cause. For example, the controller 1114 may control operation of the blower 1146, the heater 1142, and the operation of the rotatable drum 1128 based on the determined dye transfer event. The controller 1114 may also be configured to provide an indication on the user interface 1116 of the determined dye transfer event.

Figure 25:
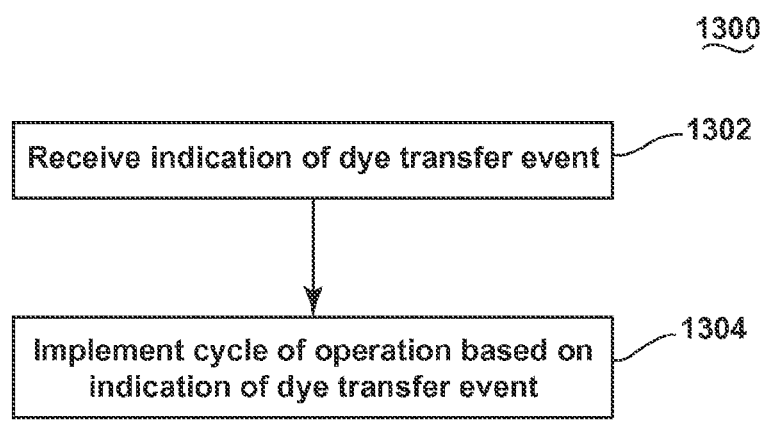
FIG. 25 is a flow chart illustrating a method for communicating dye transfer information between a clothes washer and a clothes dryer according to an embodiment of the invention.

FIG. 25 illustrates a method 1300 for determining a dye transfer event and controlling operation of the clothes dryer based thereon. More specifically, the method begins at 1302 by the controller 1114 receiving as an input an indication of a dye transfer event for the laundry to be dried. For example, the controller 1114 may receive an indication from the user interface 1116 when a user inputs that the dye transfer event has occurred. A washing machine used to wash the laundry may alert the user to the dye transfer or the user may notice that dye has transferred. The washing machine may also indicate to the user to select a specific dryer cycle, including for example a delicate cycle or dye transfer cycle, or may indicate to the user to select a specific temperature or dryness level. Alternatively, the controller 1114 may receive a communication from a washing machine that the dye transfer event has occurred. For example, clothes washer 50, 450 and 2050 may all be configured to communicate that a dye transfer event has occurred. Such a communication is described in more detail below with respect to method 1500. It will be understood that such an indication of a dye transfer event may be received via the data communicator 1190 from the washing machine and that the data communicator 1190 may provide an indication of the dye transfer event to the controller 1114. Alternatively, the controller 1114 may be configured to receive the indication directly from the washing machine. Regardless of whether the data communicator 1190 or the controller is communicably coupled with the washing machine, it will be understood that the communication with the washing machine may be a wireless communication and/or a hard-wired communication.

After a dye transfer event has been indicated at 1302, the controller 1114 may control the implementation of the automatic cycle of operation of the clothes dryer based on the indication of the dye transfer event. This may include the controller 1114 implementing one or more specific drying actions or cycles, which may include, among other things, selecting a specific cycle of operation, setting one or more parameters of the cycle of operation, including keeping the drying temperature below the dye set or thermoset temperature, skipping or adding a phase to the cycle of operation, terminating the cycle of operation, and adding a treating chemistry to prevent the dye from setting. For example, a specific dye transfer cycle may be utilized to limit the drying of the fabric items so that the transferred dye does not thermoset. The implementation of the one or more specific drying actions or cycles may occur regardless of what cycle of operation is selected by a user on the user interface 1116. For example, a user may select a gentle dry cycle and the controller 1114 will instead operate the clothes dryer 1100 under the dye transfer cycle. Alternatively, the controller 1114 may limit the user from selecting any alternative cycles or drying actions such the one or more specific drying actions or cycles may be the only options allowed for the user to select.

By way of non-limiting example, controlling the implementation of the automatic cycle of operation of the clothes dryer 1100 including specific drying actions or cycles may include limiting temperatures during the cycle of operation. This may include limiting the drying temperature within the treating chamber 1134 to below 140° F. For example, the cycle of operation may be executed such that temperatures within the rotatable drum 1128 do not exceed 135° F. By way of further example, this may include utilizing drying temperatures between 115° F. and 125° F. for a first half of the cycle of operation or until the residual moisture content (RMC) of the fabric items is determined to be about 30% and then utilizing drying temperatures between 95° F. and 105° F. from that point until the end of the cycle. Further, controlling operation of the clothes dryer 1100 may include limiting dryness achieved during the cycle of operation. Typical cycles end when the RMC reaches between two and four percent. Limiting the dryness during the implemented cycle where a dye transfer has been indicated may include ending the cycle of operation when the RMC reaches between 10% and 18%. Further still, controlling operation of the clothes dryer 1100 may include adjusting a rotation profile of a drum of the clothes dryer. This may include lowering the revolutions per minute of the rotatable drum 1128, limiting the time spent tumbling, not tumbling, etc. Any of the above or any combination of the above may avoid hot spots within the load and over drying, either of which may thermoset transferred dye.

It will be understood that the method may be flexible and that the method 1300 illustrated is merely for illustrative purposes. For example, the method may include indicating, on a user interface of the clothes dryer, information related to the dye where the information includes at least one of: at least one action taken by the clothes dryer in response to the determined dye transfer event, at least one consequence of the at least one action taken by the clothes dryer, or indicating on the user interface that the dye transfer event has been determined. It is also contemplated that the input received by the controller 1114 may include information related to a type of dye transferred and/or a type of laundry to be dried. Based on such additional information the controller 1114 may be configured to control a drying temperature of the clothes dryer to be below a thermoset temperature and such a thermoset temperature may be determined based on the type of dye transferred and/or the type of laundry.

Figure 26:
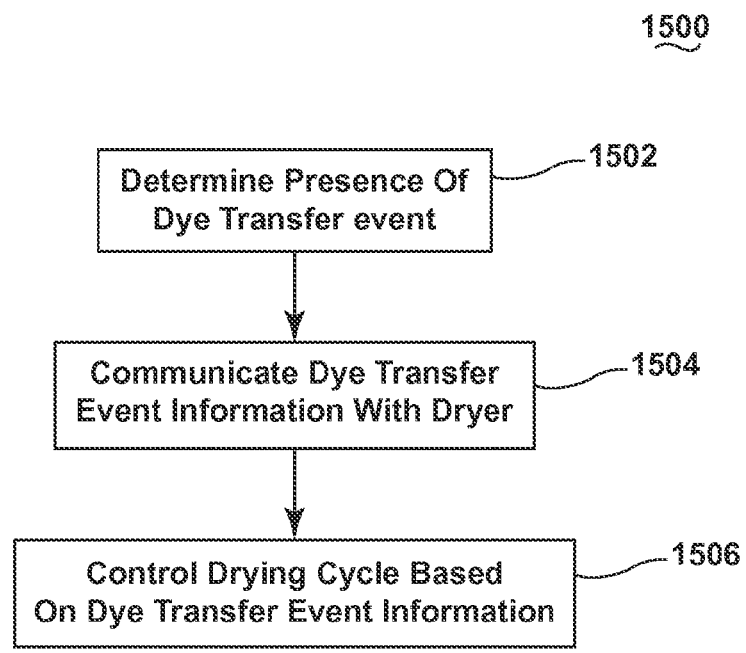
FIG. 26 is a flow chart illustrating a method for communicating dye transfer information between a clothes washer and a clothes dryer according to an embodiment of the invention.

As briefly described above, the method may include communicating with a clothes washer to determine if a dye transfer event has occurred. FIG. 26 illustrates a method 1500 for communicating dye transfer information between a clothes washer and clothes dryer and controlling operation of the clothes dryer based on the communicated dye transfer information. The operation of the clothes dryer may then be controlled to minimize further dye transfer or thermosetting of any transferred dye.

The method 1500 may begin with assuming that laundry has been loaded into the clothes washer and is being treated according to a selected cycle of operation. At 1502 the presence of a dye transfer event may be determined. A dye transfer event may be determined automatically by the clothes washer or the clothes washer may determine a dye transfer event manually based on user input. For example, the user may provide information to the clothes washer through the user interface that identifies an item of the load as known for dye bleeding and/or identifies an item of the load as new and/or brightly or deeply colored, which may be suspected of bleeding. Alternatively, the user may identify an item of the load as being new and/or of unknown dye bleeding status that the user would like the clothes washer and/or dryer to treat as if a dye transfer event occurred as a precaution.

Alternatively, a dye transfer event may be determined automatically one or more times at predetermined points in the cycle of operation. The determination may be done continuously or intermittently through the entire cycle of operation or during one or more phases of the cycle of operation. In one example, the color of the wash liquid at different stages of the wash phase of a cycle or at the end of the wash phase may be determined using a suitable sensor system, such as a UV/Vis absorbance system, for example, to determine whether the color of the wash liquid or a change in color of the wash liquid indicates that a dye transfer event has occurred. In another example, the use of dye fixatives and/or absorbers in the cycle, either automatically or based on manual input by a user, may be used to determine that a dye transfer event has occurred.

In yet another example, the fabric item may include a label that communicates dye-related information with the clothes washer. The fabric item may include an RFID tag or a barcode that is readable by a suitable reader provided on the clothes washer. The label may communicate information such as the type of dye(s) present in the fabric item and the clothes washer controller may be programmed to determine whether the dye(s) are likely to result in a dye transfer event.

The dye transfer event information may be communicated with the dryer at 1504 through an appropriate connection between the clothes washer and the dryer or wirelessly, such as through Bluetooth, for example, as described above with respect to FIG. 24. In this manner the washing machine may provide an indication to the dryer that a dye transfer event has occurred and the dryer may control or modify a subsequent drying cycle based on the indicated dye transfer event information at 1506.

Similarly to the method 1300 described above, controlling the drying cycle may include controller the implementation of the cycle of operation based on the indication of the dye transfer event including modifying the drying cycle such that the temperature remains at the lowest setting for that drying cycle, modifying the dryness end point for the selected drying cycle to minimize heating of the fabrics at the end of the cycle, and/or modifying the drum rotation profile for the selected drying cycle to provide minimal agitation so as to not facilitate further dye transfer. Heating the fabrics at too high of a temperature and/or for too long during a drying cycle may thermoset dye that has transferred during the preceding wash cycle, which may prevent removal of the transferred dye in a subsequent wash cycle. In one example, receipt of a dye transfer event by the dryer may cause the dryer to prompt the user to select a predetermined dye transfer cycle which includes one or more of these cycle modifications.

Figure 27:
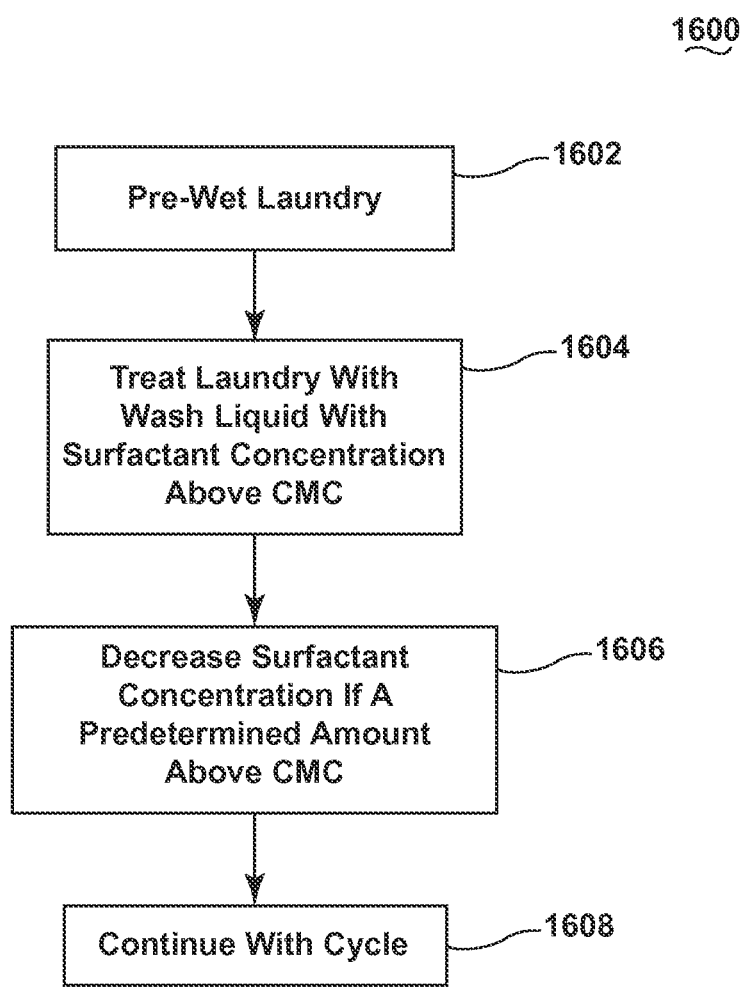
FIG. 27 is a flow chart illustrating a method for inhibiting dye transfer in a wash cycle according to an embodiment of the invention.

FIG. 27 illustrates a method 1600 for inhibiting dye transfer in a wash cycle without the use of dye fixatives or dye absorbers by controlling surface tension gradients on the fabric surface of the laundry.

The method 1600 may begin by assuming that a user has loaded laundry into the treating chamber and selected a cycle of operation. At 1602, the laundry may be pre-wet with water only. In one example, the pre-wet phase may be implemented as described above for the pre-wetting phase 12 of the cycle 10. Pre-wetting the fabrics may reduce the interfacial tension between a wash liquid and the fabric surface when a wash liquid is supplied to the laundry. Reducing the interfacial tension may reduce surfactant penetration onto the laundry and thus reduce dye bleeding from the fabric. In a laundry detergent composition, surfactants may penetrate the fabric and lift dyes from the fabric surface. Anionic surfactants have been found to lift direct and acid dyes and nonionic surfactants have been found to lift disperse dyes. Reducing the driving force of surfactants to the fabric surface by pre-wetting the fabric may reduce this surfactant-induced dye bleeding.

Following pre-wetting of the laundry at 1602, the laundry may be treated with a laundry detergent composition at a concentration such that the surfactants are present at concentrations slightly above their CMC. Surfactants at concentrations above the CMC may provide surfactant micelles capable of absorbing dye released from the fabric surface to inhibit dye transfer. The concentration of the surfactant may be controlled and/or monitored in a manner similar to that described above with respect to method 600 of FIG. 15. In one example, the concentration of the laundry detergent may be controlled by controlling the dosage of the detergent and/or controlling an amount of water supplied to the treating chamber with the detergent. If the surfactant concentration is too high above the CMC, at 1606 additional water may be added to dilute the surfactant concentration and the cycle may continue at 1608. The pre-wetting at 1602 and treating with laundry detergent at 1604 may be implemented at cold water temperatures and with minimal mechanical action to further inhibit dye transfer.

Figure 28:
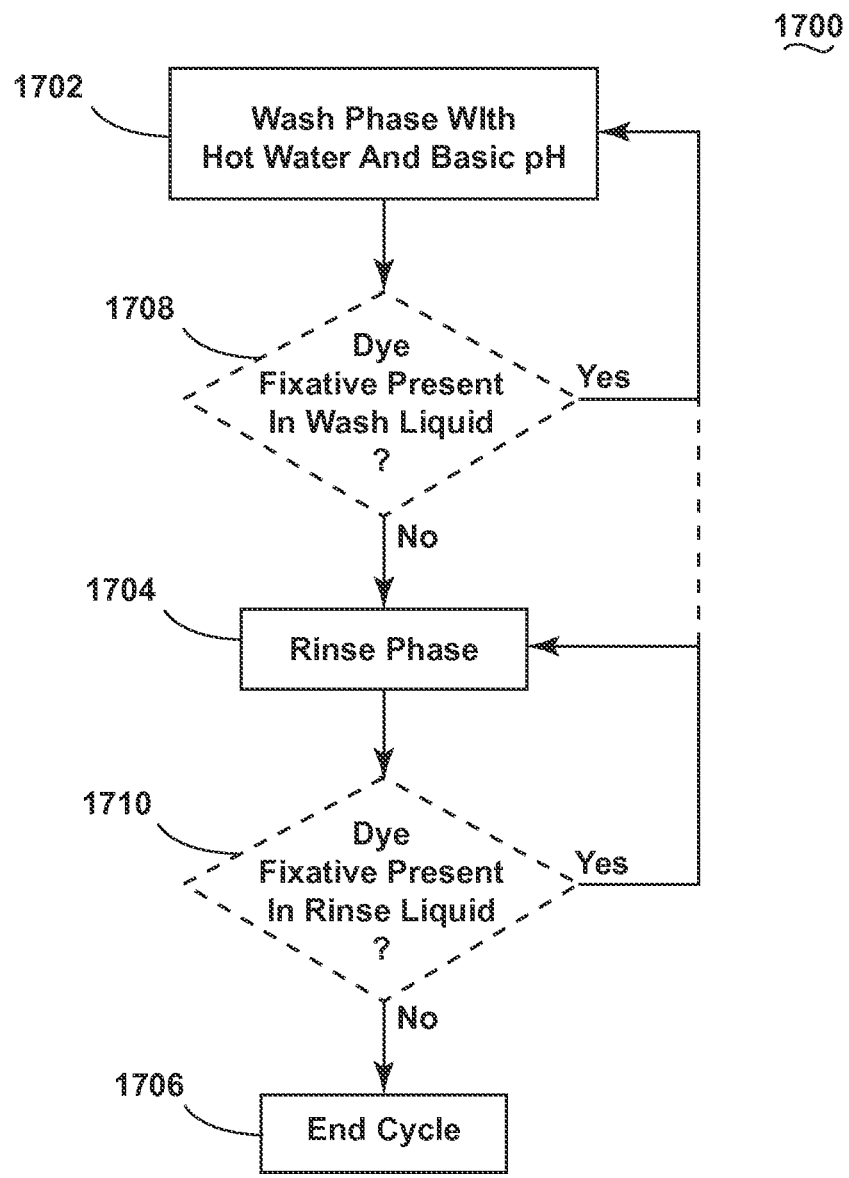
FIG. 28 is a flow chart illustrating a method for removing dye fixative from a laundry item according to an embodiment of the invention.

FIG. 28 illustrates a method 1700 for removing dye fixative from laundry items. Dye fixatives, in particular cationic dye fixatives, on laundry may attract soils, which are often negatively charged, in the wash liquor during a wash cycle and during use of the laundry item after laundering. The electrostatic attraction between the cationic dye fixative and negatively charged soil may make the soil difficult to remove, even during a wash cycle. This soil may also give the laundry a dingy or dulled appearance, especially on white and light colored fabrics, which may increase over time as dye fixative is applied multiple times to the laundry in subsequent wash cycles.

The method 1700 may be implemented as a wash cycle to remove absorbed dye fixative and soil to whiten or brighten laundry items. The method 1700 may be implemented automatically as part of a whitening or a brightening phase of a wash cycle or a whites only wash cycle, for example. In another example, the method 1700 may be implemented based on user selection of a cycle modifier option to selectively implement the method 1700 as part of a wash cycle. The method 1700 may begin with a wash phase 1702 which includes supplying a hot wash liquid to the laundry items that includes a laundry detergent and a basic agent to increase the pH of the wash liquid to a basic pH, preferably pH>9. The temperature of the treating liquid is preferably at least 110° F. or greater, but lower temperatures may also be used. Non-limiting examples of basic agents include powdered alkaline build detergents, alkaline ingredients such as sodium or ammonium hydroxide, and other buffer components, such as a buffer system formed by sodium bicarbonate and sodium hydroxide, for example. Alternatively, the pH of the wash liquid may be adjusted through electrolysis.

The alkaline wash liquid may be configured to provide an environment with a pH above the pKa of the cationic dye fixative, which may decrease the adhesion force between the dye fixative and the fabric, resulting in the release of the dye fixative from the fabric. For example, a basic pH may facilitate removal of polyamine cationic dye fixatives from the fabric, as described above at 708 of the method 700 of FIG. 17, the embodiments of which may be used with the method 1700.

In one example, the supplying of heated, alkaline liquid and a detergent to the laundry in the treating chamber may overlap as part of the wash phase 1702. Alternatively, the wash phase 1702 may be divided into a dye fixative removal stage in which heated, alkaline liquid is supplied to the laundry first followed by the addition of detergent to the alkaline liquid to form a wash liquid as part of a wash stage. In this manner the dye fixative removal stage may be implemented as a separate stage prior to any wash stage in a selected cycle of operation.

The heating of the liquid, adjusting of the pH and addition of detergent may be done in any order and may occur simultaneously or sequentially. In one example, the water, basic agent, and detergent may be supplied to a tub of the clothes washer for heating and mixing, such as in a sump area of the tub, prior to being sprayed onto the laundry in the treating chamber by a recirculation system. Alternatively, any part of the heating, adjusting the pH or mixing with a detergent may occur prior to entry into the tub or treating chamber. For example, the water may be supplied from a hot water supply or flowed through an in-line heater prior to being supplied to the tub or sprayed directly onto the laundry in the treating chamber. In another example, the basic agent may be mixed with the heated water as it is being supplied to the laundry in the treating chamber, such as by adding the basic agent to the flow of heated water or flowing the heated water through a mixing chamber where the heated water can be mixed with the basic agent prior to being sprayed into the treating chamber.

The wash phase 1702 may include treating the laundry items with additional laundry adjuncts, such as dye absorbers, oxidizing agents and/or optical brighteners. In one example, the wash phase 1702 may be implemented with dye absorbers in a manner similar to that described above for cycle 10 of FIG. 1. The dye absorbers may be a mixture of cationic and nonionic dye absorbers, such as those described above. The dye absorbers may facilitate preferential distribution of the soil away from the cationic fixative and fabric surface and into solution with the dye absorbers where they may subsequently be removed. The oxidizing agents, such as hydrogen peroxide or a source of hydrogen peroxide, for example, may be provided to decolorize soil on the laundry items and may also oxidize the cationic dye fixative, which may facilitate solubilization of the cationic dye fixative for subsequent removal.

During the wash phase 1702, the alkaline liquid and/or the wash liquid may be recirculated through the treating chamber to move the liquid through the laundry to facilitate removal of dye fixative from the laundry and cleaning of the laundry. Mechanical energy may also be supplied to further facilitate removal of the dye fixative and cleaning of the laundry, such as by rotating a drum defining the treating chamber and/or moving a clothes mover within the treating chamber.

At 1704 a rinse phase may be implemented. The rinse phase may include one or more rinses which may optionally include supplying dye absorbers during at least one of the rinses. The rinse phase 1704 may be implemented in a manner similar to that described above for cycle 10 of FIG. 1 or the method 300 of FIG. 6, which include the use of dye absorbers.

Either or both of the wash and rinse phases 1702 and 1704 may be repeated one or more times before ending the cycle at 1706. In one example, the number of times the wash phase 1702 and/or rinse phase 1704 is repeated may be a predetermined number of times programmed into control software associated with the controller. Alternatively, the number of times the wash and/or rinse phases 1702/1704 are repeated may be set by the user. Each of the wash and rinse phases 1702 and 1704 may include one or more drain phases in which liquid is drained from the tub. The drain phases may optionally include rotating the laundry at high speeds to facilitate extraction of liquid from the laundry, followed by draining the extracted liquid from the tub.

In another example, the decision to repeat a wash and/or rinse phase 1702, 1704 may be determined based on sensor output indicative of a presence of a dye fixative in the wash and/or rinse liquid. The clothes washer may be provided with a suitable sensor system to determine the presence of a dye fixative in the treating liquid. The sensor system may be an optical-based sensor system such as a UV/Vis absorbance/reflectance system, or a conductivity sensor system, for example. The sensor system may provide an output to the controller indicative of a presence of a dye fixative in the wash and/or rinse liquid. The controller may decide whether to repeat the wash and/or rinse phase 1702, 1704 based on the output from the sensor system. The sensor system may take sensor readings continuously or intermittently throughout the wash/rinse phases 1702, 1704 or at predetermined stages of the wash/rinse phases 1702, 1704.

Referring again to FIG. 28, at 1708 a presence of a dye fixative in the wash liquid may optionally be determined by the controller based on output received from the sensor system during or at the end of the wash phase 1702. The controller may determine that dye fixative is present if the output satisfies a predetermined threshold and repeat the wash phase 1702. The wash phase 1702 may be repeated based on the determine presence of a dye fixative a predetermined number of times or until the output does not satisfy the threshold. If the output does not satisfy the predetermined threshold, then the cycle may proceed to the next phase.

Optionally, the determination of the presence of a dye fixative may be used to modify the wash phase 1702 each time the wash phase 1702 is repeated. For example, the controller may use the output to determine an amount of dye fixative present in the wash liquid and modify cycle parameters such as temperature of the wash liquid, pH of the wash liquid, and/or an amount of a treating agent to add. In one example an amount of laundry detergent and/or dye absorbers to supply during the wash phase 1702 may be determined based on the amount of dye fixative detected in the wash liquid.

The method 1700 may be implemented automatically based on sensor output or based on information received from the user. For example, the method 1700 may be implemented automatically during a cycle of operation based on a determined presence of a dye fixative. The determination of the presence of a dye fixative may include determining the presence of a dye fixative in the wash or rinse liquid, in a manner similar to that described above at 1708 and 1710 of FIG. 28, or on the laundry items. Alternatively, the presence of a dye fixative may be determined based on sensing the presence of dye fixative in the dispenser. In one example, the presence of a dye fixative in the dispenser may be determined using a suitable sensor configured to determine the presence of a dye fixative in the treating liquid provided in the dispenser. Non-limiting examples of a sensor include an optical or electrical sensor. In another example, the dye fixative may be stored in a container which carries information regarding the presence of a dye fixative that may be communicated with the controller of the appliance. In an exemplary embodiment, the dye fixative may be provided in a dispenser cartridge which carries information, such as a bar code, that can be read by a suitable sensor provided in the appliance. In another example, the method 1700 may be implemented based on cycle selections or cycle modifier selections made by the user through the user interface of the clothes washer.

In an exemplary embodiment, the clothes washer may include a dye fixative removal option that a user can select through the user interface to implement the dye fixative removal cycle of method 1700 as part of a selected cycle of operation or as an independent cycle. Additionally, or alternatively, the method 1700 may be implemented automatically based on the selected cycle, such as a whites only cycle, or based on the phases of the selected cycle, such as a wash cycle with a whitening phase, as described above. In yet another example, the user may be prompted by the clothes washer to provide information relating to the laundry item(s) dye fixative treatment status (e.g. the item was previously treated in a dye fixative treatment cycle) and the clothes washer may use this information to automatically implement the method 1700 as part of a selected cycle of operation or as an independent cycle.

Alternatively, or additionally, a determination of a presence of a dye fixative may optionally be determined following the rinse phase 1704 at 1710. The determination at 1710 may be performed in a manner similar to that described above at 1708. If dye fixative is determined to be present, either the wash phase 1702 or the rinse phase 1704 may be repeated a predetermined number of times or until the output satisfies a threshold value.

Figure 29:
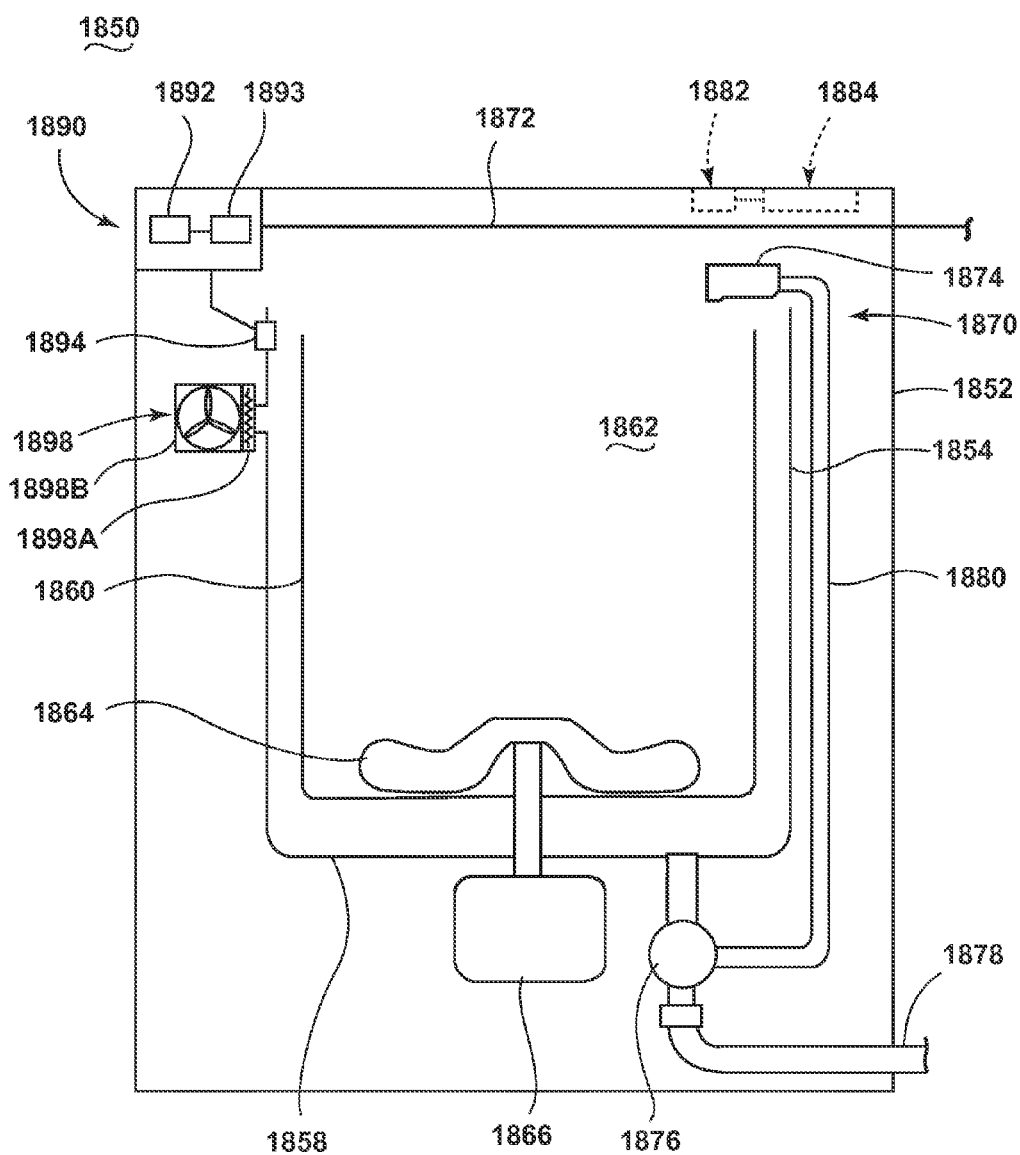
FIG. 29 is a cross-section, schematic side view of a vertical axis clothes washer according to an embodiment of the invention.

FIG. 29 illustrates a schematic of a vertical axis clothes washer, also sometimes referred to as a top loader, 1850 that is similar to the clothes washer 50 of FIG. 2 except that the clothes washer 1850 is illustrated as having a dispenser 1890 and an optional heating system 1898. The elements in the clothes washer 1850 that are similar to those of clothes washer 50 have been labeled with the prefix 1800. Only those elements necessary for a complete understanding of the embodiments of the invention are illustrated and it will be understood that the clothes washer 1850 may include additional elements traditionally found in a clothes washer without deviating from the scope of the invention.

The clothes washer 1850 may include a dispenser 1890 for dispensing a treating chemistry, which may include water, into the treating chamber 1862 or tub 1854 through one or more nozzles 1894. The dispenser 1890 may be any suitable single dose, multi-dose or bulk-type dispenser and may include a treating chemistry storage compartment(s) 1892 and one or more dispensing pumps 1893 for pumping the treating chemistry from the storage compartment 1892 to the nozzle 1894 for spraying into the treating chamber 1862. There may be one or multiple compartment(s) 1892, which may dispense solid or liquid treating chemistries. One or more of the storage compartment(s) may receive a removable cartridge containing the dispensing chemistry. Some of the compartment(s) 1892 may be a cup holding the treating chemistry, which is flushed by liquid, instead of using the pump 1893, to dispense the treating chemistry from the compartment 1892. The dispensing pump 1893 may pump the treating chemistry directly from the storage compartment 1892 or, alternatively, the dispensing pump 1893 may pump the treating chemistry to a mixing chamber (not shown) for mixing one or more treating chemistries, which may include water from a water supply 1872, to form a treating chemistry mixture prior to supplying the treating chemistry mixture to the treating chamber 1862. The pump 1893 is preferably a metered pump, such as a piston pump, which is capable of dispensing very precise volumes of treating chemistries at very precise flow rates.

Treating chemistry which collects in the sump 1858 may be pumped out through a household drain 1878 by a pump 1876. Alternatively, the pump 1876 may recirculate liquid collected in the sump 1858 back to the treating chamber 1862 through a recirculation conduit 1880 and a sprayer 1874. While a single pump 1876 is illustrated for preforming both the drain and recirculation functions, separate pumps may be used.

The optional heating system 1898 is provided for heating the liquid used in the cycle of operation and/or the treating chamber 1862. In this way, the temperature of the liquid and/or laundry in the treating chamber 1862 may be raised to a desired temperature for the cycle of operation. The heating system 1898 may be any suitable heating system for the described purpose and is illustrated as a forced air system comprising a resistive heating element 1898A and a fan 1898B, which are configured such that the fan 1898B flows air over the heating element 1898A and the heated air is sent to the treating chamber 1862. Alternatively, the heating system 1898 could be a heater located within a liquid supply line or in the sump 1858 to heat the liquid that is applied to the laundry in the treating chamber 1862. However, for the low liquid volumes used in the embodiments described herein, there may be insufficient liquid volumes to fully immerse a heater in the sump, making the forced air system more desirable.

Figure 30:
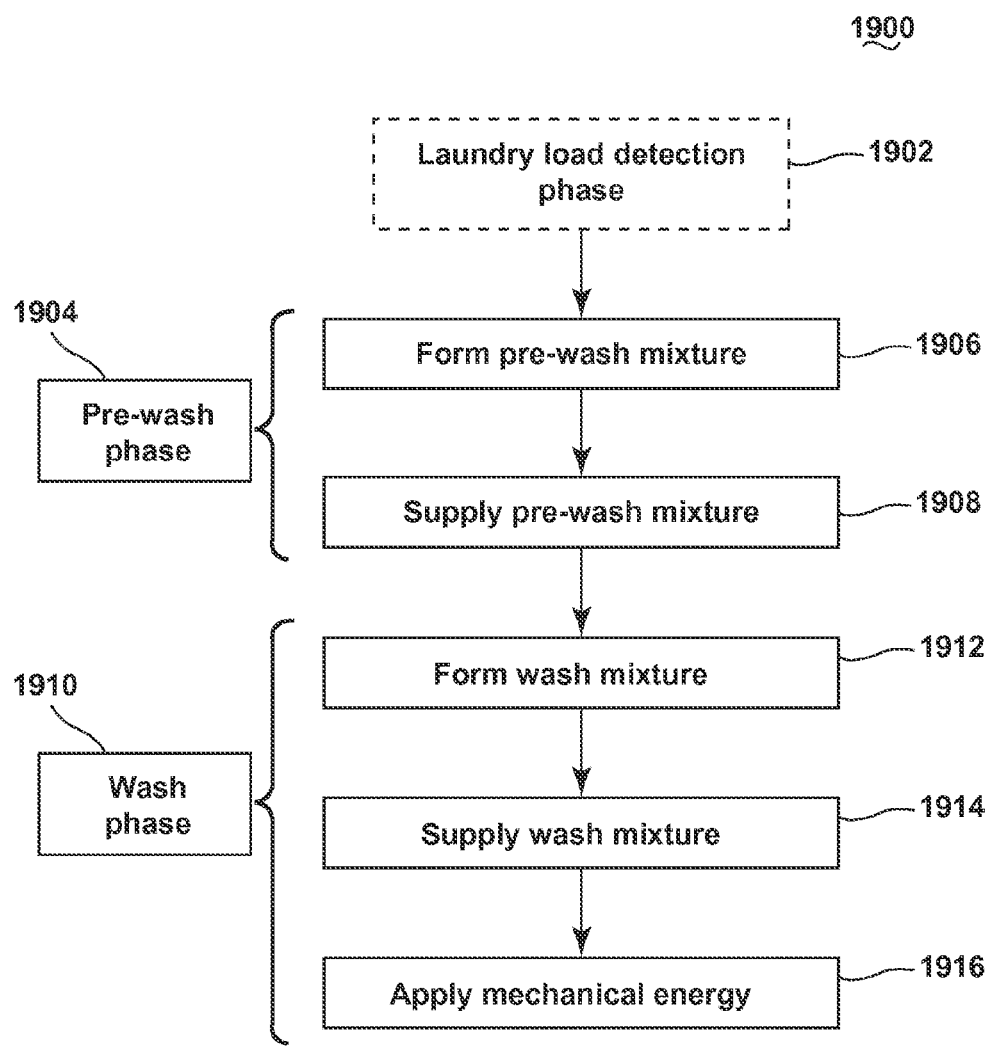
FIG. 30 is a flow chart illustrating a color care cycle of operation according to an embodiment of the invention.

FIG. 30 illustrates a color care cycle 1900 for supplying a treating chemistry, such as a color care agent, to laundry in the treating chamber 1862 during an automatic cycle of operation. While the color care cycle 1900 is described in the context of the clothes washer 1850, it will be understood that the cycle 1900 may be used with any of the clothes washers described herein, such as clothes washer 50, 450 and 2050. The color care cycle 1900 may be used to supply one or more color care agents to the treating chamber 1862 for the preservation of laundry color and/or the inhibition of a dye transfer event. While the color care cycle 1900 is described in the context of supplying a fabric softener as the color care agent, the color care agent may include alternate or additional treating chemistries, non-limiting examples of which include one or more cationic surfactants, cationic polymers, emulsions, vesicles, micelles, dye absorbers or dye fixatives or combinations thereof. The color care agent may be provided to the treating chamber 1862 as a mixture and may include one or more additional treating chemistries, non-limiting examples of which include water, fragrance and colorants.

The color care cycle 1900 begins with assuming that the user has placed the laundry for treatment into the treating chamber 1862, provided a treating chemistry that includes a color agent to the dispenser 1890 and selected a cycle of operation that includes the color care cycle 1900. The color care cycle 1900 may be an independent cycle or part of another cycle of operation.

The color care cycle 1900 may include an optional laundry load detection phase 1902 that may be used to determine an amount of laundry present in the treating chamber 1862. The amount of laundry may be qualitative or quantitative and may be determined manually based on user input through the user interface 1884 or automatically by the washing machine 1850 in a manner similar to that described for the laundry load detection phase 22 of FIG. 1.

The color care cycle 1900 includes a pre-wash phase 1904 which includes forming a pre-wash mixture 1906 and supplying the thus formed pre-wash mixture to the treating chamber 1862 at 1908. Following the pre-wash phase 1904, a wash phase 1910 may be implemented in which a wash mixture is formed at 1912 and supplied to the treating chamber 1862 at 1914. The wash phase 1910 may also include the application of mechanical energy 1916 to the laundry in the treating chamber 1862 to treat the laundry and remove soil from the laundry.

Forming the pre-wash mixture at 1906 may include combining a color care agent, such as a composition that includes a fabric softener, and water to form a pre-wash mixture having a predetermined concentration of fabric softener. The dispensing pump 1893 may be configured to dispense a controlled amount of fabric softener from the storage compartment 1892 to provide a predetermined concentration of fabric softener to the treating chamber 1862 throughout the supplying of the pre-wash mixture at 1908. In one example, the dispensing pump 1893 may continuously or intermittently dose a predetermined portion of the fabric softener stored in the storage compartment 1892 to a flow of water in real time to form the pre-wash mixture. In another example, the dispensing pump 1893 may repeatedly pump a micro-dose of the fabric softener into a flow of water. Dosing a predetermined portion of the fabric softener may be based on dosing a predetermined amount of fabric softener and/or predetermined rate of fabric softener based on the concentration of the fabric softener in the storage compartment 1892 and the desired end concentration of fabric softener to be applied to the laundry in the treating chamber 1862. In another example, the fabric softener and water can be supplied to the sump 1858 at predetermined ratios or at predetermined rates to form a pre-wash mixture having the desired end concentration for application to the laundry. An exemplary ratio of fabric softener to water is 4 mL of fabric softener for every 1 of water. The thus formed pre-wash mixture may then be circulated from the sump 1858 to the laundry in the treating chamber 1862 by the pump 1876 through the recirculation conduit 1880 and the sprayer 1874. In yet another example, the fabric softener may be combined with another treating chemistry, such as water, in a mixing chamber to form a pre-diluted concentrate that is then pumped into a flow of water or into the sump 1858 for mixture with water also supplied to the sump 1858.

The pre-wash mixture may be formed at 1906 at a predetermined concentration that is based on the amount of laundry in the treating chamber 1862, as determined at the load detection phase 1902. The amount of pre-wash mixture formed at 1906 may also be based on the amount of laundry and may be set so as to provide enough pre-wash mixture to uniformly cover the laundry with the pre-wash mixture without oversaturating the laundry. As used herein, oversaturating the laundry refers to a condition in which the amount of water and/or fabric softener associated with the laundry is more than is necessary to uniformly cover the surface of the laundry. Providing excess water and fabric softener to the laundry unnecessarily consumes these resources. In addition, excess fabric softener may interact with treating chemistries, such as laundry detergent, supplied during other portions of the cycle resulting in an undesirable amount of an undesirable by-product, such as a precipitate. Thus, an appropriate amount of fabric softener will be an amount that can cover the laundry for the determined load size without the fabric softener precipitating with other chemistries used during the cycle of operation. While it is desired that every surface of the laundry be uniformly covered with fabric softener at the determined concentration level, practically it is understood that this is not likely possible. Thus, it is expected that a suitable amount may result in less than perfect coverage and a small amount of precipitate which does not interfere with treating performance of the cycle of operation is tolerable.

Figure 31:
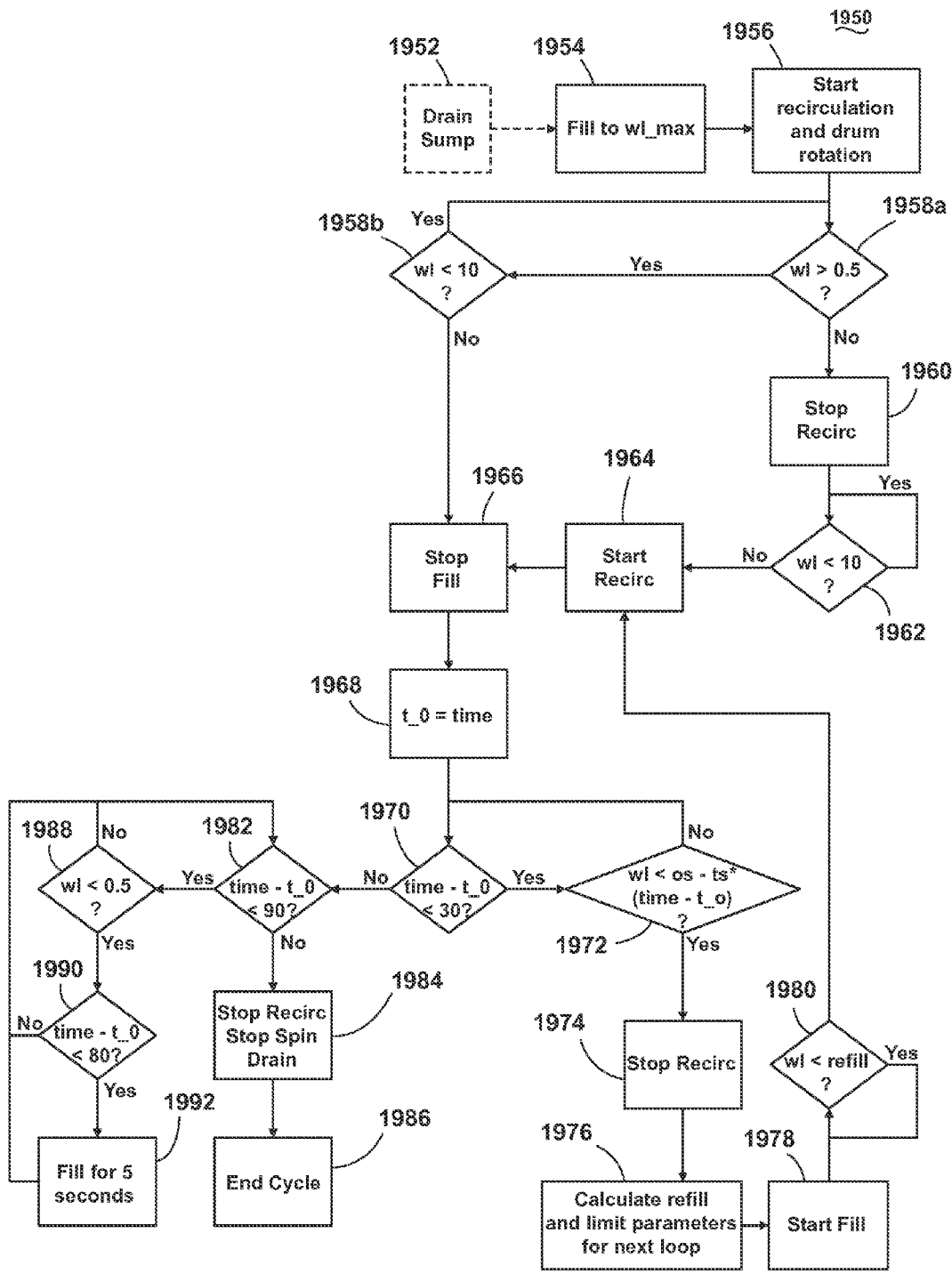
FIG. 31 illustrates a process for supplying a treating chemistry according to an embodiment of the invention.

Referring now to FIG. 31, one example of a treating chemistry supply method 1950 is illustrated, which may be used at 1908 of the cycle 1900 of FIG. 30 for supplying a pre-wash mixture to the laundry in the treating chamber 1862. While the method 1950 is described in the context of supplying a pre-wash mixture, it will be understood that the method 1950 may be used to supply any suitable treating chemistry to the laundry. The method 1950 may be used with the cycle 1900 or any other cycle in which a treating chemistry is supplied to the laundry to provide uniform coverage of the laundry without oversaturating the laundry with the treating chemistry. Further, while the treating chemistry supply method 1950 is designed for a vertical axis machine, it may be used in a horizontal axis machine.

In overview, the method 1950 initially supplies the pre-wash mixture to the tub 1854 to maintain the level of pre-wash mixture at a predetermined level. During the supply of pre-wash mixture, the pre-wash mixture is recirculated while the drum 1860 is rotated at a slow speed. The liquid level in the sump 1858 is checked to confirm that there is sufficient liquid for continued recirculation. If not, the recirculation is stopped until sufficient liquid is supplied for recirculation. Ultimately, a steady state is reached where the liquid in the sump maintains a predetermined level while the liquid is continuously recirculated and the supply of pre-wash liquid is terminated while the recirculation is continued. The termination of the recirculation with drum rotation may be based on time, which may be a function of the time to reach the steady state.

In a specific implementation, the method 1950 may begin with an optional drain step 1952 in which liquid that has collected in the sump 1858 is drained by the pump 1876. At 1954, water and fabric softener may be provided to the sump 1858 as a pre-formed, pre-wash mixture or to form the pre-wash mixture, such as described above at 1906 of the cycle 1900, until the liquid level satisfies a predetermined threshold wl max. Providing the pre-wash mixture to the sump at 1954 may be considered a fill process. The level of liquid in the sump 1858 may be determined in any suitable manner, such as based on output from a pressure sensor located in the sump 1858, and is not germane to the embodiments of the invention.

At 1956 recirculation of the liquid in the sump 1858 and rotation of the drum 1860 may begin. The recirculation and rotation of the drum 1860 may begin at the same time or one may begin at some predetermined delay after the other. In one example, recirculation may begin after the drum 1860 has been rotating for a predetermined period of time or when the rotational speed of the drum 1860 reaches a predetermined speed. The filling started at 1954 may continue for a predetermined period of time during recirculation and rotation at 1956 or may be halted prior to beginning recirculation and/or rotation at 1956. In one example, the fill process of 1954 continues as recirculation is started and the drum 1860 starts to rotate to a predetermined speed, such as 26 rpm, for example. The fill, recirculation and rotation may continue for a predetermined period of time, such as 10 seconds, for example, before moving on to a liquid level determination at 1958a, b.

Following the start of recirculation and rotation of the drum at 1956, the process loops back and forth between 1958a and 1958b to determine if the liquid level wl in the sump satisfies a pair of upper and lower threshold values, which in the exemplary method 1950 correspond to 10 and 0.5. The upper and lower threshold values may correspond to a height of liquid in the sump or an output from the pressure sensor representative of the level of liquid in the sump 1858. The lower threshold value may correspond to an amount of liquid in the sump 1858 that satisfies the pump 1876 by providing a sufficient amount of liquid to decrease the likelihood of starvation of the pump 1876. As used herein, starvation with respect to a pump refers when the pump inlet draws in air, not just liquid. The upper threshold value may correspond to a desired amount of liquid for completing the treating chemistry supply method. In one example, the upper threshold value may correspond to a liquid level in the sump 1858 which will satisfy the pump 1876 during recirculation of the liquid in the sump 1876 even as some of the recirculating liquid is absorbed by the laundry. Prior to saturation of the laundry with the liquid, as liquid is sprayed onto the laundry, the laundry may absorb some of the liquid, thus the amount of liquid which collects in the sump 1858 after spraying will likely be less than the amount of liquid in the sump 1858 prior to the spraying.

If the liquid level wl in the sump is below the lower threshold value 0.5 at 1958a, then recirculation is stopped at 1960 and the drum 1860 is rotated while continuing to fill the sump 1858 with the pre-wash mixture until the liquid level satisfies the upper threshold value 10 at 1962, at which point recirculation is started at 1964 and filling is stopped at 1966. At 1958b, if the liquid level in the sump 1858 goes above the upper threshold value 10 before it drops below the lower threshold value 0.5, then the process stops filling at 1966.

At 1968, the pre-wash mixture has been provided to increase the liquid level wl in the sump to satisfy the upper threshold value 10 while recirculation continues and filling has been stopped and parameter t_0 is set. The drum 1860 may continue to rotate at 26 rpm for the remainder of the process 1950. After t_0 is defined, the remainder of the process 1950 relates to determining if the liquid level wl in the sump is staying above a predetermined lower threshold level determined according to the relationship wl<os−ts*(time−t_0).

Figure 32B:
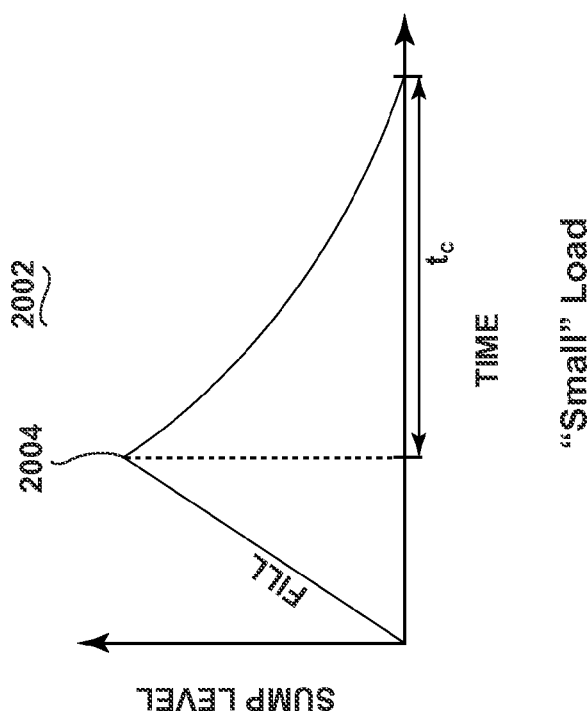
FIGS. 32A and 32B illustrate graphs representative of a change in the liquid level in a sump of a clothes washer over time during a recirculation process according to an embodiment of the invention.
Figure 32A:
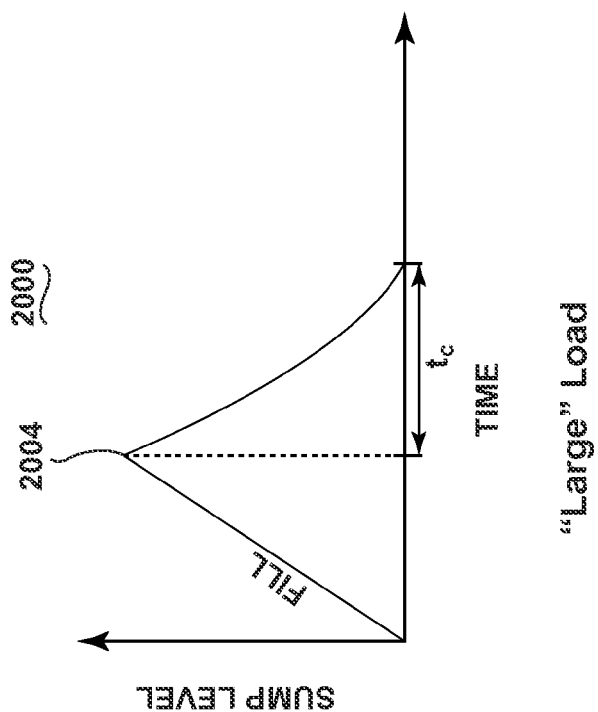

Referring now to FIGS. 32A and B, graphs 2000 and 2002 of liquid level in the sump over time for a large load and a small load, respectively are illustrated. The graphs 2000 and 2002 are illustrated for the purposes of discussion and do not represent actual data. As liquid is provided to the sump 1858 during a fill process, the sump liquid level increases. At a predetermined liquid level 2004, filling is stopped and recirculation of the liquid in the sump 1858 is started. As the liquid is recirculated onto the laundry and absorbed by the laundry, the liquid level in the sump 1858 begins to decrease. The amount of time $t_c$ that it takes for the liquid level to decrease to a predetermined level may vary depending on characteristics of the laundry, such as the load amount and fabric type, for example, as well as the speed of rotation of the drum 1860 during recirculation. As illustrated in FIGS. 32A and B, the time $t_c$ for a large load is smaller than the time $t_c$ for a small load. Viewed another way, the rate of change of the liquid level in the sump during recirculation (i.e. the slope) is faster for a large load than for a small load. During recirculation, larger loads may absorb more water than small loads and thus the liquid level in the sump 1858 for a large load will decrease faster than an equivalent small load.

Figure 33:
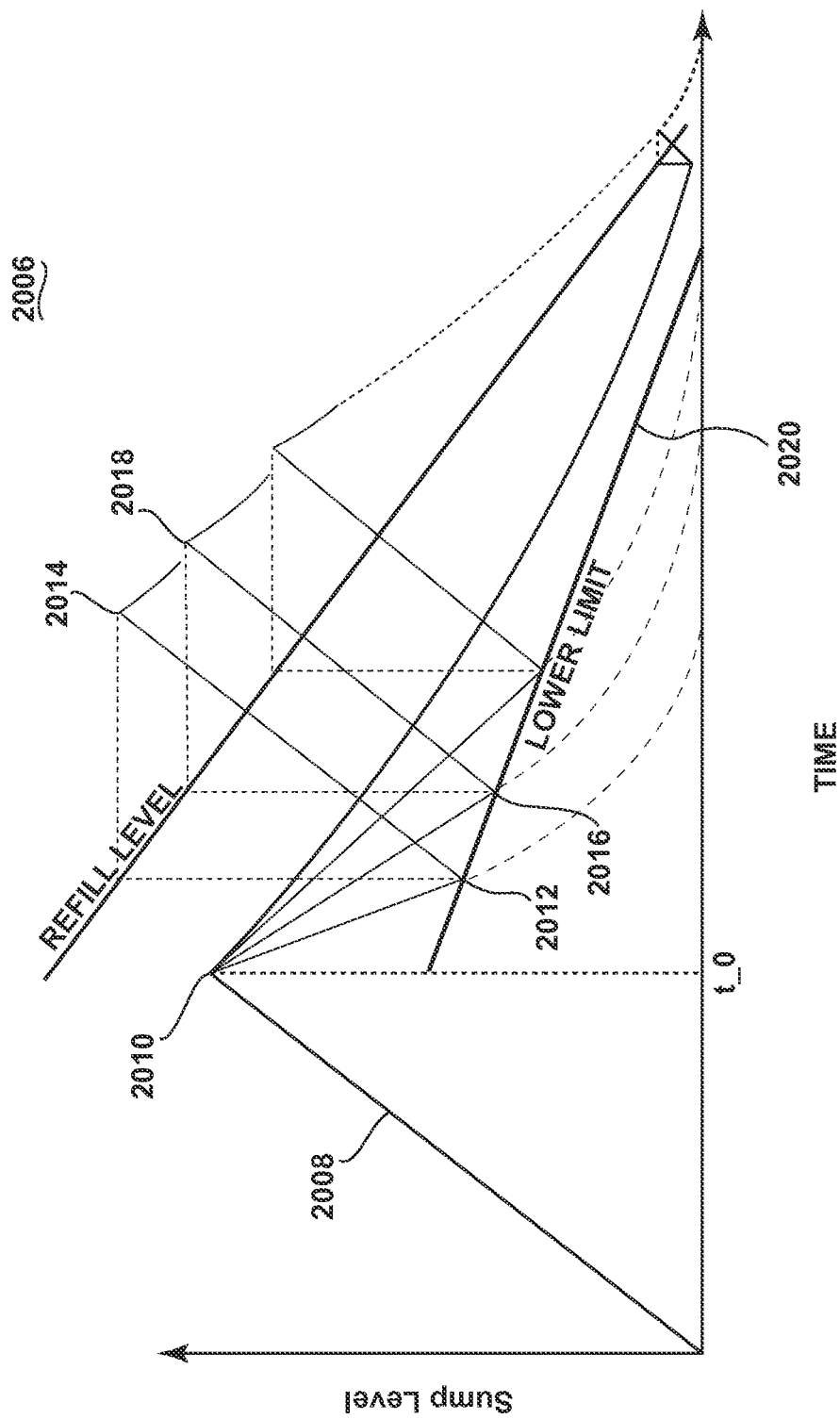
FIG. 33 illustrates a graph representative of a change in a liquid level in a sump of clothes washer during an adaptive fill and recirculation process according to an embodiment of the invention.

FIG. 33 graphically illustrates the relationship between wl, os, ts, t_0 and $t_c$ for the purposes of discussion only and is not meant to limit the embodiments of the invention in any way. Graph 2006 illustrates the change in liquid level, lower threshold and refill level over time for a single load during a filling and recirculation process to cover the laundry with a pre-wash mixture. The pre-wash mixture may be provided to the sump 1858 during a fill 2008 to increase the liquid level to a first fill level 2010 at which point recirculation of the pre-wash mixture is started. The point at which recirculation is started is time t_0. As the liquid is recirculated, the liquid level in the sump 1858 decreases. When the liquid level in the sump reaches a first lower threshold 2012, recirculation is halted and the filling process begins again until the liquid level reaches a second fill level or refill level 2014. When the liquid level in the sump reaches the refill level 2014, recirculation is started and a new t_0 and lower threshold level wl 2016 is determined. As the liquid level in the sump decreases during recirculation, when the liquid level reaches the lower threshold level wl 2016, recirculation is stopped and the filling process begins again until the liquid level reaches the second refill level 2018. The fill and recirculate process may be repeated any number of times until the liquid level in the sump remains above the lower threshold for a predetermined period of time. Each time the fill and recirculate process is repeated, the lower threshold level may be varied, by changing os and ts, based on the amount of time it took for the liquid level to drop below the lower threshold level in the previous fill and recirculate process. The term os is an offset value which corresponds to the lower threshold at time t_0; the term ts is the target slope which corresponds to the rate at which the lower threshold decreases. As the laundry becomes covered and saturated with the pre-wash mixture, the amount of time it takes for the liquid level in the sump to decrease to the lower threshold level increases.

Depending on the characteristics of the load, such as amount and fabric type, for example, the liquid level in the sump may decrease at varying rates. The rate at which the liquid level in the sump decreases affects how long it takes to reach the lower threshold level, which is determined by the offset os and the target slope ts, illustrated by lower limit 2020. The parameters os and ts may be determined experimentally or based on empirical data for different load conditions to provide the desired degree of coverage using a predetermined amount of resources and time.

In this manner, the supplying of the pre-wash mixture may be implemented adaptively to supply enough pre-wash mixture to the laundry to provide a predetermined level of coverage and saturation without oversaturating the load or using an excessive amount of water and/or fabric softener. The amount of pre-wash mixture absorbed by the laundry during a fill and recirculate process may be used to determine an amount of pre-wash mixture to provide in a subsequent fill and recirculate process.

Referring again to FIG. 31, at 1970, it may be determined if the liquid level wl in the sump 1858 remained above the predetermined lower threshold level for a predetermined period of time, such as 30 seconds. If the liquid level wl in the sump 1858 did not remain above the lower threshold level for longer than 30 seconds, at 1972 it is determined if the liquid level wl in the sump 1858 satisfies the relationship wl<os−ts*(time−t_0). If the liquid level wl in the sump 1858 does not satisfy this relationship, then the process loops back to 1970. If the liquid level wl in the sump 1858 does satisfy the relationship, then recirculation is stopped at 1974, the refill level, os, ts and lower threshold level are determined for the next fill and recirculation process based on the length of time it took for the liquid level wl to reach the previous lower threshold level. The pre-wash mixture is provided to the sump 1858 at 1978 to begin the refill process until the liquid level wl in the sump 1858 reaches the refill level and then recirculation is started again at 1964.

This process is repeated until it is determined at 1970 that the liquid level wl in the sump 1858 remains above the lower threshold level for 30 seconds or more. The process then advances to 1982 and the lower threshold level may be set to a predetermined value, such as 0.5, for example. If the liquid level wl in the sump 1858 remains above 0.5, the process continues for a predetermined period of time before completion. In the exemplary embodiment, if the liquid level wl remains above 0.5, the process continues for 60 more seconds and then recirculation and drum rotation is stopped and the liquid collected in the sump 1858 may optionally be drained at 1984 and the process completed at 1986.

If the liquid level wl in the sump 1858 drops below 0.5 with at least 10 seconds remaining in the process at 1988 and 1990, then the fill process is implemented for a predetermined period time, such as 5 seconds, during which recirculation and drum rotation continue. Optionally, if there is less than 10 seconds remaining, the liquid level wl may be allowed to continue to decrease until completion of the process. In this scenario, during this final portion, the time is never reset as it is in process loop 1970 to 1968. If the liquid level drops below the lower threshold level and fill is activated, the time simply continues counting towards the 60 second limit, at which point the process is ended as described previously.

During the fill process in which the pre-wash mixture is provided to the sump 1858, the fabric softener may be dispensed at a constant or varying rate such that when the amount of liquid remaining in the sump 1858 during recirculation satisfies the time threshold for the amount of time the liquid level remains above the lower threshold, the concentration of fabric softener on the laundry item and the level of coverage satisfies a predetermined threshold.

Referring again to FIG. 30, supplying the pre-wash mixture may include recirculating the pre-wash mixture onto the laundry while the drum 1860 is rotating such that minimal mechanical energy is provided to the individual items in the laundry load. This may include rotating the drum 1860 such that there is little relative movement of the laundry items relative to one another, such as at low speeds or at high spin speeds after the laundry items have already satellized to the periphery of the drum 1860. Low speeds may be speeds at which no tumbling or rolling of the laundry items occur, for example. In addition, supplying the pre-wash mixture may be done without activating a clothes mover, such as an agitator or impeller.

In a variation, supplying the pre-wash mixture at 1908 of the cycle 1900 may include rotating the drum 1860 at a first, slower rotational speed and a second, faster rotational speed while spraying the pre-wash mixture into the treating chamber 1862 rather than while rotating at a single speed as described with respect to the method 1950 of FIG. 31. For example, the pre-wash mixture may be recirculated and sprayed into the treating chamber 1862 while the drum 1860 is rotating up to and/or at a first, slower speed. After a predetermined period of time or after a predetermined speed threshold is satisfied, the recirculation and spraying of the pre-wash mixture may be stopped and the drum rotational speed may be accelerated to a second, faster speed. When the drum rotational speed reaches the second speed or a predetermined period of time after the drum speed reaches the second speed, the recirculation and spraying of the pre-wash mixture may be re-started. The second speed may be a spin speed at which a centrifugal force of at least 1 G is provided to the laundry items such that laundry items have satellized around the periphery of the drum 1860. Once the laundry items have satellized, even though the drum 1860 may be rotating at a high speed, the laundry items are not moving relative to each other.

In this manner, the pre-wash mixture may be supplied to the laundry load when there is minimal relative movement between the items of the laundry load and not supplied to the laundry items when the load items are moving, such as when transitioning between the first and second speeds. This may decrease the amount of dye transfer between laundry items due to frictional contact between laundry items as they move relative to each other. In addition, the redistribution of the laundry load between the first speed and the second speed may facilitate even coverage of the laundry load with the pre-wash mixture by exposing different surfaces to the pre-wash mixture spray and/or facilitating movement of the pre-wash mixture through the laundry load.

In yet another variation, supplying the pre-wash mixture at 1908 may be done while the drum 1860 is rotated at different speeds so as to form multiple flow channels through the laundry in a manner similar to that described above with respect to FIGS. 6A-6B. In this example, recirculation of the pre-wash mixture stops when the drum speed is accelerated or decelerated between different speeds and is re-started once the drum speed reaches the new speed.

The pre-wash mixture may be sprayed onto the laundry using one or more sprayers and may be applied as a mist, fog, or stream using any suitable spray nozzle or other spraying device or according to any methods for supplying a treating chemistry described herein. A single sprayer 1874 may be used to spray the pre-wash mixture onto a predetermined portion of the load that enters a spray zone corresponding to that sprayer. The spray zone may be considered the area which liquid emitted from the sprayer directly contacts. The sprayer 1874 may be configured to cover only a portion of the treating chamber 1682 and the laundry may be rotated to enter the portion of the treating chamber 1862 covered by the sprayer 1874. In another example, the sprayer may be configured to cover the entire treating chamber 1862 such that all of the exposed surfaces of the laundry in the treating chamber 1862 are covered by the liquid emitted by the sprayer 1874 without rotating the drum 1860. In yet another example, the clothes washer 1850 may include multiple sprayers to cover multiple portions of the treating chamber 1862 with a single spray.

Optionally, supplying the pre-wash mixture at 1908 of the cycle 1900 may also include applying heat to the laundry. In one example heated air may be applied to the laundry after it has been treated with the pre-wash mixture using the heating system 1898. The application of heated air may be used to increase the temperature of the laundry to a predetermined temperature, which is preferably below the setting temperature of blood to avoid setting blood stains in the laundry items. The heated air may be supplied to the treating chamber 1862 with or without agitation or movement of the laundry, such as by rotation of the drum 1860. In one example, the application of heated air to laundry that has been treated according the cycle 1900 with a pre-wash mixture that includes a fabric softener has been found to further facilitate the inhibition of dye transfer in the subsequent wash phase 1910 compared to when heated air is not applied.

A benefit of the pre-wash process 1904 for forming and supplying a pre-wash mixture is that a treating chemistry, such as a fabric softener may be uniformly applied to a laundry load without immersing or submerging the laundry in liquid as is typically done in a deep-fill process, which results in a substantial reduction of water consumed during the cycle. A deep-fill process will use approximately 16 liters of water for an 8 lb load, whereas the current process uses 8 liters of water for the same load size. For example, typically during a rinse phase in which it is desired to treat the laundry with a fabric softener, water and fabric softener will be supplied to the treating chamber to submerge the laundry in the water and fabric softener in order to achieve even distribution of the fabric softener.

The pre-wash process 1904 described herein may be used not only in a pre-wash setting, but also in the traditional application of fabric softener during a rinse phase, which follows a wash phase. The use of the current method in the traditional rinse phase will have the same benefits of uniformly distributing a fabric softener to the laundry, without the extra consumption of water and time of a traditional deep-fill process. Further the use of the current method for a fabric softener dispensing during the rinse phase can simplify the controls or user interface for the washing machine. Contemporary washing machines have a dedicated selector to indicate that fabric softener is being used so that the cycle of operation may be modified accordingly to include a deep-fill rinse for application of the fabric softener. The current method can be implemented automatically without the need for a dedicated selector.

Still referring to FIG. 30, the transition between the pre-wash phase 1904 and the wash phase 1910 of the cycle 1900 may optionally including an extraction phase in which the laundry is spun at high speeds to extract liquid from the laundry and/or a drain phase in which liquid collected in the sump 1858 is drained by the pump 1876. The drain and/or extract phases may be configured so as to provide a predetermined amount of carry-over of the pre-wash mixture into the wash phase 1910. In one example, the laundry may be spun at high speeds to extract the pre-wash mixture from the laundry such that a predetermined amount of the pre-wash mixture remains in the laundry. Depending on the components of the pre-wash mixture, it may be desirable to have a small amount of carry-over in the laundry, such as when the color care agent is a dye fixative; in another example, in the case of a dye absorber, a higher amount of carry-over of the pre-wash mixture may be desirable. In another example, the drain and extract phases may be controlled such that some amount of the pre-wash mixture is extracted from the laundry and held over in the sump 1858 such that the pre-wash mixture may be re-applied in the subsequent wash phase 1910. This may be desirable when the pre-wash mixture includes a dye absorber such that dye absorber is re-supplied to the laundry, such as during a portion of the wash phase 1910 in which mechanical energy is applied to the laundry, for example, to further facilitate inhibition of a dye transfer event.

Figure 34:
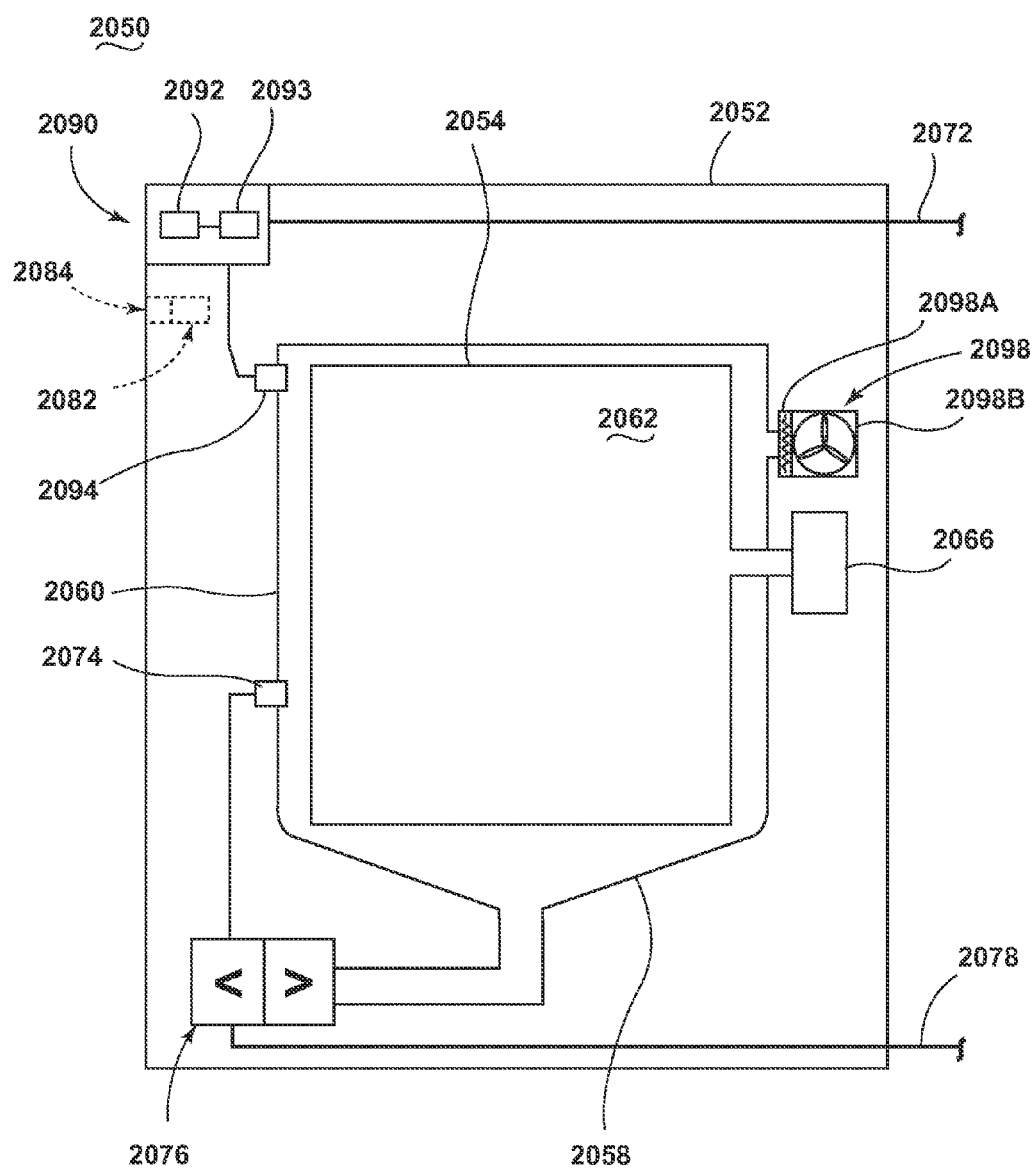
FIG. 34 illustrates a cross-section, schematic side view of a horizontal axis clothes washer according to an embodiment of the invention.

Referring now to FIG. 34, a schematic of a horizontal axis clothes washer 2050 that is similar to the clothes washer 450 of FIG. 10 is illustrated except that the clothes washer 2050 is illustrated as having an optional heating system 2098, in a manner similar to that described above for the clothes washer 1850 of FIG. 29. The elements in the clothes washer 2050 that are similar to those of clothes washer 450 have been labeled with the prefix 2000. Only those elements necessary for a complete understanding of the embodiments of the invention are illustrated and it will be understood that the clothes washer 2050 may include additional elements traditionally found in a clothes washer without deviating from the scope of the invention. The clothes washer 2050 may be used to implement the cycle 1900 of FIG. 30 in a manner similar to that described above with respect to the vertical axis clothes washer 1850 of FIG. 29.

Figure 35:
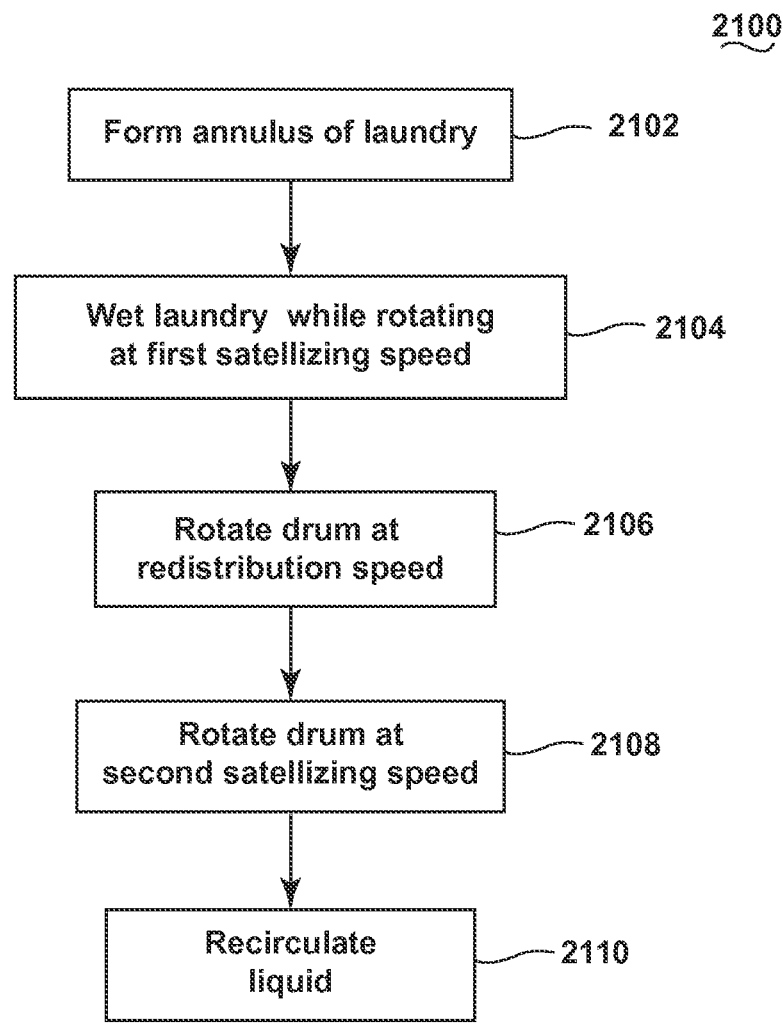
FIG. 35 illustrates a process for supplying a treating chemistry according to an embodiment of the invention.

FIG. 35 illustrates a method 2100 for supplying a treating chemistry which may be used at 1908 of the cycle 1900 of FIG. 30 for supplying a pre-wash mixture to the laundry in the treating chamber 2062 of the clothes washer 2050. The pre-wash mixture may be formed according to any of the methods described above at 1906 of the cycle 1900 to provide a predetermined amount of fabric softener to the laundry in the treating chamber 2062. While the method 2100 is described in the context of supplying a pre-wash mixture, it will be understood that the method 2100 may be used to supplying any suitable treating chemistry to the laundry. The method 2100 may be used with the cycle 1900 or any other cycle in which a treating chemistry is supplied to the laundry. The method 2100 may be implemented to provide an even distribution of the fabric softener to the laundry items under liquid volume and time constraints.

Still referring to FIG. 35, the method 2100 may begin with rotating the drum 2060 to a first satellizing speed at 2102 without wetting the laundry to form an annulus of laundry in the drum 2060. While it is contemplated that the laundry placed in the treating chamber 2062 will be dry, there is the possibility that it may be wet when placed into the treating chamber 2062. The lack of wetting during the formation of the annulus 2102 means that liquid is not applied to the laundry during the formation of the annulus, not that the laundry may not already be wet for other reasons. Rotating the drum 2060 to the first satellizing speed without wetting the laundry may facilitate forming a balanced load distribution that stays balanced throughout the method 2100. The annulus will be formed as the laundry items move to the periphery of the drum 2060 due to centrifugal forces that the load experiences when rotating at a speed at which the centrifugal force is generally greater than one gravitational force or 1 G. At 2104, the laundry may be wet by spraying a treating chemistry, such as the pre-wash mixture, through the sprayer 2074 into the treating chamber 2062 while the drum 2060 is still rotating at the first satellizing speed. While rotating at the first satellizing speed, the laundry items are not moving relative to one another and essentially remain plastered against the inner wall of the drum 2060, forming the annulus. In this manner, the fabric surfaces forming the inner surface of the annulus are exposed to the pre-wash mixture that is sprayed from the sprayer 2074.

The first satellizing speed may be a speed at which the laundry annulus may be formed but which provides a first centrifugal force that is insufficient to extract liquid carried by the laundry from the laundry at a rate that is great enough to satisfy the pump 2076. As used herein, satisfying the pump refers to providing an amount of liquid and a rate of liquid flow to the pump 2076 such that starvation of the pump 2076 in which the pump 2076 draws in air satisfies a predetermined threshold. The satisfying of the pump 2076 may be done by monitoring the current draw of the pump 2076, the noise of the pump 2076, or the speed of the pump 2076. However, a convenient way to determine that the pump 2076 is satisfied is to maintain a predetermined amount of water in the sump 2058 or to maintain a minimum level of water in the sump 2058. Thus, the term "satisfies" the pump is used herein to mean that the variation satisfies a predetermined threshold, such as being equal to, less than, or greater than the threshold value, which in this case may correspond to an amount or rate of starvation. It will be understood that such a determination may easily be altered to be satisfied by a positive/negative comparison or a true/false comparison. For example, a less than threshold value can easily be satisfied by applying a greater than test when the data is numerically inverted.

When it is determined that the pump 2076 is not satisfied, the drum speed rotation may be decreased, by braking and/or controlling the motor 2066 to reduce the speed and allowing the drum 2060 to slow, to a redistribution speed at 2106 without stopping the rotation of the drum 2060. The redistribution speed may correspond to a speed wherein the annulus of laundry which has been partially wet at 2104 redistributes and the pump 2076 is satisfied. Redistribution of the load may include tumbling, rolling and/or sliding all or a portion of the load. In most cases, the speed of the drum 2060 need only drop enough such that at least part, but preferably all, of the articles forming the laundry experience a centrifugal force of less than 1G, which will permit the articles to redistribute. While the drum 2060 may be stopped and/or reversed to accomplish the redistribution, it is not necessary to do so. From an overall cycle time perspective, not stopping the drum 2060 is preferred.

At a predetermined period of time following rotation of the drum 2060 at the redistribution speed, at 2108 the drum 2060 may be accelerated to a second satellizing speed, greater than the first satellizing speed. The second satellizing speed may correspond to a speed at which a second centrifugal force is applied to the laundry that is sufficient to extract liquid carried by the laundry in an amount and rate sufficient to satisfy the pump 2076. During rotation of the drum 2060, liquid extracted from the load is recirculated onto the load by the pump 2076 to further wet the load at 2110.

In one example, rotating the drum 2060 at the second satellizing speed and recirculating the liquid at 2110 may be implemented for a predetermined period of time. Toward the end of the predetermined period of time, the rotational speed of the drum 2060 may be decreased until the pump 2076 is no longer capable of providing liquid at a sufficient amount and pressure to the sprayer 2074 for spraying through the sprayer 2074 or until the rotational speed of the drum 2060 reaches a speed where the centrifugal forces are no longer sufficient to extract liquid from the laundry in an amount and rate that is sufficient to satisfy the pump 2074. Alternatively, the drum speed may be decreased until a predetermined drum speed is reached, until a predetermined time period has lapsed, or until a liquid level in the sump 2058 satisfies a predetermined liquid level threshold. In this manner the amount of liquid applied to the laundry may be increased and the amount of liquid remaining in the sump 2058 decreases.

In an exemplary embodiment, the first centrifugal force corresponds to a 23 inch diameter drum rotating at a first satellizing speed of 250 rpm, and the second centrifugal force corresponds to a 23 inch diameter drum rotating at a second satellizing speed of 350 rpm.

The amount of liquid supplied to the treating chamber 2062 for recirculation may be limited based on the amount of laundry in the treating chamber 2062. In one example, a maximum amount of liquid supplied to the treating chamber 2062 for a 4 pound or less laundry load is 1.75 gallons, 2.27 gallons for a load amount of 8 pounds or less, but greater than 4 pounds, or 2.9 gallons for a load amount of 12 pounds or less, but greater than 8 pounds.

As described above for the pre-wash phase 1904 of cycle 1900 with respect to FIG. 30, the recirculating pre-wash mixture may be sprayed onto the laundry using one or more sprayers. A single sprayer 2074 may be used to spray the pre-wash mixture onto a predetermined portion of the load that enters a spray zone corresponding to that sprayer. The spray zone may be considered the area which liquid emitted from the sprayer 2074 directly contacts. The sprayer 2074 may be configured to cover only a portion of the treating chamber 2062 and the laundry may be rotated to enter the portion of the treating chamber 2062 covered by the sprayer 2074. In another example, the sprayer 2074 may be configured to cover the entire treating chamber 2062 such that all of the exposed surfaces of the laundry in the treating chamber 2062 are covered by the liquid emitted by sprayer 2074 without rotating the drum 2060. In yet another example, the clothes washer 2050 may include multiple sprayers to cover multiple portions of the treating chamber 2062 with a single spray.

Optionally, supplying the pre-wash mixture at 1908 of the cycle 1900 may also include applying heat to the laundry. In one example heated air may be applied to the laundry after it has been treated with the pre-wash mixture using the heating system 2098. The application of heated air may be used to increase the temperature of the laundry to a predetermined temperature, which is preferably below the setting temperature of blood to avoid setting blood stains in the laundry items. The heated air may be supplied to the treating chamber 2062 with or without agitation or movement of the laundry, such as by rotation of the drum 2054.

To the extent not already described, the different features and structures of the various embodiments may be used in combination with each other as desired. For example, any of the processes 10, 100, 120, 150, 200, 206, 212, 300, 500, 550, 600, 650, 700, 710, 800, 850, 1000, 1020, 1050, 1300, 1500, 1600, 1700, 1900, 1950, or 2100 may be combined in whole or in part with one another and used with any of the apparatus 50, 450, 1100, 1850, or 2050 described herein or any other suitable apparatus not explicitly described herein. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly disclosed.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:
1. A method of operating a laundry treating appliance having a treating chamber for receiving laundry for treatment, the method comprising:
   a treating chemistry application phase where a treating chemistry is supplied to the treating chamber along with water to form a laundry treating solution, with the treating chemistry comprising:
   at least one water soluble cationic dye absorber;
   a surfactant system comprising at least one surfactant; and
   an emulsifier comprising particulates;
   a dye dispersion phase where a Pickering emulsion is formed by the interaction of the particulates with dye present in the laundry treating solution to disperse the dye within the laundry treating solution; and a rinse phase, following the treating chemistry application phase, where rinse liquid is supplied to the treating chamber to rinse the laundry of the treating chemistry.

2. The method of claim 1 further comprising a load amount determining phase where a determination is made of an amount of the laundry in the treating chamber, and an amount of treating chemistry supplied to the treating chamber is based on the load amount.

3. The method of claim 2 wherein the load amount determining phase is based on a load amount selected by a user or an automatic determination of a load amount by the laundry treating appliance.

4. The method of claim 1 wherein during the treating chemistry application phase a predetermined amount of liquid is supplied to the treating chamber and an amount of the treating chemistry supplied to the treating chamber is based on the predetermined amount of liquid.

5. The method of claim 1 wherein the treating chemistry is at least one of the following: supplied directly to the treating chamber, recirculated through the treating chamber, or supplied as a component of a water mixture.

6. The method of claim 5 wherein the treating chemistry is passed through a dye filter as the treating chemistry is recirculated.

7. The method of claim 5 wherein the treating chamber is rotated during the supplying of the treating chemistry.

8. The method of claim 1 wherein the treating chemistry application phase occurs contemporaneously with at least one of a pre-wash phase or a wash phase.

9. The method of claim 1 further comprising a wash phase preceding the rinse phase.

10. The method of claim 9 further comprising a dye fixative phase where a dye fixative is supplied to the treating chamber prior to the treating chemistry application phase.

11. The method of claim 1 wherein the at least one water soluble cationic dye absorber comprises a zwitterionic dye absorber that is cationically charged during at least a portion of a cycle of operation.

12. The method of claim 1 wherein the at least one surfactant in the surfactant system comprises a cationic surfactant, a nonionic surfactant, or combinations thereof.

* * * * *